United States Patent
Eriksen et al.

(10) Patent No.: US 10,910,776 B2
(45) Date of Patent: Feb. 2, 2021

(54) SYSTEMS AND METHODS USING ELECTRICAL RECEPTACLES FOR INTEGRATED POWER CONTROL, COMMUNICATION AND MONITORING

(71) Applicant: Brainwave Research Corporation, Woodbridge (CA)

(72) Inventors: John Eriksen, Thornhill (CA);
Jean-Guy Gagne, Etobicoke (CA);
Benoit Fortin, Richmond Hill (CA);
Rene K. Pardo, Woodbridge (CA)

(73) Assignee: Brainwave Research Corporation, Ontario (CA)

( * ) Notice: Subject to any disclaimer, the term of this patent is extended or adjusted under 35 U.S.C. 154(b) by 362 days.

(21) Appl. No.: 15/659,382

(22) Filed: Jul. 25, 2017

(65) Prior Publication Data
US 2017/0324195 A1 Nov. 9, 2017

Related U.S. Application Data

(63) Continuation-in-part of application No. 15/274,469, filed on Sep. 23, 2016.
(Continued)

(51) Int. Cl.
*H01R 13/66* (2006.01)
*H01R 13/713* (2006.01)
(Continued)

(52) U.S. Cl.
CPC ..... *H01R 13/6666* (2013.01); *H01R 13/6683* (2013.01); *H01R 13/7135* (2013.01);
(Continued)

(58) Field of Classification Search
CPC ........ H02H 3/00; H02H 9/042; H02H 11/002; H01R 13/6683; H01R 13/6666;
(Continued)

(56) References Cited

U.S. PATENT DOCUMENTS 4,433,326 A * 2/1984 Howell .................... H04B 3/54
307/3
6,176,718 B1 1/2001 Skarie et al.
(Continued)

FOREIGN PATENT DOCUMENTS

WO 0041275 A1 7/2000

OTHER PUBLICATIONS

Notification of Transmittal of the International Search Report and the Written Opinion of the International Searching Authority, or the Declaration; International Search Report and Written Opinion of the International Searching Authority for related International Application No. PCT/CA2017/051121, dated Dec. 7, 2017, 15 pages.
(Continued)

*Primary Examiner* — Kevin J Comber
(74) *Attorney, Agent, or Firm* — Ditthavong & Steiner, P.C.

(57) ABSTRACT

An electrical receptacle contains contacts, at least one contact for electrical connection to a hot power line and at least one contact for a neutral power line. A controlled switch, such as a TRIAC, is connected in series relationship between the contact and the hot power line. One or more sensors are provided which detect signals of the hot power line and/or the neutral power line. The processor provides activation or deactivation control to the controlled switch in response to the detected signals that are indicative of conditions relative to the first and second contacts.

23 Claims, 49 Drawing Sheets

Related U.S. Application Data

(60) Provisional application No. 62/222,904, filed on Sep. 24, 2015, provisional application No. 62/366,910, filed on Jul. 26, 2016, provisional application No. 62/377,962, filed on Aug. 22, 2016, provisional application No. 62/490,527, filed on Apr. 26, 2017, provisional application No. 62/505,434, filed on May 12, 2017.

(51) Int. Cl.
| | | |
|---|---|---|
| *H01R 24/78* | (2011.01) | |
| *H01R 25/00* | (2006.01) | |
| *H02H 11/00* | (2006.01) | |
| *H02H 9/04* | (2006.01) | |
| *H02H 3/00* | (2006.01) | |
| *H01R 103/00* | (2006.01) | |

(52) U.S. Cl.
CPC ........... *H01R 24/78* (2013.01); *H01R 25/006* (2013.01); *H02H 3/00* (2013.01); *H02H 9/042* (2013.01); *H02H 11/002* (2013.01); *H01R 2103/00* (2013.01)

(58) Field of Classification Search
CPC .. H01R 13/7135; H01R 24/78; H01R 25/006; H01R 2103/00
USPC .......................................................... 361/42
See application file for complete search history.

(56) References Cited

U.S. PATENT DOCUMENTS

| | | |
|---|---|---|
| 6,473,281 B1 | 10/2002 | Kornblit |
| 6,678,131 B2 | 1/2004 | Chapman et al. |
| 7,791,848 B2 | 9/2010 | Baldwin et al. |
| 8,696,368 B2 | 4/2014 | Quezada |
| 9,160,168 B2 | 10/2015 | Chapel et al. |
| 9,172,233 B2 | 10/2015 | Vasquez et al. |
| 9,275,411 B2 | 3/2016 | Mengibar |
| 2002/0154461 A1 | 10/2002 | Chapman et al. |
| 2012/0300348 A1* | 11/2012 | Franks ................. H02H 1/0015 361/42 |
| 2014/0177737 A1 | 6/2014 | Vasquez et al. |
| 2015/0249337 A1 | 9/2015 | Raneri et al. |
| 2016/0202304 A1* | 7/2016 | Beierschmitt ............ H02H 3/20 361/42 |

OTHER PUBLICATIONS

Notification of Transmittal of the International Search Report and the Written Opinion of the International Searching Authority, or the Declaration; Written Opinion of the International Searching Authority and International Search Report for related International Patent Application No. PCT/CA2017/050893, dated Oct. 12, 2017, 13 pages.

* cited by examiner

RAM Data Table

0: Sample Counter
1: BLK Voltage
2: Upper Current
3: Lower Current
4: WHT Current
5: Down Current
6: BLK RMS Voltage
7: Upper RMS Current
8: Lower RMS Current
9: WHT RMS Current
10: Down RMS Current
11: BLK V Peak
12: Upper C Peak
13: Lower C Peak
14: WHT C Peak
15: Down C Peak
16: BLK V Timer
17: Upper Timer
18: Lower Timer
20: Down Timer
30: ADC Timer
31: Samples Permissible
50 to 60: Flags & internal parameters
100 to 199: BLK Voltage Samples
200 to 299: Upper Current Samples
300 to 399: Lower Current Samples
400 to 499: WHT Current Samples
500 to 599: Down Current Samples

FIG. 18

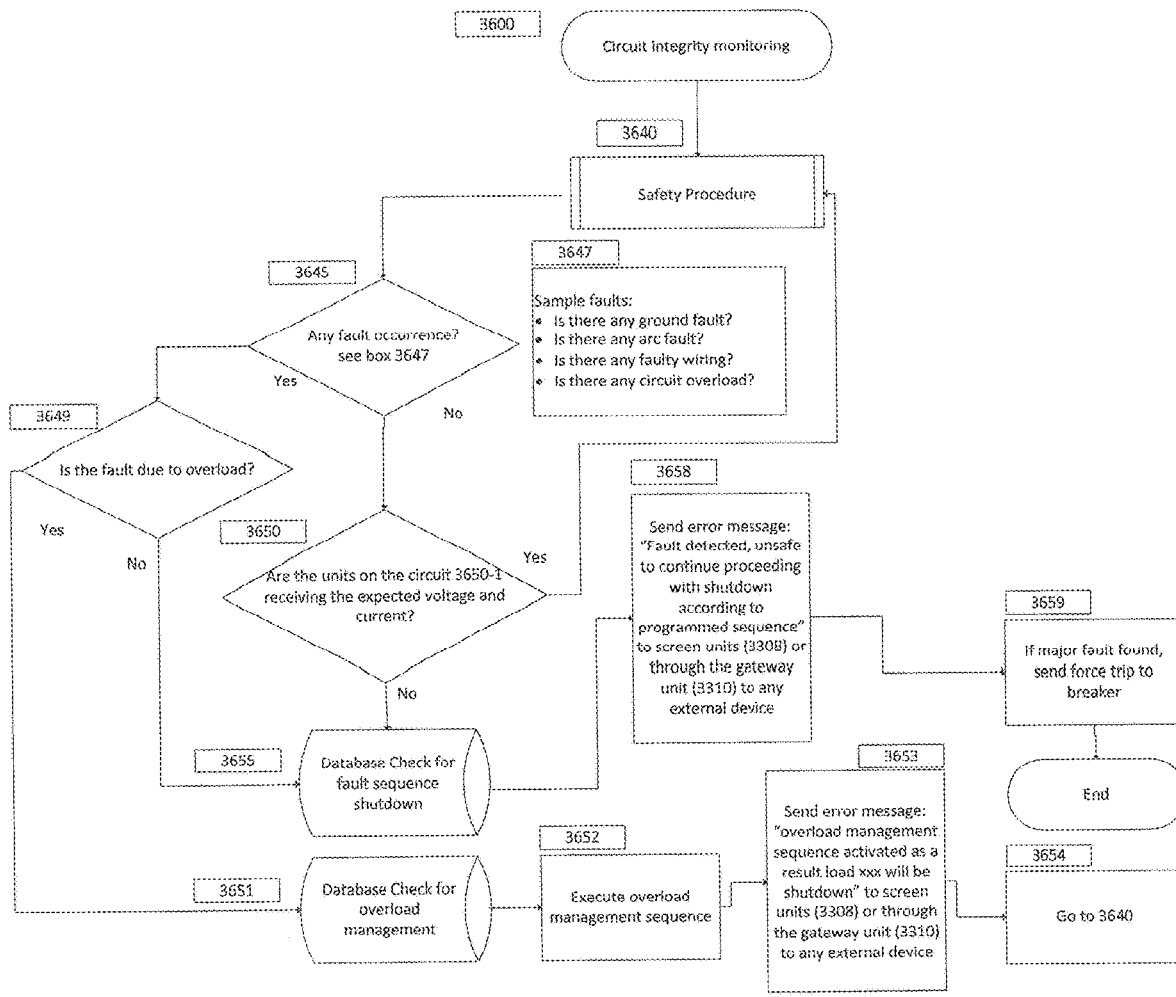
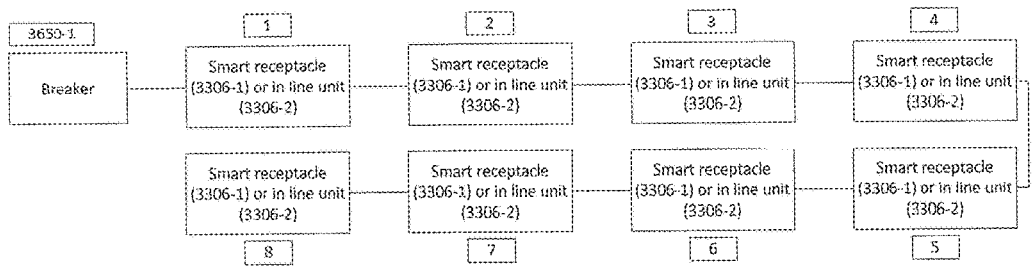
FIG. 36

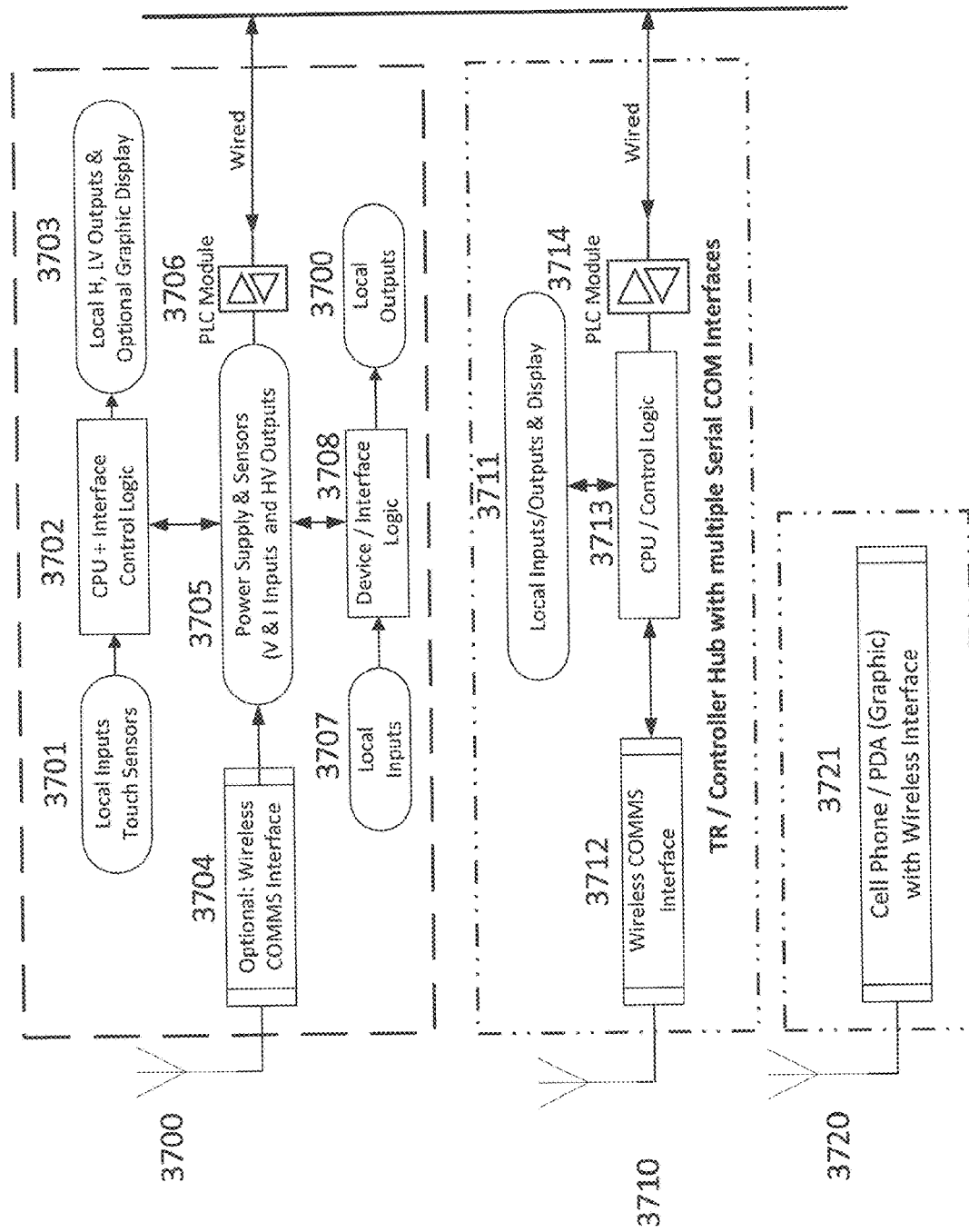
FIG. 37 Modular Product Control & Protection System

Circuit Breaker connection design for power line communication and power control Wire connectors:

Ground ● - 3902
Neutral ● - 3904

SYSTEMS AND METHODS USING ELECTRICAL RECEPTACLES FOR INTEGRATED POWER CONTROL, COMMUNICATION AND MONITORING

CROSS REFERENCE TO RELATED APPLICATIONS

This application is a Continuation-In-Part of U.S. nonprovisional application Ser. No. 15/274,469, filed Sep. 23, 2016, which claims the benefit of priority to U.S. provisional application No. 62/222,904, filed Sep. 24, 2015, U.S. provisional application No. 62/366,910, filed Jul. 26, 2016, and U.S. provisional application No. 62/377,962, filed Aug. 22, 2016. This application also claims the benefit of priority to U.S. provisional application No. 62/377,962, filed Aug. 22, 2016, U.S. provisional application No. 62/490,527, filed Apr. 26, 2017, and U.S. provisional application No. 62/505,434, filed May 12, 2017. The contents of all of these applications are herein incorporated by reference.

TECHNICAL FIELD

This disclosure is related to protection of electrical receptacles, more particularly, to tamper resistance, arc fault protection, ground fault protection, overcurrent protection, and surge suppression for electrical receptacles and similar devices.

BACKGROUND

Conventional tamper resistive (TR) electrical receptacles employ mechanical means such as spring loaded gates, shutters or sliders on each of the outlet sockets to prevent insertion into the outlets of objects other than prongs of electrical plugs. Shutters or gates on each outlet socket must be pushed simultaneously to allow prong entry. Preclusion of foreign objects serves to avoid the likelihood of shock, burn or electrocution.

Conventional TR devices, however, have inherent disadvantages. Excessive force may be required to open the gates, as the plug blades must be perpendicular to the front face of the outlet and well aligned prior to simultaneous opening of the shutters. Often an equivalent force must be exerted on each blade in order to open the gates. These receptacles are thus difficult to use when located close to the floor or behind an article of furniture, especially for elderly and special needs individuals. Once the blades pass a tamper resistance gate and make contact with the sprung outlet terminals, the blades attain power even though they may not be completely inserted. Until the blades are fully removed past the tamper resistant gates or shutters the blades remain energized. Exposed blades prior to complete insertion or removal can result in arcing and electric shock. Moreover, with a live load connected with the TR receptacle, an arc fault circuit interrupter (AFCI) may false trip.

Various conventional circuit interruption devices exist for arc fault protection, ground fault protection, overcurrent protection, and surge suppression. An arc fault is an unintentional electrical discharge in household wiring characterized by low and erratic voltage/current conditions that may ignite combustible materials. A parallel current fault results from direct contact of two wires of opposite polarity. A ground current fault occurs when there is an arc between a wire and ground. A series voltage fault occurs when there is an arc across a break in a single conductor. When a ground or arc fault is detected, power is conventionally terminated on the circuit by an AFCI or ground fault circuit interrupter (GFCI) disconnecting both receptacle outlets and any downstream receptacles.

The devices include transformers that combine magnetic representations of the current in an analog form. Transformer current sensors are limited to a fixed current value and time interval. Upon sensed voltage imbalance of greater than a specified level, such as 6 mV, power is interrupted by electromechanical means, such as solenoid tripping a locking mechanism. The conventional devices lack capability to disconnect outlets individually, independently of other loads connected to the outlet.

A normal arc can occur when a motor starts or a switch is tripped. Only current flow imbalance between the hot and neutral conductors is detected by conventional circuit interrupters. The individual current line difference is not monitored. Conventional circuit interrupters trip frequently by false triggers, as they lack adequate capability to distinguish between normal arcing and unwanted arcing. Transformer current sensors are limited to a fixed current value and time interval. Upon sensed voltage imbalance of greater than a specified level, such as 6 mV, power is interrupted by electromechanical means, such as solenoid tripping a locking mechanism. The conventional devices lack capability to disconnect outlets individually, independently of other loads connected to the outlet.

As indicated above, it may be advantageous to improve the usability and safety of existing conventional receptacles. Existing conventional GFCI and AFCI receptacles do not provide detail about a fault. Currents are not being individually measured. Existing conventional GFCI and AFCI receptacles do not measure, monitor and control current and voltage, and do not protect against overcurrent, under voltage or over voltage at the outlet. It may be advantageous to limit interruption of power to affected outlets, receptacles or devices only on the circuit, based on the type and location of the fault. Overcurrent protection at the outlet is preferable to the protection provided by the circuit breaker as it would avoid delay as well as associated voltage losses associated with wire resistance along increasing wire length. Such voltage losses impede the ability of existing circuit breakers to detect a short circuit at a remote location.

It may be advantageous for overcurrent protection that more effectively distinguishes between short circuits, momentary overcurrent and overload so that false triggering can be avoided. It may be advantageous for a receptacle that can provide local overcurrent protection as well as protection against arc faults and ground faults.

Conventional existing dual amperage receptacles will supply up to 20 A to an appliance rated for 15 A and potentially cause an overcurrent event. It may be advantageous for a dual amperage (e.g. 15 A/20 A) receptacle that restricts amperage supplied to a lower rated plug when a low rated appliance is plugged in.

Some existing standards require the electrician or installer to apply a very conservative load rating when designing the appropriate amperage of the system, for example 80% maximum permissibility as a factor of safety, e.g. maximum 12 A load for a 15 A circuit breaker. This is due to some existing receptacles and breakers being slow to respond, and is required in order to prevent overheating or electrical fires/faults.

Current measurement accuracy is important for effective ground and arc fault detection as well as overcurrent protection. Conventional receptacles are factory calibrated and not re-calibrated by the device once installed. It may be advantageous for continued self-calibration of receptacles and outlets.

If the hot and neutral conductors have been incorrectly wired to the receptacle terminals, electrical equipment plugged into the receptacle can be damaged. Incorrect wiring can cause short circuits with potential to harm the user through shock or fire. It may be advantageous to warn the receptacle installer that the receptacle has been incorrectly wired and to preclude supply power to the load in such event. It may also be advantageous that the outlet not be operational if the black wire and white wire are incorrectly connected to the opposite terminals.

Conventional outlets lack surge protection features, which are typically provided by power strips and power bars. A power strip is inserted into a receptacle after which a sensitive electrical device is plugged into one of the power strip extension receptacles. Use of the power strip tends to lead to a false impression that it is safe to insert additional loads that more than permissible. It may be advantageous for surge protection at the electrical receptacle to avoid use of a dedicated power strip and its attendant disadvantages of power loss and limited life.

It is possible to plug a GFI extension cord or a power strip with a comprised ground prong into a two blade ungrounded receptacle by using a "cheater plug" that allows the ground prong to be inserted without a present ground. It is also possible to replace an ungrounded two blade electrical receptacle with one with ground socket without actually providing a conductor to ground pin. Conventional existing receptacles do not indicate that the supply side safety ground is present or if it is compromised. It may be advantageous to protect the user and the equipment in the event of an incorrect grounding of an electrical receptacle. If no safety-ground is present and a wire conductor is exposed (e.g. has degraded insulation) the user may act as the ground path and receive a shock.

Traditionally, GFCI manual testing is accomplished by injecting a current imbalance. A thoroid type transformer is typically used to measure the current imbalance between neutral and hot conductors. The monitoring circuit indicates that an imbalance has occurred without indicating the amount of imbalance. This method is limited in that the absolute value of current imbalance is not available. There is merely a voltage level that indicates that an imbalance or a fault has occurred. It may be advantageous for more comprehensive self-testing and interruption of supply power to downstream and/or receptacle loads upon fault detection or an internal component fault.

There are some devices that leverage power lines of a home's existing power outlets to provide a communication network, so that a computer located at each outlet can communicate using signals over the power line. These devices often use the hot power line to communicate, and are therefore prone to circuit breaker trips and high voltage fluctuation problems.

Additional difficulties with existing systems may be appreciated in view of the Detailed Description of Example Embodiments, herein below.

SUMMARY OF DISCLOSURE

An example embodiment includes an electrical receptacle having a plug outlet that has first and second contacts for electrical connection to hot and neutral power lines. A controlled state switch, such as a TRIAC, is connected in series relationship with the hot power line. The TRIAC is a solid state switch or controlled state switch. Sensors are coupled to respective plug outlet contacts. Sensor signals are input to a processor having an output coupled to the control terminal of the controlled switch. The processor outputs an activation signal or a deactivation signal to the controlled switch in response to received sensor signals that are indicative of conditions relative to the first and second contacts. When a plug is inserted into the plug outlet, the processor can output the activation signal at or near the zero volt level of the alternating current waveform. If the electrical receptacle is incorrectly wired, the processor will preclude outputting an activation signal.

The receptacle may include a second plug outlet with a second controlled switch connected in series relationship to the hot power line. Sensors are coupled to the contacts of the second plug outlet to supply input to the processor. The processor outputs an activation signal or a deactivation signal to the second controlled switch in response to received sensor signals that are indicative of conditions relative to the contacts of the second plug outlet. The processor signals output to the first and second controlled switches are independent of each other. Deactivation of the receptacle would not affect another receptacle connected across the hot and neutral power lines. Deactivation signals to the controlled switches are applied before a mechanical breaker can be activated. Protection against voltage surge can be provided by a varistor coupled across the hot and neutral lines. The receptacle may include a downstream electrical connection to a second electrical receptacle having a second voltage surge protection circuit, thereby providing a tighter voltage capping tolerance. An interrupt detection circuit is coupled to the contacts of each plug contact and provides an input to the processor. In response to an interrupt detection circuit, the processor outputs a deactivation signal to the respective controlled switch.

A mechanical switch mechanism can be electrically connected to the power source. A detector, such as an optical switch, corresponding to each prong socket contact, is connected to the switch mechanism and the power source when the switch mechanism is activated by insertion of one or more objects in the plug outlet. The processor generates an activation signal to the control terminal of the controlled switch of the prong socket in response to two or more objects being detected by the plurality of detectors within a specified time. The switch mechanism may comprise a mechanical switch, corresponding to each prong socket, which comprises a switch plunger depressed by deflection of a spring contact when an object is inserted in the socket. An indicator may be coupled to the processor to indicate that objects have not been inserted in the plug sockets within the specified time.

The receptacle may include a first circuit board for a hot line prong socket for each plug outlet, with high power control circuitry for electrical connection from the hot line to each hot line prong socket. A second circuit board, spatially separated from the first circuit board includes a neutral line prong socket for each plug outlet, with communication circuitry for electrical connection from a neutral line to each neutral line prong socket. Both circuit boards may be planar and configured parallel to each other.

A current sensor, coupled to the hot power line, can sense ground fault, arc fault or over-current conditions. The current sensor provides input to the processor to output a deactivation signal to the switch control terminal upon indication of such fault conditions. The processor may be mounted on a circuit board housed within the receptacle.

The processor can record a number and intensity of overvoltage occurrences of the receptacle and output an end-of-life indication based on a maximum number threshold or intensity of the overvoltage occurrences. A processor memory is provided to store sampled signals from the power lines. A memory can store criteria for temporal signal imbalance, waveform criteria, minimum values, maximum values, table lookup values, reference datasets and/or Fourier analysis criteria, with which the sampled signals are compared. Such storage may include a minimum monitoring time period of the sampled signals, which is sufficient to detect a possible fault, and a reference lookup table comprising criteria relating to a temporal signal imbalance occurrence of the sampled signals.

The processor can reconstruct waveforms of the sampled signals. From the sampled signals, the processor may determine that a sum of current of all hot lines is not equal to current of a neutral line, or within a set threshold, or determine temporal imbalance from sampled current signals of the hot line. From such determinations the processor can apply a deactivation signal to an associated switch control terminal.

The receptacle may further include a communication subsystem for communicating with a downstream load or a second electrical receptacle that is downstream of the receptacle. Stored current fault criteria may include a threshold for the sum of current of the plug outlet and current downstream of the electrical receptacle. The processor can sample signals at the upstream plug outlet and determine that a fault, such as a ground fault, occurs at the second electrical receptacle. After waiting a specified delay period, the processor may communicate a signal to the downstream receptacle only for deactivation thereof. The specified delay period allows time for the second receptacle to deactivate in response to the fault. A shorter delay period can be imposed for deactivation for a fault at the input of the first receptacle.

A plug orientation sensor may be coupled to the plug contacts. Threshold current fault values for different plug orientations, for example 20 ampere plug orientation and 15 ampere plug orientation, may be stored in processor memory. The processor can determine if the plug outlet has received a plug without a ground prong. The processor, in response to input from the plug orientation sensor, can output a deactivation signal applicable to the respective plug orientation.

The processor is configured to perform self-testing of the electrical receptacle to determine if there is an internal component failure. Self-testing can be performed in an ongoing or periodic routine. The processor is also capable of recalibrating sensors, including voltage and current sensors. Such calibration can be effected by coupling a constant current source to the processor. A deactivation control signal can be generated in response to a fault determination during the self-testing routine.

Another example embodiment is an electrical receptacle, including: a pair of contacts comprising a first contact and a second contact configured for electrical connection to a hot power line and a neutral power line, respectively, and each configured for downstream electrical connection to a respective downstream power line; a controlled state switch connected in series relationship between the hot power line and the first contact; at least one sensor to detect signals indicative of the hot power line; at least one sensor to detect signals indicative of the neutral power line; and a processor configured to control an activation or a deactivation of the controlled state switch in response to the signals detected by at least one of the sensors or in response to receiving a communication.

Another example embodiment is a communication system, comprising: a wired network; an electrical receptacle configured for electrical connection to at least one power line, the electrical receptacle comprising a communication subsystem configured for wired communications over the wired network to communicate with one or more further electrical receptacles; and a gateway for controlling access and/or authentication to the wired communications over the wired network.

Another example embodiment is a communication device, comprising: a first contact configured for electrical connection to a neutral power line, and a second contact configured for electrical connection to ground; a processor; and a communication subsystem configured for wired communications over the neutral power line to the ground.

Another example embodiment is a communication device, comprising: a first contact configured for electrical connection to a first hot power line having a first power line phase, and a second contact configured for electrical connection to a second hot power line having a second power line phase different from the first power line phase; and a processor configured to bridge wired communications between the first power line phase and the second power line phase.

Another example embodiment is an electrical receptacle for connection to power lines, comprising: a first contact and a second contact configured for electrical connection to a hot power line and a neutral power line, respectively; a communication subsystem configured for wired communications with one or more further electrical receptacles; a processor having a packaging with pins, and configured to communicate via the wired communications; a dry contact switch which is configured to, without a voltage reference source, short two pins of the packaging of the processor, the processor responsive to the short to effect, directly by the processor or indirectly via at least one further processor, deactivation of one or more of the further electrical receptacles, by communication over the wired communications.

Another example embodiment is a manual power override system, comprising: a plurality of devices each configured for wired communications and each having a controlled state switch to control hot line power to that individual device, the plurality of devices comprising at least one of or all of: an electrical receptacle having a plug outlet, an in-line electrical receptacle, a load, and/or a circuit breaker panel; a processor having a packaging with pins; a communication subsystem operable by the processor for the wired communications; a dry contact switch which is configured to, without a voltage reference source, short two pins of the packaging of the processor, the processor responsive to the short to effect, directly by the processor or indirectly via at least one further processor, deactivation of the controlled state switch of each of the plurality of devices, by communication over the wired communications.

Another example embodiment is a electrical safety system, comprising: an electrical receptacle, comprising a plug outlet comprising first and second contacts configured for electrical connection to a hot power line and a neutral power line, respectively, a controlled state switch connected to the first contact in series relationship with the hot power line, a processor configured to control an activation or a deactivation of the controlled state switch, the controlled state switch being in a deactivation state as a default when there is a plug in the plug outlet.

In an example embodiment, the electrical safety system further comprises a load, comprising the plug, and a communication subsystem for the load configured to communicate to the communication subsystem for the electrical receptacle that the load is to be powered on.

Another example embodiment is a circuit breaker panel comprising: at least one circuit breaker for connection to at least one hot power line, and each circuit breaker configured for downstream electrical connection to a respective downstream power line; a processor for controlling the at least one circuit breaker; at least one sensor to detect signals indicative of the at least one hot power line; and a communication subsystem for wired communication with devices that are downstream to the at least one circuit breaker; wherein when one of the circuit breakers opens, the processor is configured to output information relating to the signals from the at least one sensor.

Another example embodiment is an appliance or load comprising: a circuit board including a processor configured for power control of the appliance or load, and the processor further configured for power safety of the appliance or load and/or communication with an electrical receptacle.

Another example embodiment is a communication device, comprising: a neutral contact for connection to a neutral power line; a ground contact for connection to ground; and a communication subsystem for communicating over the neutral power line to the ground.

Another example embodiment is a circuit breaker for connection at least one power line, comprising: a breaker for connection to a hot power line of the at least on power line; a processor for controlling the breaker; and a communication subsystem for wired communication over at least one of the power lines.

Additional features of the present disclosure will become readily apparent to those skilled in this art from the following detailed description, wherein only the preferred embodiments are shown and described, simply by way of illustration. As may be realized, there are other and different embodiments, and its several details are capable of modifications in various obvious respects, all without departing from the scope. Accordingly, the drawings and description are to be regarded as illustrative in nature, and not as restrictive.

BRIEF DESCRIPTION OF DRAWINGS

Various exemplary embodiments are illustrated by way of example, and not by way of limitation, in the figures of the accompanying drawings in which like reference numerals refer to similar elements and in which:

FIG. 18 is a data table for the processor of the example embodiment;

FIG. 36 illustrates a processing task flowchart of ongoing monitoring of the integrity of power line circuitry and response to fault(s), and block circuit diagram of an associated system;

FIG. 37 illustrates an example embodiment of microcircuitry that can be integrated into an appliance or another powered device;

DETAILED DESCRIPTION OF EXAMPLE EMBODIMENTS

As understood in the art of electrical circuits and power lines, Black refers to hot or live power line, White refers to neutral power line, and Ground means earth ground. Last mile setups can be referred to as Black, White & Ground; or Live, Neutral and Ground. There is no potential difference (zero volts) between ground and white. The Neutral carries current back from the Black power line. Voltage Black to White potential will show the line voltage e.g., 110 V; and Ground to Black potential will show the line voltage, e.g. 110 V.

Figure 1A:
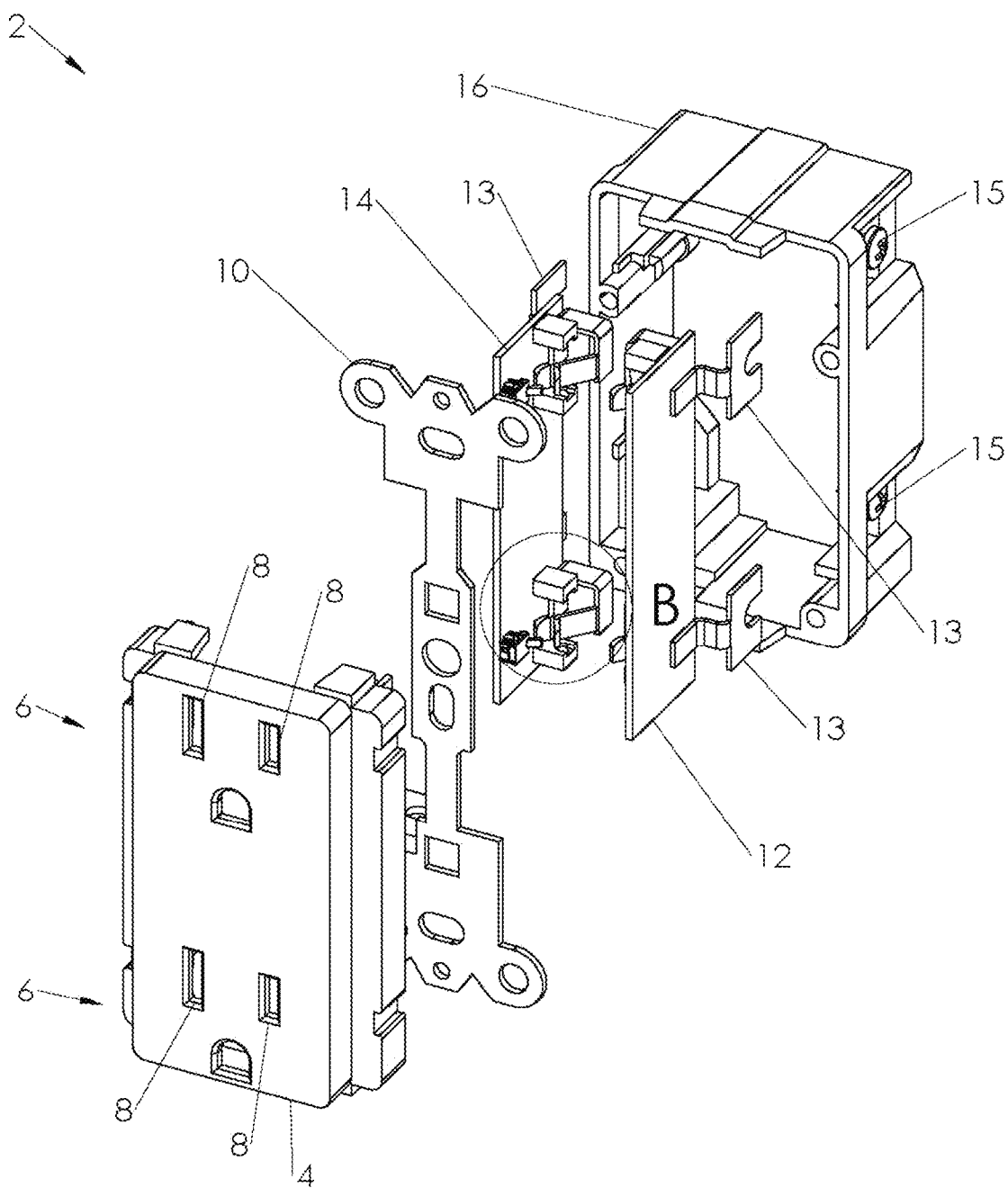
FIG. 1A is an isometric exploded view of a tamper resistant (TR) electrical receptacle in accordance with an example embodiment.
Figure 1B:
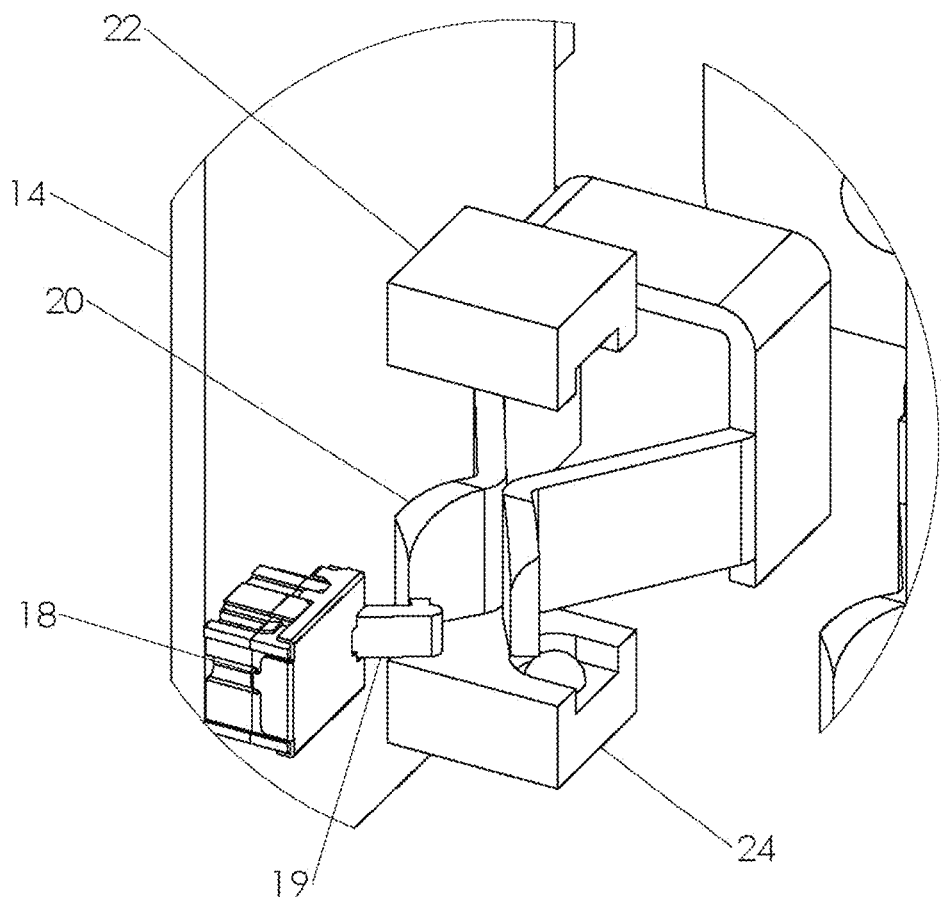
FIG. 1B is a detail view taken from FIG. 1A.
Figure 1C:
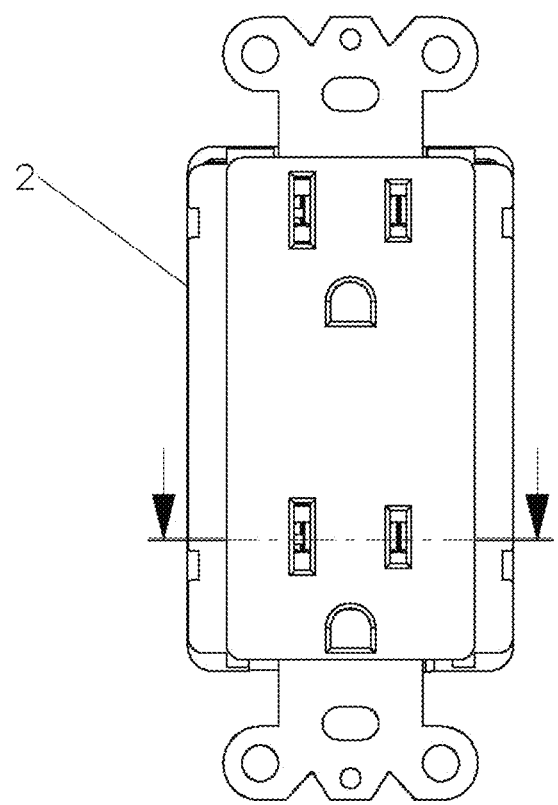
FIG. 1C is a front view of the TR receptacle of FIG. 1A.

FIG. 1C is a front view of receptacle 2 without plug insertion in outlets 6. Referring to the isometric view of FIG. 1A, receptacle 2 includes front housing 4 and rear housing 16. Sockets 8 in front housing 4 serve to receive plug blades for each of two outlets 6. Enclosed within housing 4 and 16 are ground plate 10, neutral circuit board 14, hot circuit board 12 and terminal plates 13. Terminal screws 15 provide fastening to power wires. FIG. 1B is an enlarged detail view of a portion of FIG. 1A. Lever 19 is positioned in the path of a contact 20 of each outlet 6. Detector switch 18, positioned on circuit board 14, can be activated to energize a low voltage circuit by tripping lever 19 when an object has been inserted into the left opening in the socket. An optical sensor, comprising emitter 22 and collector 24 is powered by the low voltage circuit when activated. Two optical sensors are for provided for each outlet 6. The optical sensors are coupled to control circuitry responsive to signals received therefrom. The circuitry permits connection between power terminals 13 and contacts 20 of outlet 6 if optical sensor signals are indicative of non-tamper conditions. Control circuitry for the circuit boards is shown in detail in the circuit diagrams of FIGS. 2, 4, 6A, 6B, 7A, 7B, 7C, and 8.

Figure 1D:
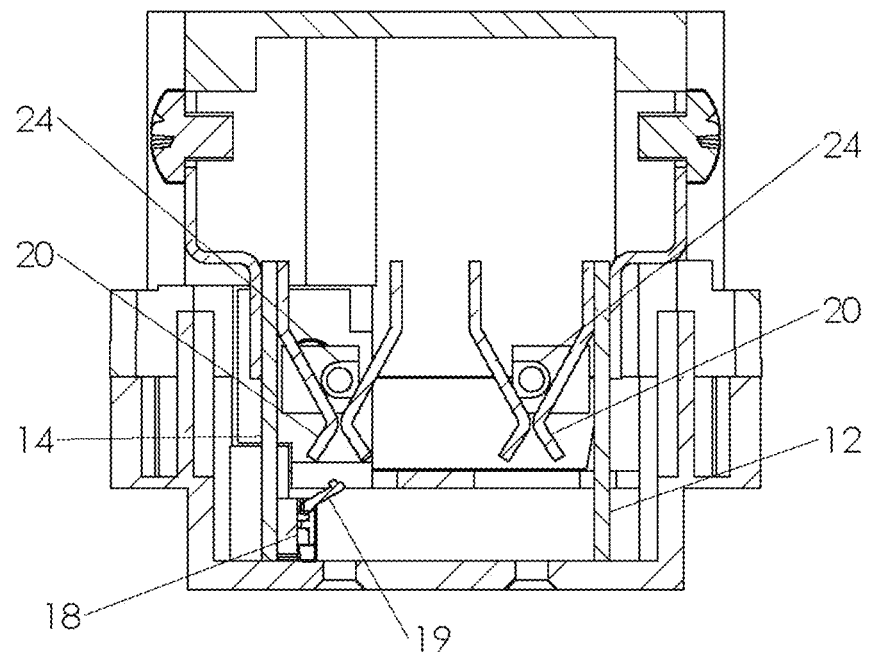
FIG. 1D is a section view taken from FIG. 1C.
Figure 1E:
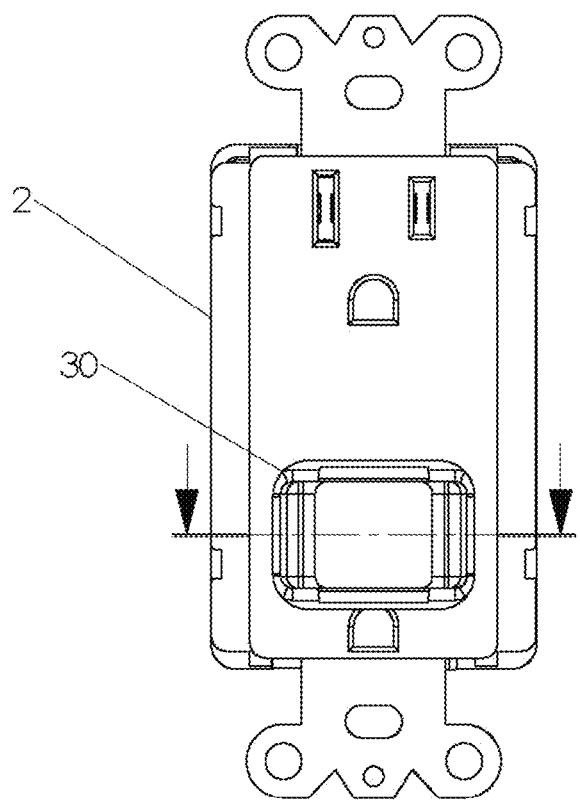
FIG. 1E is a front view of TR receptacle of FIG. 1C shown with a plug inserted.
Figure 1F:
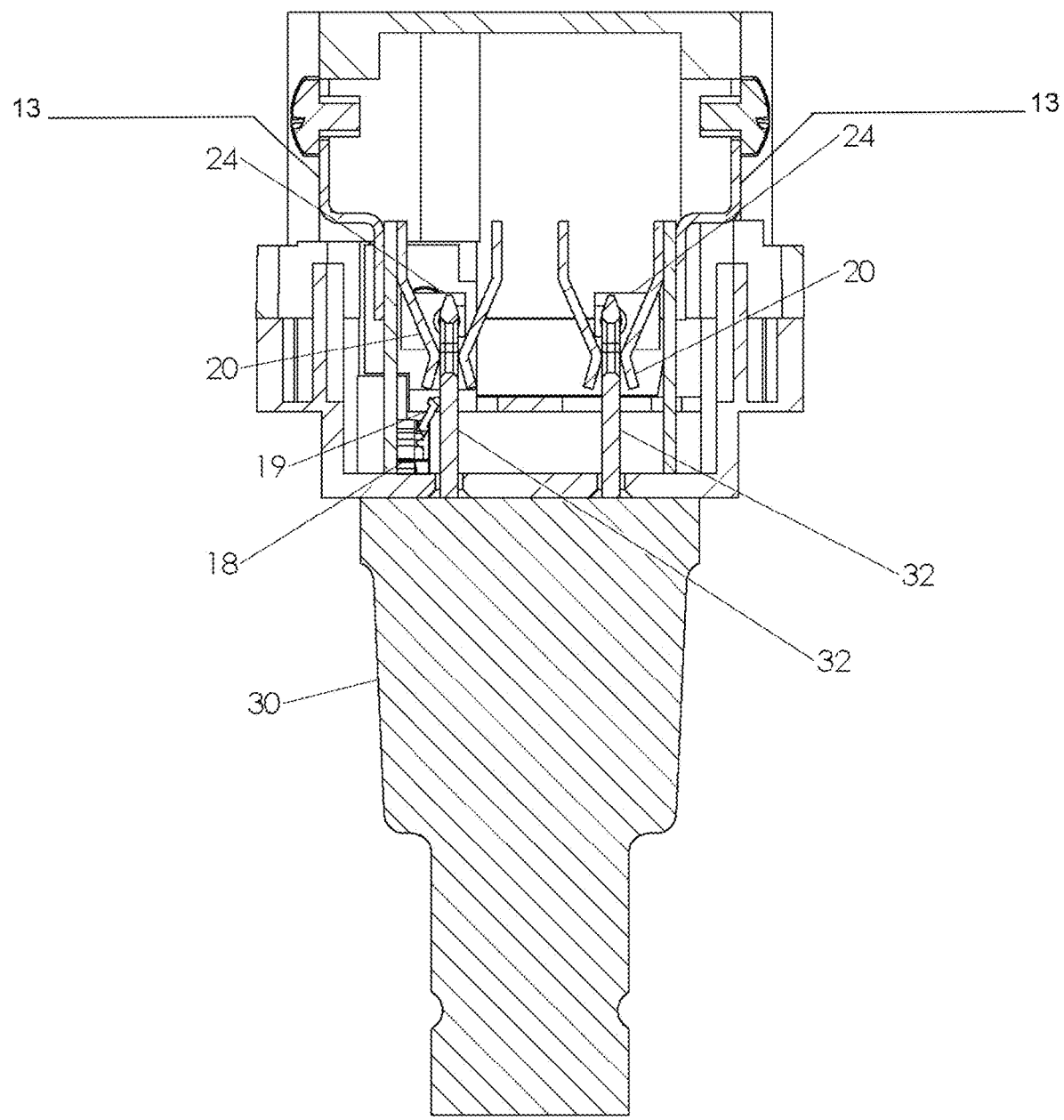
FIG. 1F is a section view taken from FIG. 1E.

FIG. 1D is a section view taken from FIG. 1C. FIG. 1E is a front view of receptacle 2, shown with plug prong blades 32, inserted in an outlet 6. FIG. 1F is a section view taken from FIG. 1E. Referring to FIG. 1D, as no object has been inserted in the socket, lever 19 has not moved to activate detector switch 18. The low voltage circuit portion to which the optical sensor connected thus does not provide power to emitter 22. Collector 24 does not produce output signals. No connection is made between terminals 13 and contacts 20.

Referring to FIG. 1F, detector switch 18 lever arm 19 has been tripped by blade 32 inserted in socket 8. Contacts 20 are sprung open by the application of force on blades 32 of plug 30. Power is applied to the low voltage circuit by virtue of tripped detector switch 18. The low voltage power remains applied when lever 19 is in the tripped position, i.e., whenever an object has been inserted in socket 8. Emitters 22 above each socket are active to produce light. Each collector produces an output signal when exposed to light produced by the corresponding emitter. As shown, collectors 24 beneath blades 32 do not produce output signals because the prong blades located in the path between emitters and collectors have blocked the light transmission.

In operation, when a plug or foreign object is inserted in the left socket 8 of outlet 6, lever 19 is moved to the tripped position before the inserted object makes contact with the socket contacts 20. During this time, power is applied to the low voltage circuit and to emitters 22 of the respective outlet 6. As object insertion has not yet reached contacts 20, each collector 24 receives emitted light and produces an output signal to the control circuitry. The control circuitry will not permit connection between power terminals 13 and contacts 20 of outlet 6 if a light output signal is received from either collector. As insertion of the plug advances to socket contacts 20, as depicted in FIG. 1F, emitted light from both emitters is blocked and no signal is produced by collectors 24.

The control circuitry is capable of determining the time difference, if any, between termination of light signals received from both collectors 24. If the time difference is determined to be near simultaneous, for example within twenty five milliseconds, the control circuity will effect connection of contacts 20 to terminals 13. That is, simultaneous or near simultaneous sensing of insertion at both sockets is indicative of non-tampering. If a foreign object is attempted to be inserted into a socket, or if insertion of the plug cannot be completed to the contacts 20, collector output signals preclude connection of the contacts to the terminals 13. Connection of the sockets 6 of the receptacle are those controlled independently of each other.

Figure 2:
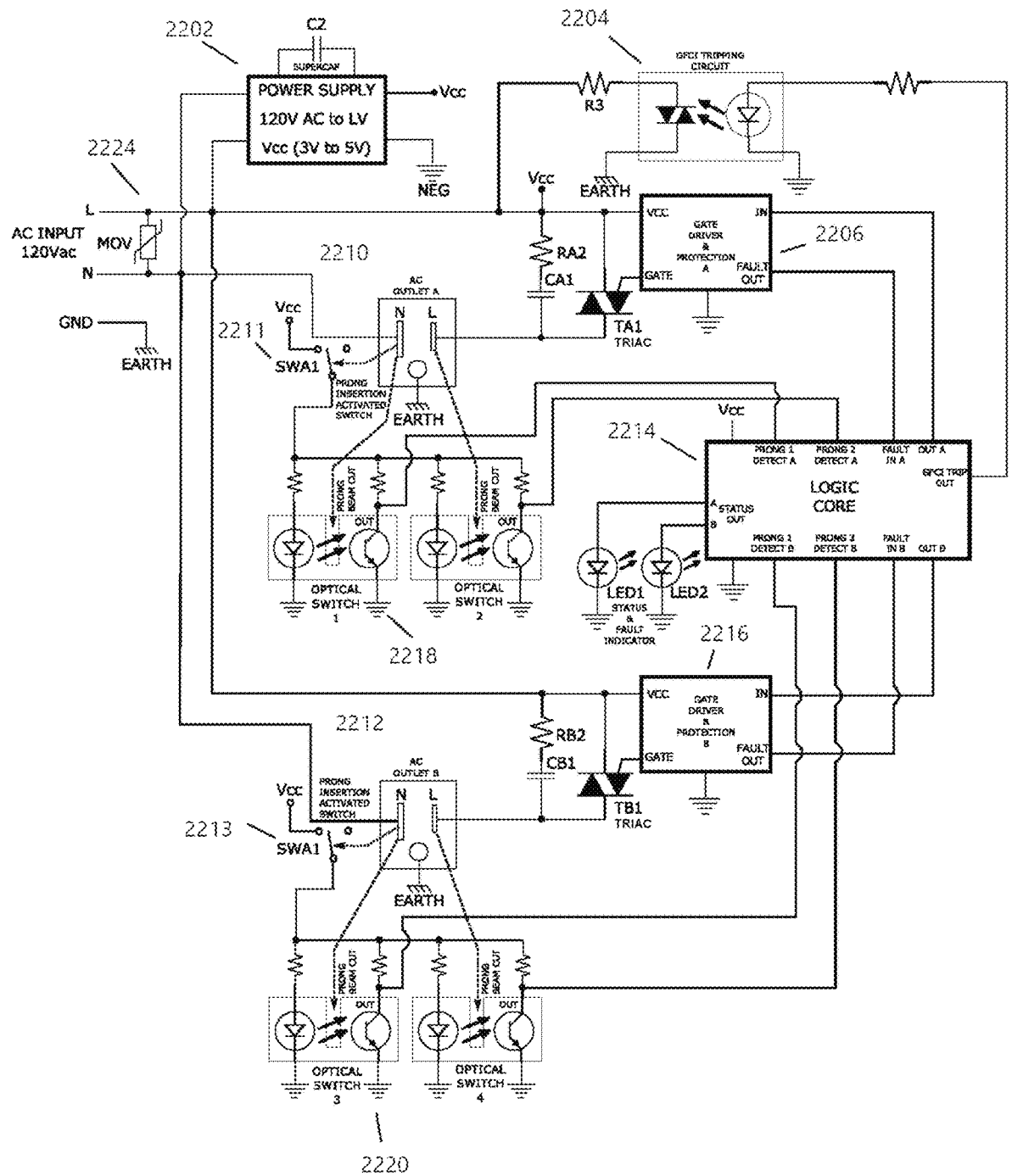
FIG. 2 is a circuit diagram for the example embodiment of FIG. 1A, utilizing GFI protection.

Referring to the circuit diagram of FIG. 2, an N contact of each outlet 2210 and 2212 of the receptacle is directly connected to the N (neutral) terminal of the alternating current source. The L contact of each outlet 2210 and 2212 is coupled to the L (hot) terminal of the alternating current source through a respective TRIAC (TA1, TB1). Metal oxide varistor (MOV) 2224 is connected across the L and N terminals to protect against overvoltage. Driver circuit 2206 is coupled to the control terminal of the TRIAC of outlet 2210. Driver circuit 2216 is coupled to the control terminal of the TRIAC of outlet 2212. Power supply 2202, connected across the L and N terminals, corresponds to power supply 18 of FIG. 1B. Optical sensor arrangement 2218 contains optical emitters and receivers that correspond to emitter 22 and 24 of FIG. 1B. Switch 2211, which corresponds to switch 19 of FIG. 1B, is connected between optical sensor arrangement 2218 and power supply 2202 when an object has been inserted into the socket of outlet 2210. Optical sensor arrangement 2220 contains optical emitters and receivers that correspond to emitter 22 and 24 of FIG. 1B. Switch 2213, which corresponds to switch 19 of FIG. 1B, is connected between optical sensor arrangement 2220 and power supply 2202 when an object has been inserted into the socket of outlet 2212.

Figure 3:
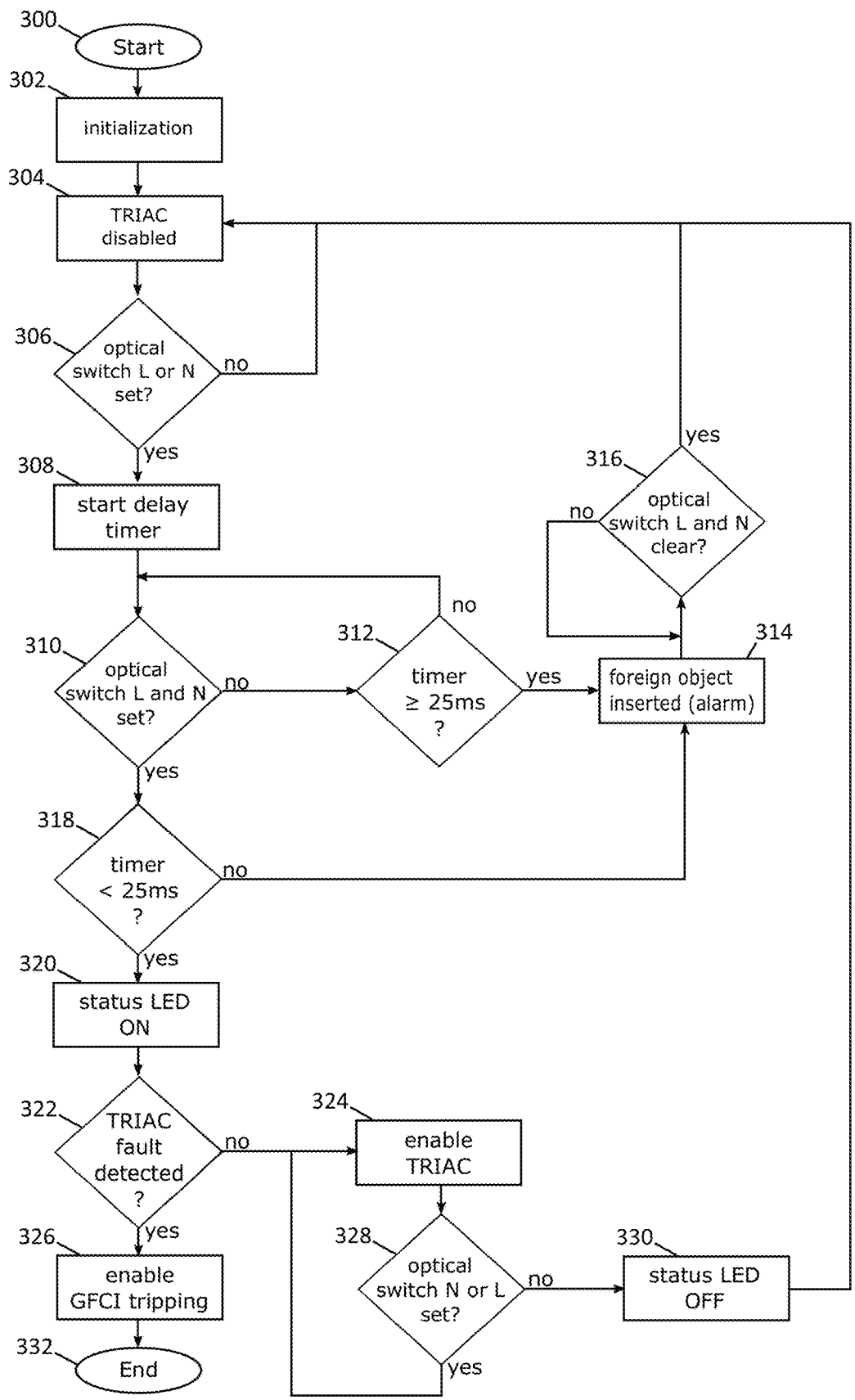
FIG. 3 is a flowchart for operation of the circuit of FIG. 2.

Logic core 2214 (aka a processor) comprises inputs connected to receive signals output from optical sensors 2218 and 2220. Outputs of logic core processor are connected respectively to driver circuits 2206 and 2216. Outputs of processor 2214 are connected to LED1 and LED2 for energization thereof to indicate that objects have not been inserted in the respective plug sockets within a specified time. Processor 2214 is further connected to ground fault injector 2204 to generate a trip output for a current imbalance. The disclosed logic circuitry may include an AND gate or the like to receive signals from the optical sensors FIG. 3 is a flow chart of operation for the circuit of FIG. 2. At step 300, operation is started. Initialization proceeds at step 302 with power supply 2202 connected to the alternating current terminals. At step 304, there has been no activation of the TRIAC of a respective outlet. Step 306 is a decision block as to whether switch 2211 or 2213 has been tripped to supply power to the corresponding optical switches and whether the L or N socket optical switch has been initially set by blockage of emitted light. If so, a delay timer is started at step 308. Decision block 310 determines whether both L and N socket optical switches are set by blockage of emitted light. If the outcome of step 310 is positive, decision block 318 determines whether the positive output of step 310 has occurred within 25 ms. If the outcome of step 318 is positive, an ON status LED is activated at step 320. If there has been no fault detected at step 322, the respective TRIAC is activated at step 324 and activation thereof is continued as long as both L and N optical switches are set by emitted light blockage, as determined in step 328. A negative outcome of step 328 results in turning off the status LED at step 330 and flow reverts to step 304, in which the TRIAC is disabled.

If the outcome at step 310 is negative, the timer continues until it is determined that 25 ms has expired at step 312. A positive outcome of step 312 is indicative that a foreign object has been inserted in a respective socket to initiate an alarm in step 314. Decision block step 316 determines whether optical switches for both L and N sockets have cleared. When the outcome of step 316 is positive, flow reverts to step 304. The 25 ms delay period for TRIAC activation is intended to allow for slight variations in plug blade length within manufacturing tolerances or slight misalignment of the blades in the sockets during insertion, while not being long enough to permit connection to the power source by insertion of distinct foreign objects.

Figure 4:
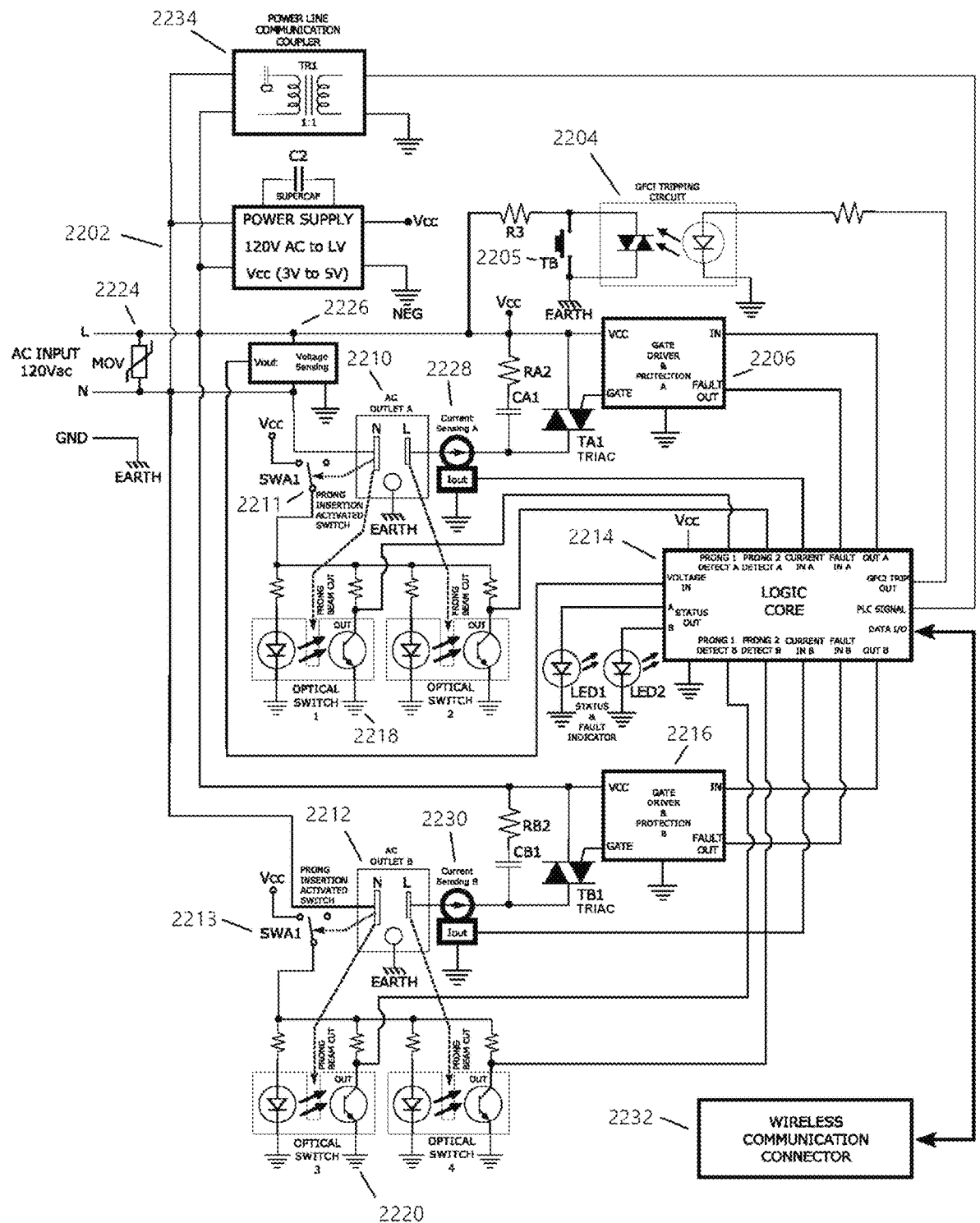
FIG. 4 is a more detailed circuit diagram of the example embodiment of FIG. 1A, including GFI tester and sensing, and communications module.

FIG. 4 is a more detailed circuit diagram, illustrating enhancements to FIG. 2, for operation of the embodiment of FIGS. 1A-1F. Current sensor 2228 is coupled to the hot line current path for the socket of outlet 2210. The output of current sensor 2228 is connected to an input of processor logic core 2214. Current sensor 2230 is coupled to the hot line current path for the socket outlet 2212. Wireless communication module 2232 is connected to a data input/output terminal of processor logic core 2214. Protocol for wireless communications may include Wifi, Zigbee or other protocols. Power line communications module 2234 is coupled between the alternating current source and a signal input of logic core 2214. The processor logic core 2214 is also therefore enabled for wired communication. Manual test button 2205 may be used for GFCI testing.

Figure 5A:
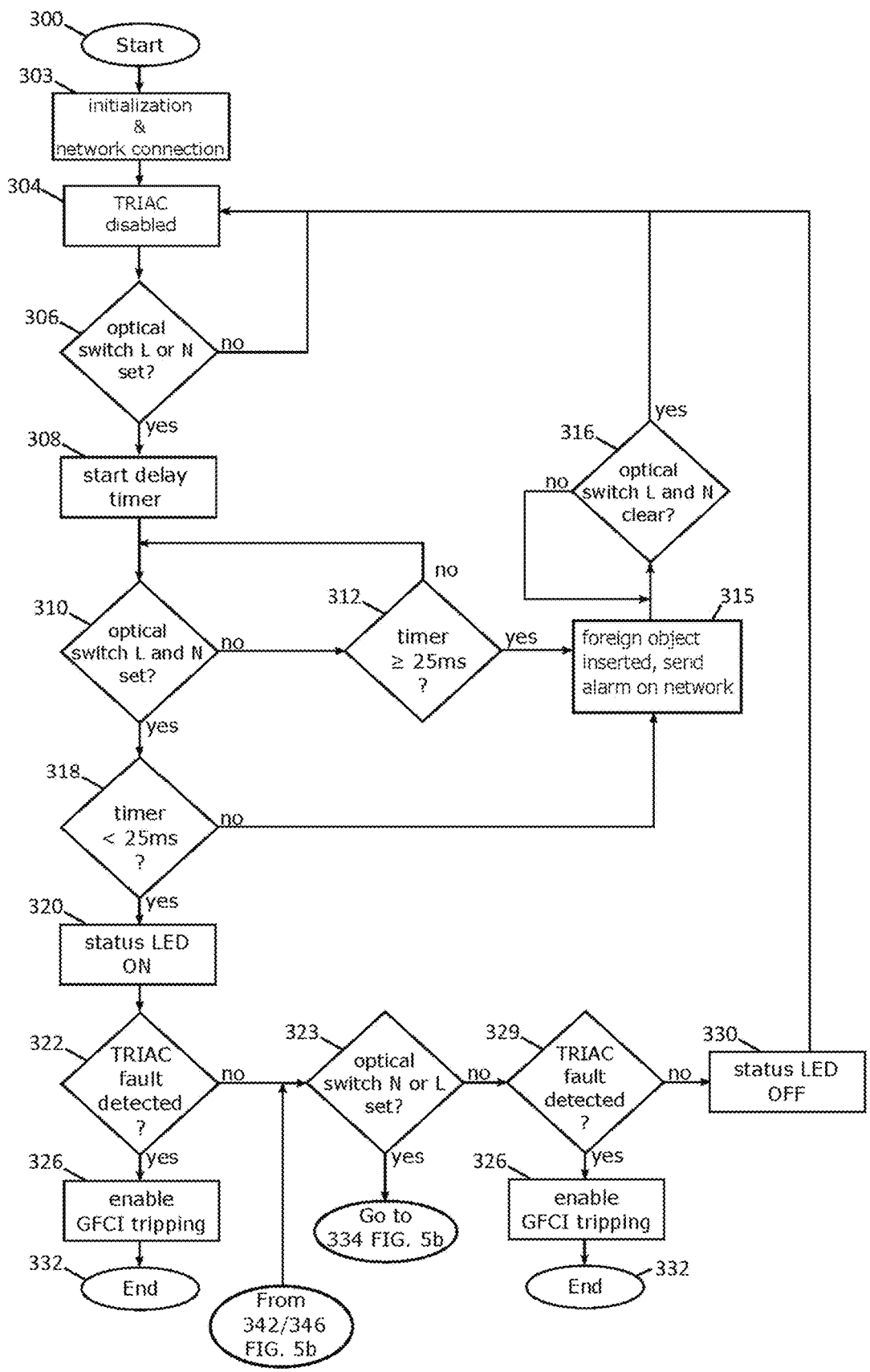
FIGS. 5A and 5B are a flowchart for operation of the circuit of FIG. 4.
Figure 5B:
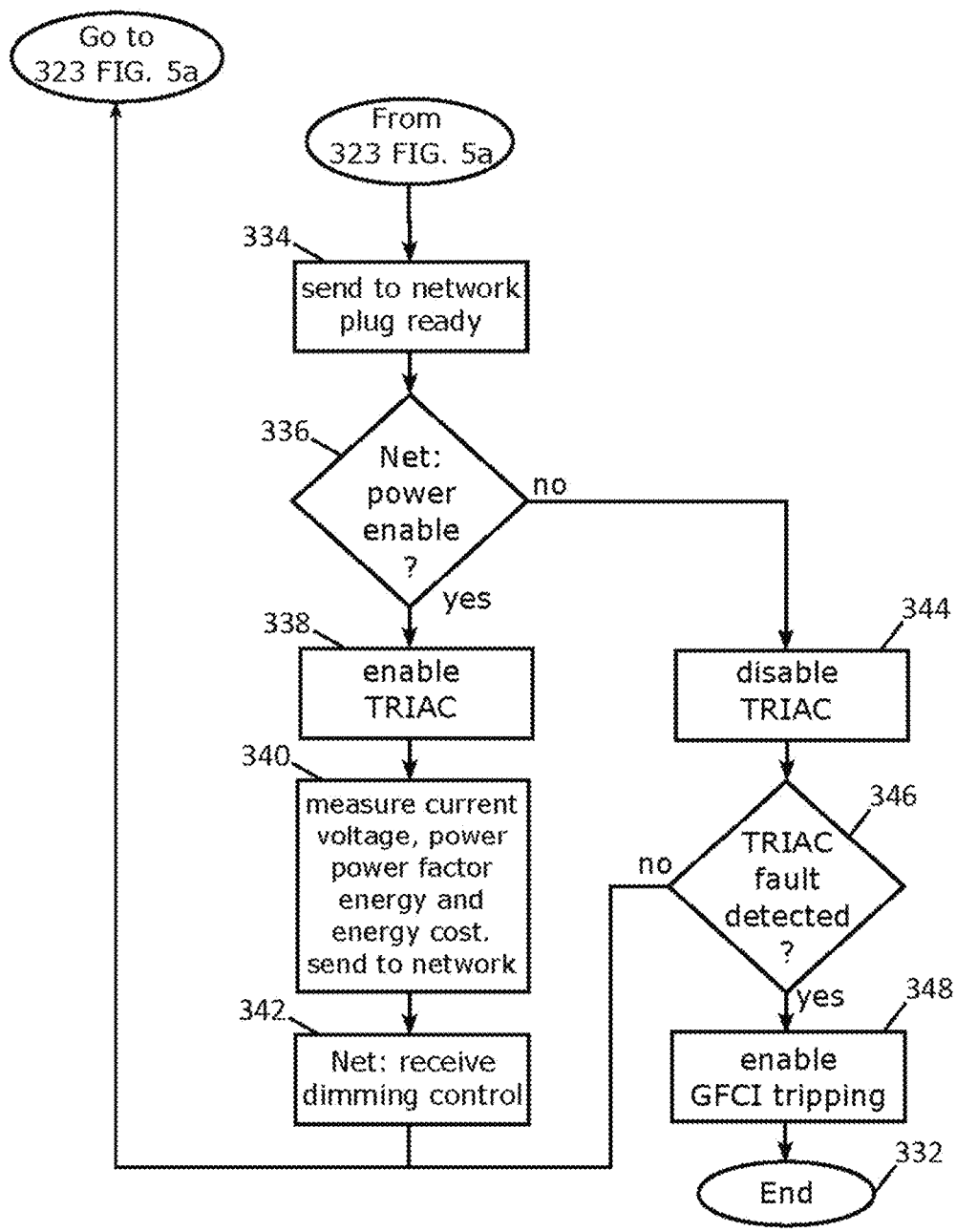

FIGS. 5A and 5B together form a flow chart for operation of the circuit of FIG. 4. Elements of FIGS. 5A and 5B that are in common with those of FIG. 3 contain the same reference numerals and the description thereof can be referred to the description of FIG. 3. FIG. 5A differs from FIG. 3 in the respect that the decision branch from decision block 322 has changed from step 324 and expanded to decision blocks 323 and 329. Steps are provided for related communications beginning at step 334. At step 334 communication is sent to the network that the plug has been successfully inserted. Decision block 336 establishes whether the network power should be enabled. If so, steps 338, 340 and 342 are processes related to power measurement and dimming. If not, steps 344, 346 and 348 deal with disabling the Triac and any resulting Triac faults (decision block 346). Upon a fault detection, GFI tripping is enabled in step 348. In an example embodiment, dimming is achieved by cycle stealing performed by the processor onto the Triac, for example. For example, this can be done by removing partial or whole cycles by controlling the Triac.

Figure 6A:
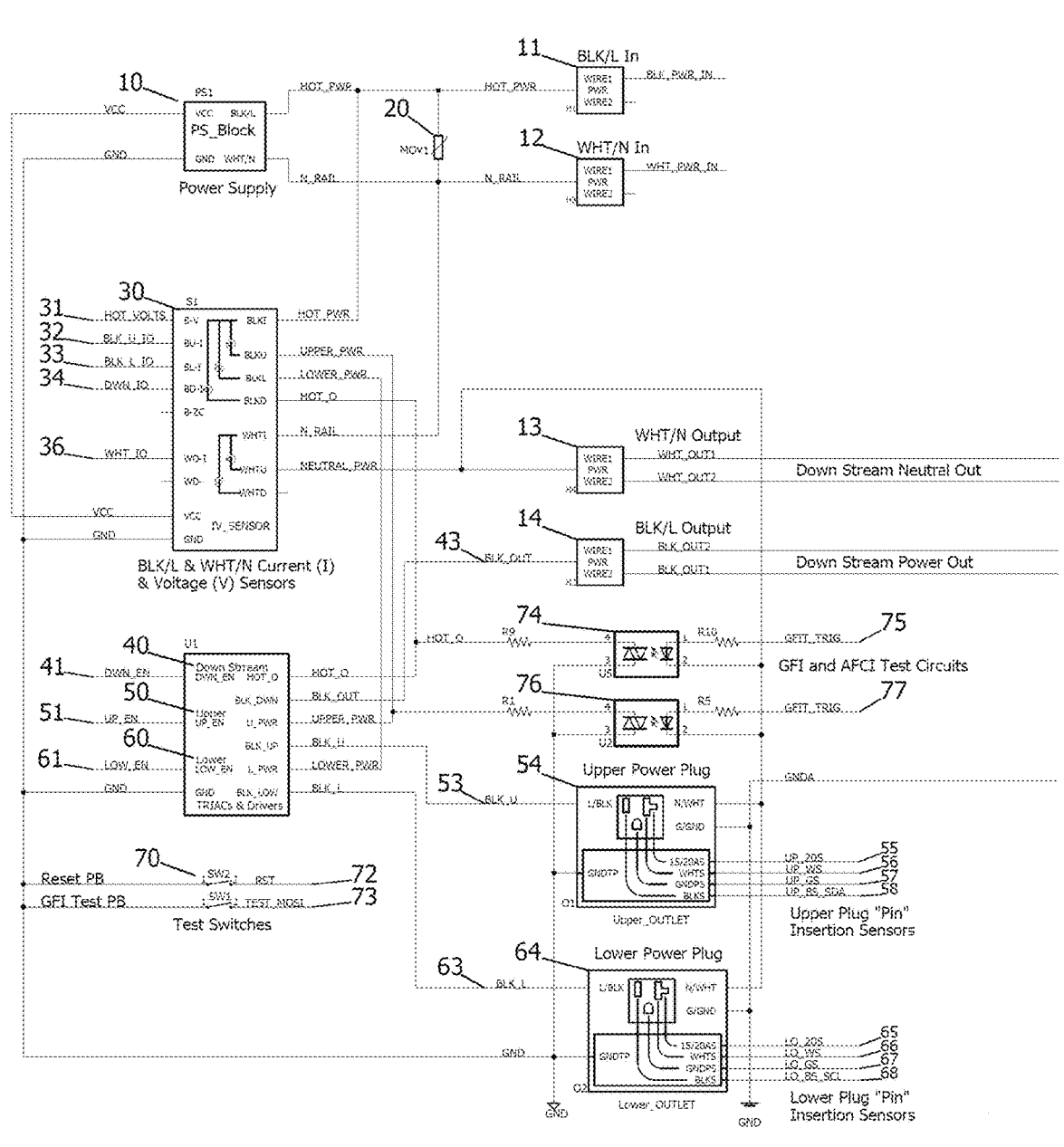
FIGS. 6A, 6B, 7A, 7B, 7C together comprise a circuit diagram for AFCI and GFCI and surge protection, taken with the circuit diagram of FIG. 4.
Figure 6B:
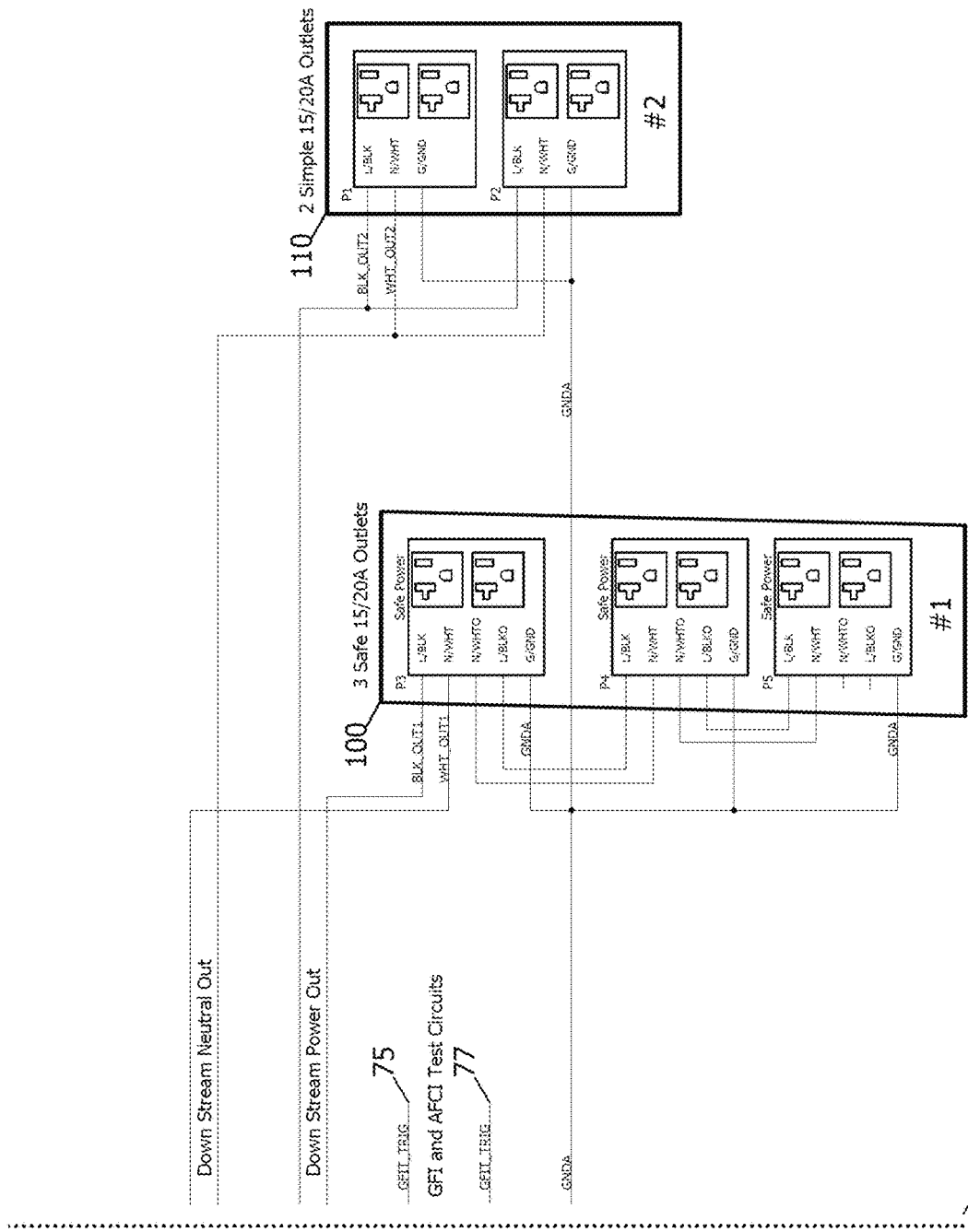
Figure 7A:
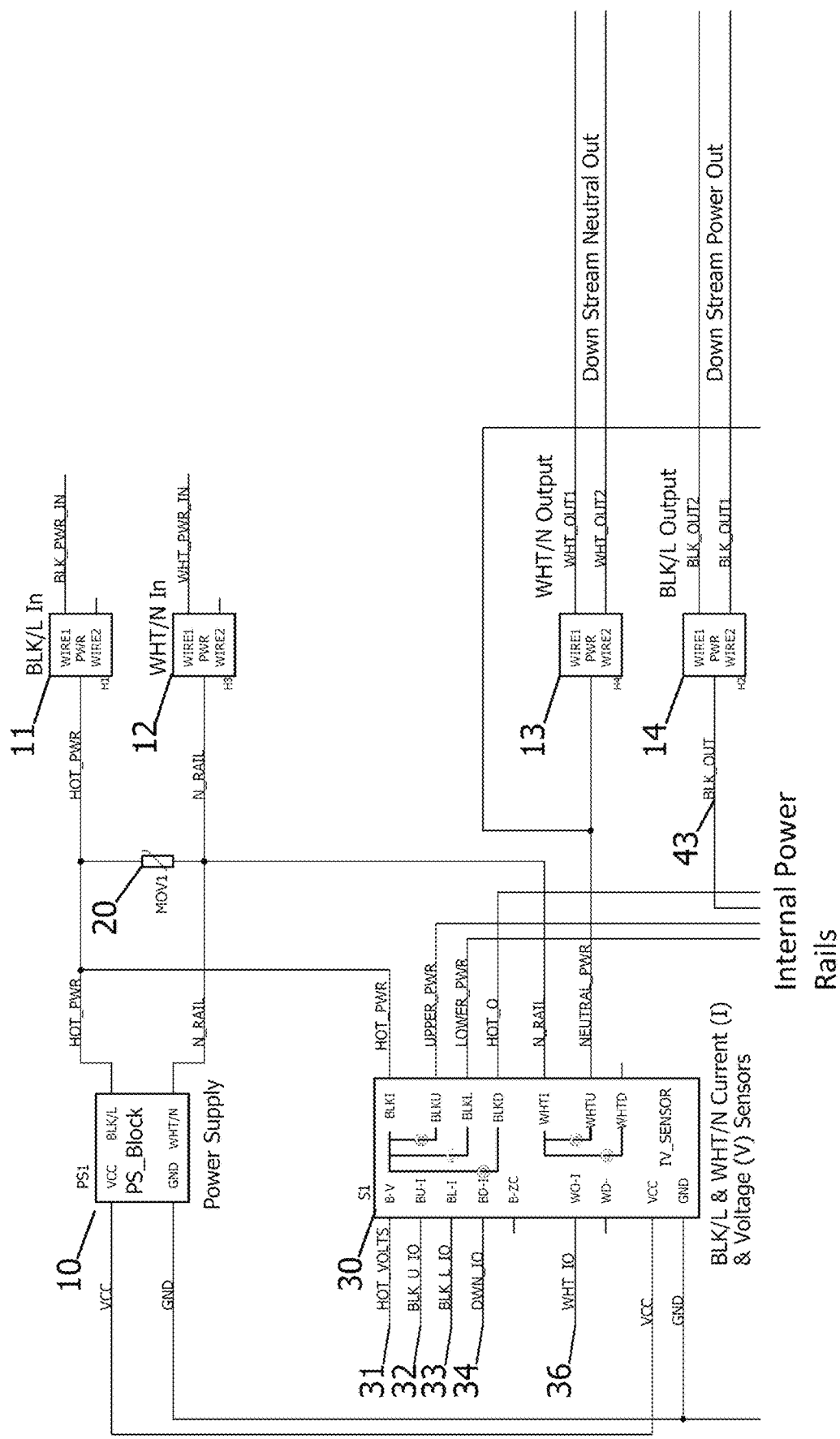

FIGS. 6A and 6B are a more detailed circuit representation of FIGS. 2 and 4, including a plurality of receptacles in a system for protection against AFCI, GFCI and surge faults. For ease of clarity, FIGS. 6A and 6B are divided into three sections, reproduced in FIGS. 7A, 7B and 7C. Referring to FIG. 7A, power input lines are connected to hot power terminal 11 and neutral power terminal 12. MOV 20 is connected across the hot power and neutral power lines to protect against overvoltage. Power supply block 10, fed from the hot and neutral power lines, provides low voltage power to the processor logic circuitry. The processor circuit may comprise a microcontroller 80, shown in detail in FIG. 8. Microcontroller 80 may contain a broadband noise filter routine such as fast Fourier transform.

Figure 7B:
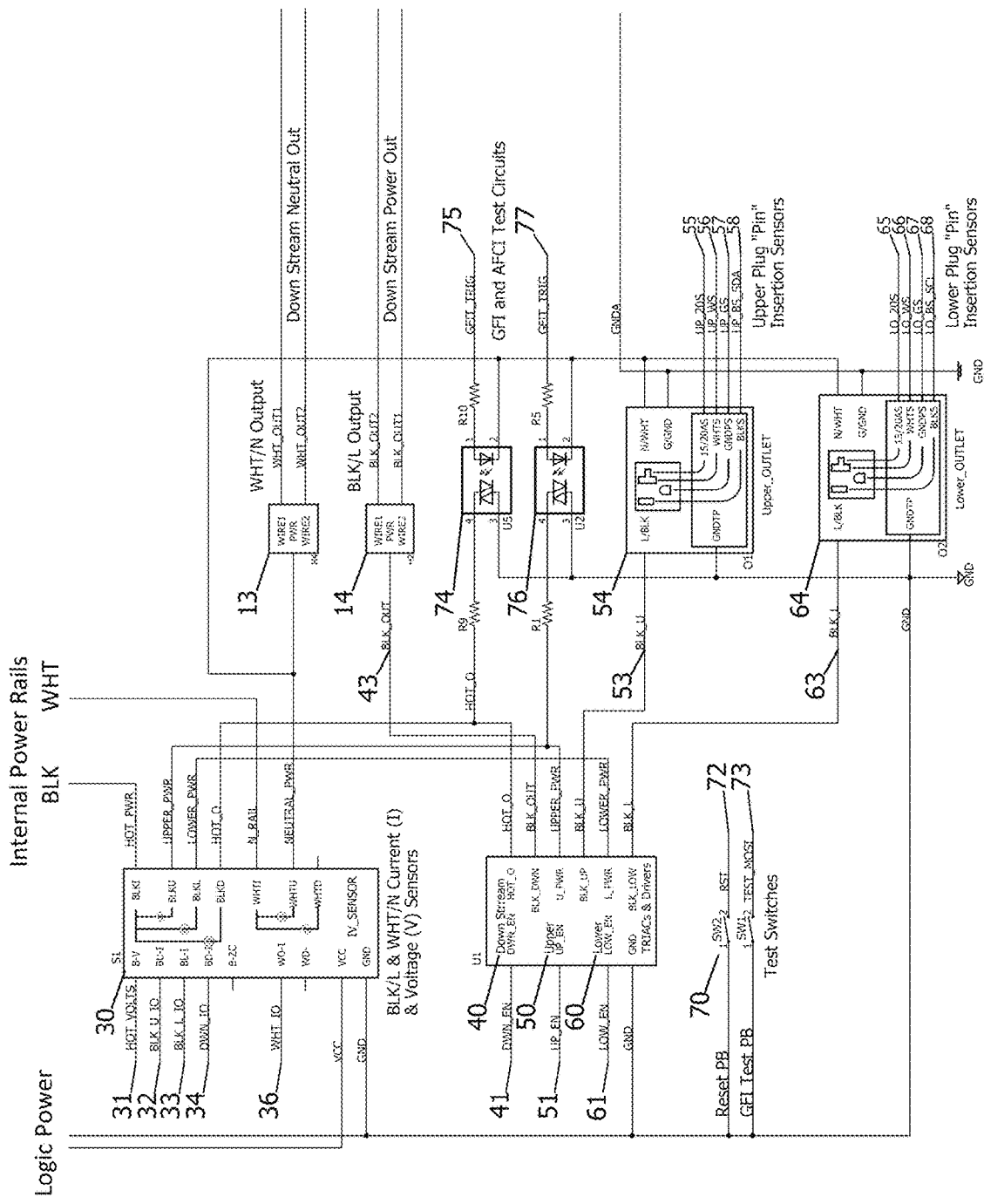

The output of power supply block 10 is coupled to current and voltage sensors block 30, and TRIAC drive blocks 40, 50 and 60 of the processor circuit. Block 30 may represent a plurality of sensors, which are not shown here for clarity of description. Blocks 50 and 60 are illustrated in FIG. 7B. Activation of TRIAC 43 by drive block 40 connects hot and neutral line power to terminals 13 and 14, which connect to three series outlets 100 and two parallel outlets 110 that are downstream, shown in FIG. 7C. Downstream may also include a load to be controlled and monitored, such as a light receptacle (not shown here). Activation of TRIAC 53 by drive block 50 connects the hot line to upper outlet 54, shown in FIG. 7B. Activation of TRIAC 63 by drive block 60 connects the hot line to lower outlet 64. GFI test push button switch SW1 and reset push button switch SW2 are connected between the output of supply block 10 and the processor circuit. GFI and AFCI test circuits 74 and 76 receive outputs 75 and 77, respectively as shown in FIG. 7B, from the microcontroller 80, shown in FIG. 8. All inputs and outputs shown in FIGS. 7A, 7B and 7C relate to the respective terminals of similar references in the processor of FIG. 8.

Figure 7C:
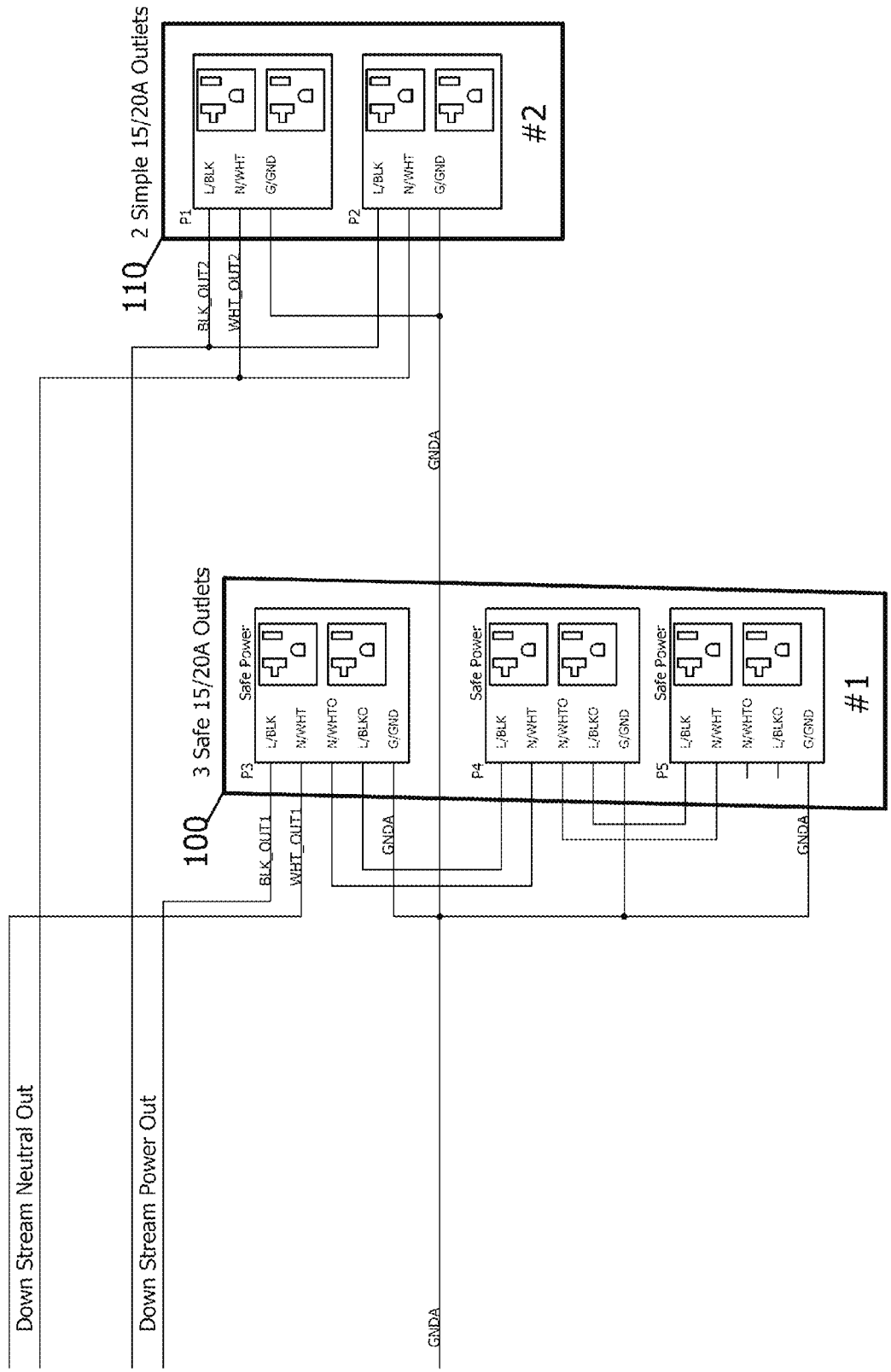

Accordingly, in another example embodiment, it would be apparent that the receptacle of FIGS. 7A, 7B and 7C can be used as an in-line connector which is serially connected to upstream power lines, providing control, safety, and monitoring of downstream loads and/or downstream receptacle outlets. Instead of the form of a plug outlet being the output of line power to a load, the receptacle comprises in-line connectors/contacts as the output. Accordingly, in an example embodiment, the receptacle itself may not require a plug outlet, but rather can be used for downstream loads and/or downstream receptacle outlets.

Each outlet 54, 64 of the receptacle has tamper resistance that restricts energizing of the sprung contacts until the blades of an electrical plug are completely inserted into the receptacle. Multiple sensor inputs 55, 56, 57, 58, 65, 66, 67, 68 for the plug blades of outlets 54 and 64 are shown in FIG. 7B. The sensors sense the arrival of the blades. If the arrivals are within a specified period of time, the applicable outlet 54, 64 is energized. The device will only turn ON power to the particular outlet, when it detects that the two power plug pin detection circuits have detected that the BLK & WHT plug pins have been inserted. The circuits provide a logic signal which operates as an interrupt to the microcontroller, so it will turn ON or OFF the TRIAC driver circuit (logic Output signal) 41, 51, 61. There is also a respective TRIAC fault signal which is provided for each power TRIAC. For example, the particular outlet 54, 64 is not provided with line power until a specified length, e.g. ⅞ inches (2.2 cm), of the bottom of the plug is inserted.

Upstream series arc faults can be detected by monitoring voltage 31. During a series arc fault the voltage on the conductor tends to be erratic and does not follow sine wave attributes. By monitoring current 30 on the hot and neutral conductors and comparing it to the ground conductor, the presence of an arc fault is detected and the severity of the arc fault is reduced by disabling the receptacle outlets 54, 64 and/or the downstream loads 14 to minimize current flow. Different arc fault types have different timing profiles. The logic processing can compare sensed data to reference data that can be stored in a table.

As noted above, FIG. 8 sets forth in detail the input and output pins of the microcontroller 80. Included in the receptacle with microcontroller 80 is communication module 90. Communication terminals 91 and 92 are connected to corresponding pins of microcontroller 80. The antenna provides communication with circuit receptacles to allow monitoring of the current draw of the circuit. Information from monitored voltage and current can be analyzed, accessed, reported and/or acted upon. Power to and from any outlet can be turned on and/or off by external commands to the communications module. A buffer interface, not shown, can be added to communications lines 91 and 92. Data from microcontroller 80 can be collected by an external software application to provide external controls such as dimming, turning power on/off, controlling power outputs, or for obtaining information on power outputs.

In an example embodiment, a dry contact switch can be implemented which shorts two pins on any one of the microcontroller 80, the Serial Port JP1, and/or the communication module 90, therefore providing a manually operated input command that can be processed by device, e.g. the microcontroller 80. The microcontroller 80 can be configured to implement a suitable task or series of tasks in response to activation of the dry contact switch. A dry contact switch does not require an active voltage source, but rather the applicable processor can be configured to detect a manually-triggered short between two of its pins.

Figure 9:
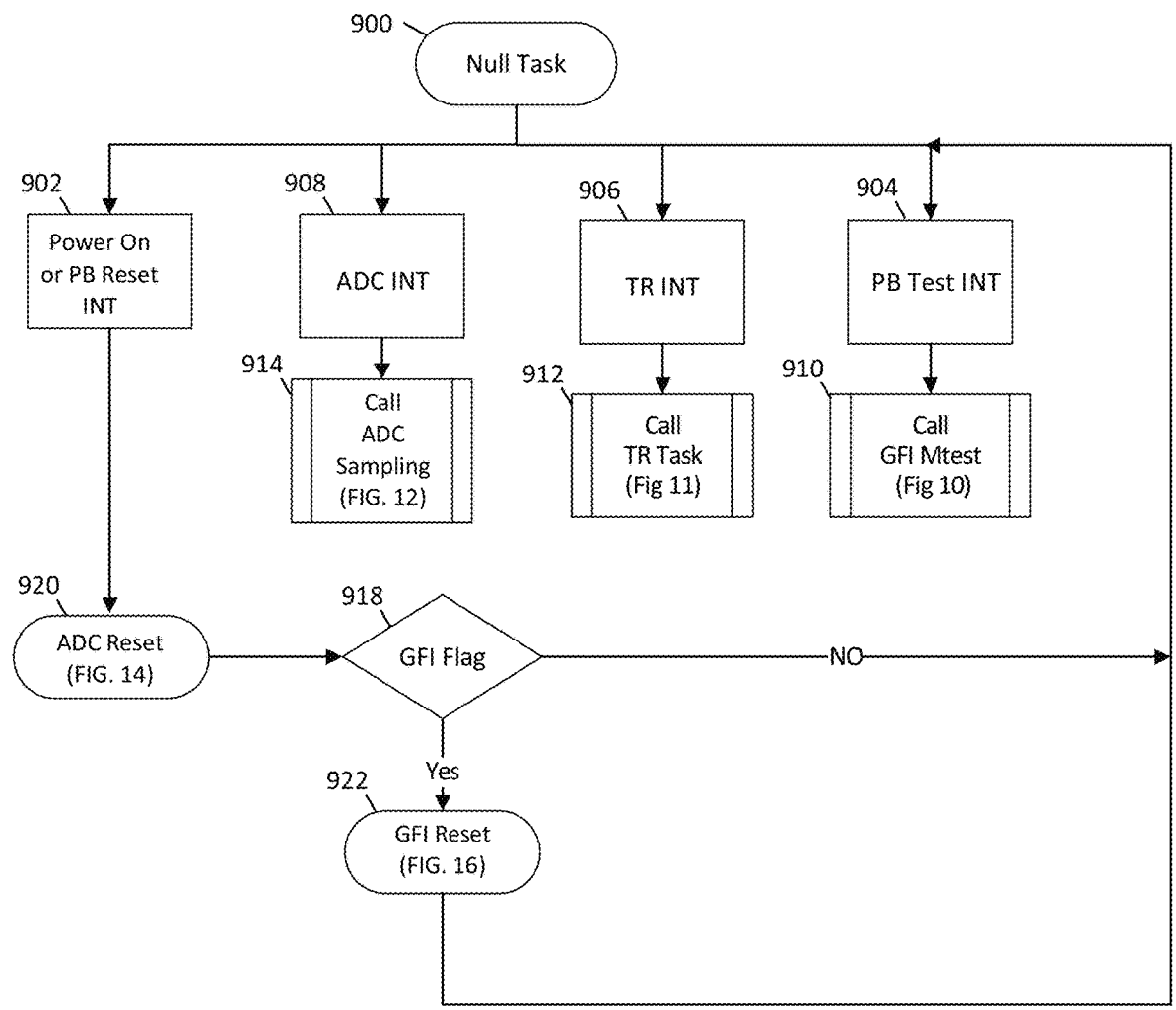
FIG. 9 is a flowchart for operation of the processor of FIG. 8.

FIG. 9 is a flowchart of null task process 900 routines implemented by processor 80. Signals to processor 80 generate interrupts in accordance multi-interrupt structure 902, 904, 906, and 908. Any of received reset interrupt signal 902, push button test interrupt signal 904, tamper resistant related interrupt signal 906, and a-d converter (ADC) interrupt signal 908 triggers an interrupt for execution of the appropriate subsequent routine. In an example embodiment, the provision of high power to a plug outlet by the receptacle is "always powered off" as a default until initiated by the processor, for example in response to one of the interrupts or when it is determined that the plug outlet is safe to be activated.

Interrupt 902, caused by a push button activated fault or by a requirement for a reset, such as need for a power up/startup, triggers step 920 to activate the ADC Initialization process. Subsequently, if step 918 determines that the GFI flag is set, then step 922 initiates GFI process steps depicted in FIG. 16, to reset and/or initialize GFI hardware. Tamper related interrupt 906, triggers step 912. Testing of Tamper Resistance is determined by sensing pins and responding to ADC interrupts. The process for 912 is depicted in FIG. 11. Analog to Digital Conversion (ADC) interrupt 908, indicating that the ADC completed a conversion of one of the analog voltages, triggers ADC sampling process 914, depicted in FIG. 12. PB Test Interrupt 904 initiates the GFI Manual test step routine 910 depicted in FIG. 10.

In an example embodiment, downstream loads or downstream further electrical receptacle(s) are serially connected to the receptacle, with the receptacle serially between the power lines and such downstream loads or downstream further electrical receptacle(s). In such example embodiments, it can be appreciated that the tamper related interrupt 906 may not be required to be implemented, while any and/or all of the remaining interrupts 902, 904, 908 can still be implemented, as applicable.

Figure 10:
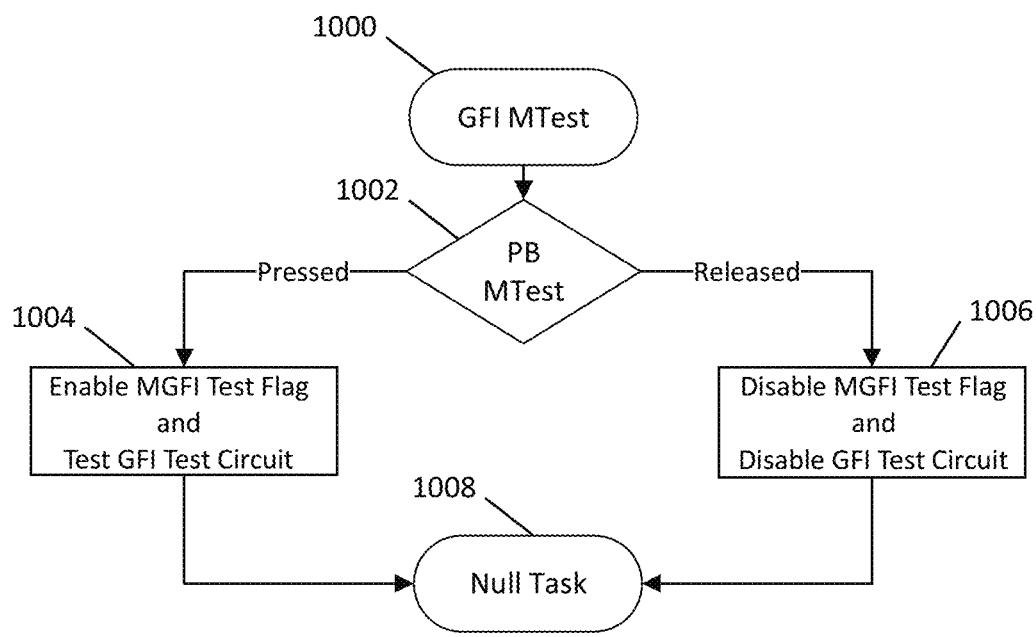
FIG. 10 is a GFI manual test flowchart for operation of the processor of FIG. 8.
Figure 11:
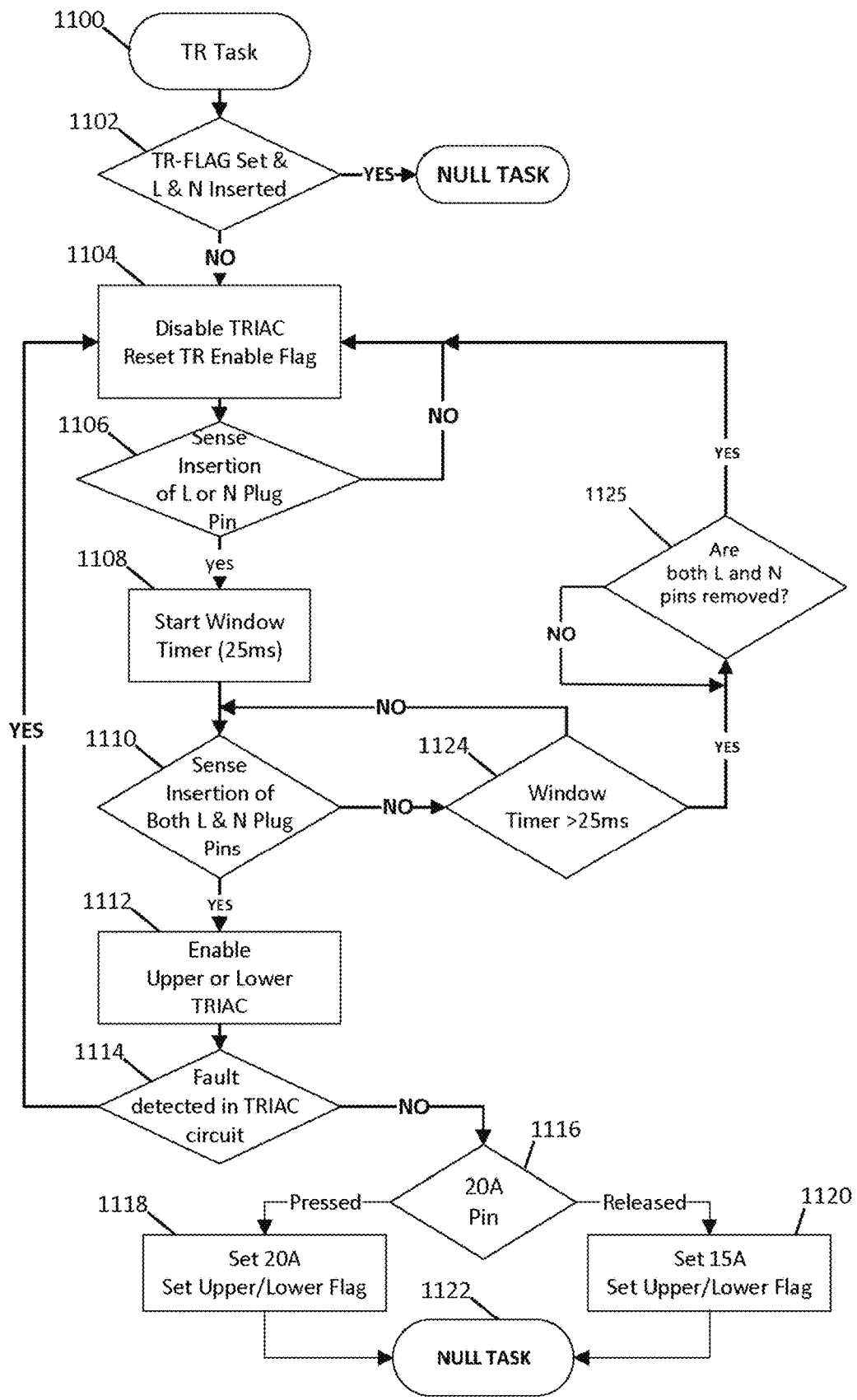
FIG. 11 is a processing task flowchart for tamper resistance blade detection circuitry of FIGS. 6-8.

The flow chart of FIG. 10 relates to a manual GFI test 1000. Test Circuit is represented as block 76 in FIG. 7B. Step 1002 determines whether the test push button (PB) is pressed or released. Step 1004 sets the manual test flag ("enabled") and tests the GFI test circuit if PB has been pressed. Step 1006 disables the manual test flag and the GFI test circuit, respectively, if PB is released. This process illustrated can also be applicable to a manual push button test for GFI other faults including but not limited to AFCI. The enabling of the MGFI test flag is to trigger a priority interrupt during the next logical processing step.

FIG. 11 is a flowchart that is common for both the upper and lower outlets for detecting the insertion and removal of plug pins. Block 1100 starts the tamper resistant function. Step 1102 verifies that TR processing is being done as indicated by the TR flag having been set. If the line (L) and neutral (N) pins are already inserted, the process returns to the Null Task polling routine 900 in FIG. 9. If the L and N pins have not been inserted, then the process continues to step 1104. As the triac should be off unless both L and N pins are detected to have been inserted each within a predetermined window timer (25 ms in this example), the triac is disabled. At step 1106, determination is made of whether an L or N plug prong is inserted. If so, the window timer at step starts at step 1108. If decision block 1110 determines whether both L and N plug prongs have been inserted in an upper or lower outlet in a receptacle within the acceptable 25 ms time frame, then step 1112 enables the Upper or Lower Triac for the "upper outlet" or for the "lower outlet" respectively. If not, step 1124 has determined that insertion of both prongs has not occurred within the 25 ms timeframe, and then at step 1125 it is determined whether both L and N plug prongs have been removed, If so, flow may then revert to step 1104 to disable the triac.

The decision block at step 1114 determines whether a fault is detected in the triac circuit. If not, decision block at step 1116 determines whether a 20 amp or 15 amp pin has been inserted in the outlet. Depending on whether or not a 20 A Pin has been pressed or released, step 1118 will set 20 A or step 1120 will set 15 A as the maximum current.

If step 1124 determines that both pins aren't inserted within the required 25 ms timer parameter, then the process continues to step 1104 to disable the Triac. If a fault has been determined in step 1114, the process returns to step 1104 where the Triac is disabled.

Figure 12:
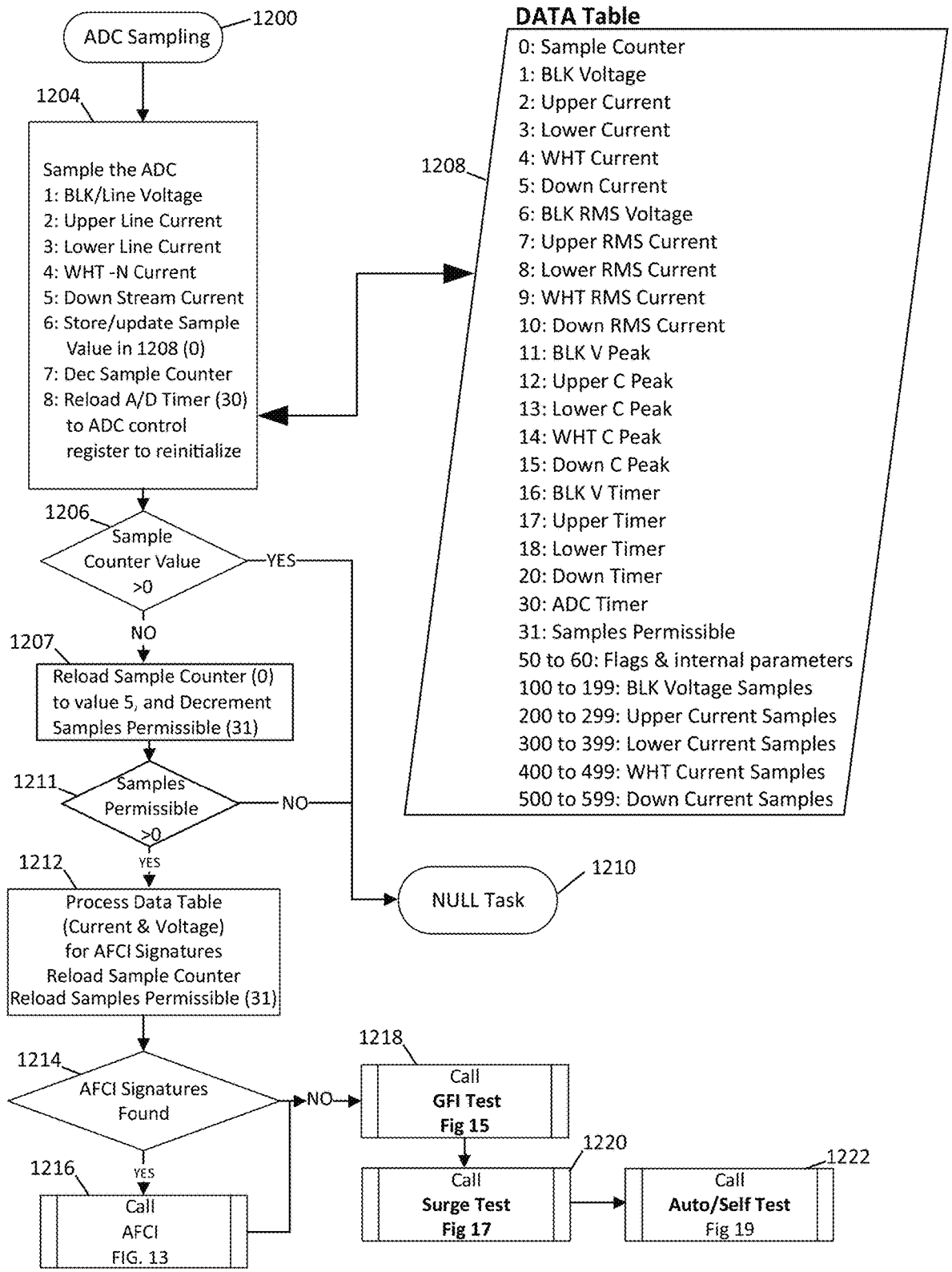
FIG. 12 is a sampling flowchart for the ADC circuitry of FIGS. 6A, 6B, 7A, 7B, 7C and 8.

FIG. 12 is the flowchart of the AFCI sampling process 1200 which takes place as a result of receiving an Analog to Digital Converter Interrupt 908 in FIG. 9 indicating the presence of a new analog value, which interrupt calls this sampling routine 1200 from block 914. It can be appreciated that the ADC sampling process 1200 can be performed continuously in example embodiments. Some conventional systems may only monitor power (watts), they may not look for high frequency data or attributes.

Once values of voltage and current (1-5 in block 1204) have been sampled, stored in the Data Table 1208 and a sufficient preset number (Samples Permissible Counter 31 in Data Table) of samples have been accumulated (steps 1204, 1206, 1207 and 1211), then values in the Data Table are processed according to the actions in block 1212 to be used for other purposes such as fault testing.

For each new analog value, the tasks in block 1204 are executed: establishing which line (1-5) was sampled; i.e. the Black/Line Voltage (1), the current of the upper outlet (2), the current of the lower outlet (3), the White/Neutral Current (4) and the downstream current (5). Upon receipt of one value for any of 1-5, the sample counter value (preset in this embodiment to the value 5) is stored (block 1204, step 6) in Data Table block 1208 (0) which value gets updated. This sample counter is then decremented (step 7) in order to read the next value (1-5) retrieved from MUX which is set to next logical input. Step 8 in block 1204 then reloads the value of the ADC ("A/D") Timer found in Data Table block 1208 (30) to the ADC control register to reinitialize. The MUX is an analog multiplexor which selects for the ADC one of the 8 permissible analog inputs (in this embodiment, only 5 are used for analog signals).

One ADC generates one value based on the MUX selecting the next of one of the 5 analog inputs signal values to be processed, reloading the timing register in the processor which is for the Analog Digital conversion. A/D sample Timer (30) in the Date Table 1208 is the number of processor clock cycles to wait (e.g. 16) before the processor's ADC generates the next analog value to be stored. As it is ADC hardware dependent, the 16 clock cycles may be a different value for another processor.

Decision block 1206 tests to see if the sampling processes in block 1204 have been repeated five times to acquire the five analog measurements (1-5 in block 1204), based on the Sample Counter being decremented (7, block 1204) from five to zero.

Data Table 1208 builds values in locations 1-5 from the sample values 1-5 obtained in block 1204 and is stored in the Data Table based on the sample counter (0).

During the process 1204, the Sample Counter which is decremented ranges from 1 to 5, and is used as a pointer in the Data Table 1208, being an index indicating which of the 100 to 500 arrays to use.

Decision block 1206 determines that if the Sample Counter has not decremented down to zero, then the process returns to null task FIG. 9 waiting for next ADC interrupt signal.

Once the counter has decremented to 0, sampling will repeat until sufficient samples have been collected based on the value in Samples Permissible 31, Data Table 1208.

For example, in this embodiment, as 99 sample values are being accumulated for each of the 1-5 power signals, then 99 sample values of the Black Voltage these would be stored in the Data Table as 101 to 199; 99 sample current values for the upper outlet in 201-299; 99 sample values for the lower outlet, in 301 to 399; 99 sample values for the White Current, in 401-499; and 99 sample values for Downstream Current, in 501-599.

The steps in block 1207 and the decision block 1211 cause the sampling of the 5 signal values to take place for 99 times to be used to determine AFCI signature, and to calculate averages (RMS) for example. Decision block 1211 using the changing value in 31 of Data Table 1208, determines if the value in the Samples Permissible Counter (31) has been decremented from 99 to 0.

In an embodiment, in FIG. 12 ADC values are read from the ADC register and stored in data sets and then the data is processed. In this embodiment 99 values have been used for each of the five power types, as being sufficient to represent the sine wave signature. The sample values (100-599) are used after processing to detect spikes, etc. occurring in the values in the Table.

At block 1212, there now are a full set of values within each of the 5 arrays 100, 200, 300, 400 and 500.

From the samples collected in each of 100, 200, 300, 400 and 500 series, peaks can be calculated (11, 12, 13, 14, and 15), as well as averages (6, 7, 8, 9 and 10).

Subsequent to processing steps in block 1212, four types of tests are performed; namely, AFCI (1214, 1216), GFI (1218), Surge (1220) and Auto/Self (1222). However, in another embodiment, the data sampled may also be processed for Peak Values (11-15 in the Data Table 1208), power spikes may be tested for; similarly RMS (average) values may be used to monitor, test and disable power for brownout and/or other conditions.

Following the processing of the Data Table 1208 and establishment of an AFCI signature in 1212, the signature block 1214 tests for the presence of an AFCI Signature. If AFCI signature is found it continues to step 1216 to process AFCI tasks on FIG. 13.

FFT (Fast Fourier Transform) is a possible method of extracting frequencies out of a Data Table. The FFT is looking at the values in 100-599.

The detection of spikes indicates that there is arcing; i.e. high frequency pulses. FFT finds the frequency that is indicative of the arcing, then values are checked for duration and amplitude. If decision table 1214 does not find an AFCI signature, the process continues to block 1218 to determine if GFI fault conditions exist. Subsequently the process continues testing for Surge 1220 and then Auto/Self Test 1222.

Other tests may be incorporated, for example, for overvoltage and brownouts. Similar to GFI and Surge, all the raw data required exists in the Data Table 1208.

Since ADC sampling is performed by the processor of the receptacle, in an example embodiment, when a plug is inserted into the plug outlet, the processor can further be controlled to output the activation signal at or near the zero volt level of the alternating current waveform.

In another example embodiment, the receptacle can protect against arc faults by applying the zero crossing switching technology, because the insert does not activate the full line power until all of the safety checks are completed.

Activating power only if no fault condition has been detected, results in the receptacle offering power control while remaining safe. Once it is determined that it is safe to turn on the power, the processor does so by activating the applicable TRIAC for the applicable power line.

Figure 13:
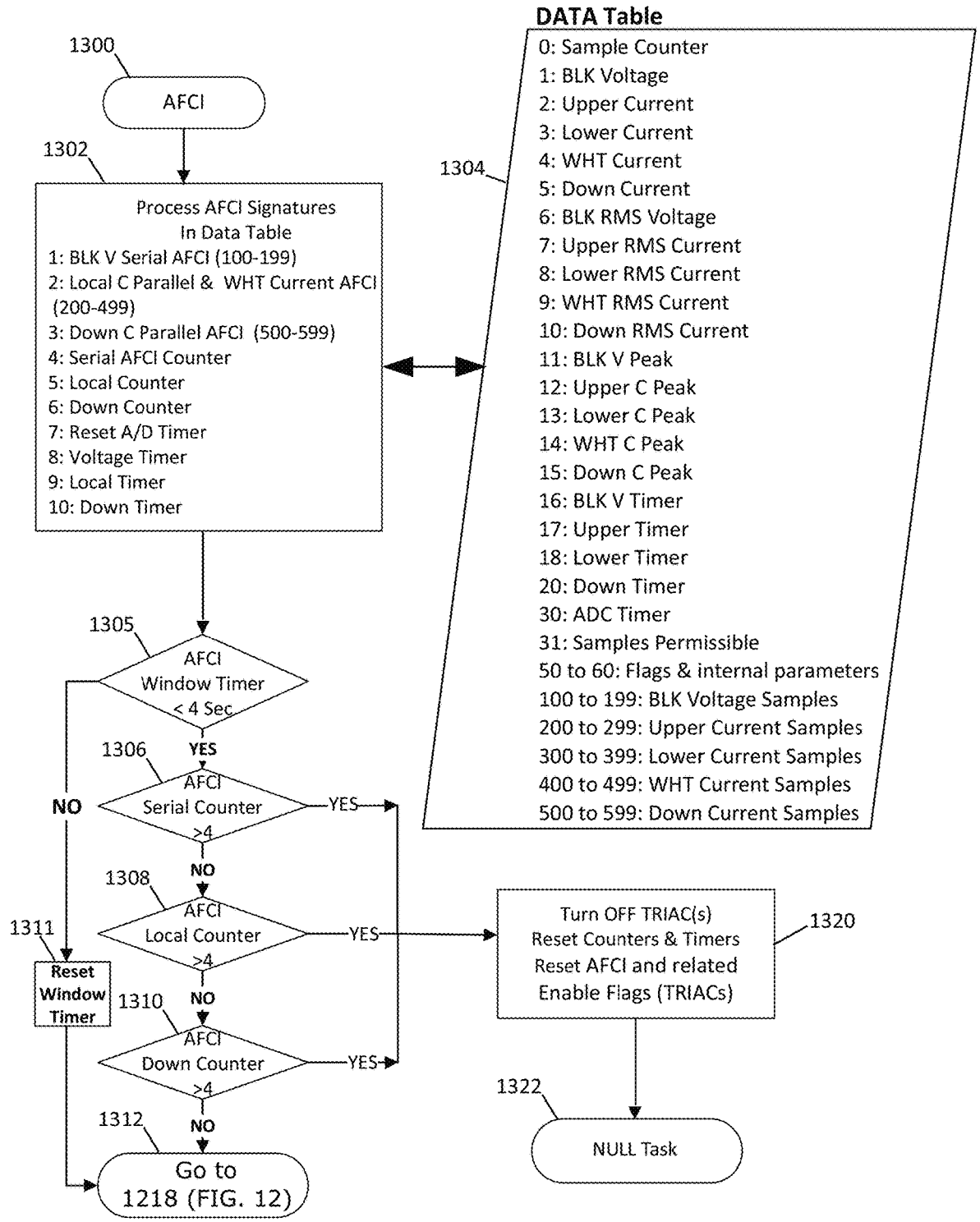
FIG. 13 is an AFCI flowchart for the circuits of FIGS. 6A, 6B, 7A, 7B, 7C and 8.

Referring to the flowchart of FIG. 13, block 1300 starts processes for AFCI signatures and establishes whether and where there may be an AFCI fault requiring power to be shut off. Various types of processing activities for various types of AFCI interrupts which can take place due to voltage faults on the Black line in series, and/or current faults due to faults on the local outlet or downstream. These are listed in block 1302.

In Block 1302, Black Voltage signals are processed as these can signal Serial AFCI ("BLK V Serial AFCI") conditions. Current on the white ("WHT") for the local and for the downstream is processed for parallel AFCI fault signals. Block 1302 also references Serial, Local and Downstream ("Down") preset counters for the Black Voltage Serial (4), Local (outlet) Current Parallel (5) and Downstream Current (6) AFCI conditions. In addition to event counters, there are timers for each of the three conditions (8, 9, 10). In this embodiment, both conditions of minimum number of events and maximum timing must be met to turn off the Triac(s) at block 1320. The counters are used to minimize false triggers (e.g. an acceptable motor startup) of a non-AFCI condition provided the flag occurred a certain number of times and within a short time window such as 4 seconds for the series, local and downstream timers (decision block 1305) indicating a valid AFCI condition requiring turning off of the power.

The Data Table 1304 in FIG. 13 is the same as table 1208 shown in FIG. 12, as the values are re-used for different conditions. If an AFCI fault has been detected at steps 1306, 1308, 1310 then the processes in Block 1320 cause the Triac(s) to be turned off, cutting power at the local outlet and downstream. Counters, timers, AFCI and related flags (eg Triacs) are reset. Process continues to Null Task.

In an alternative example embodiment, it is possible to shut off power the power only to the local outlet or receptacle can be shut off, and not to devices further downstream.

Figure 14:
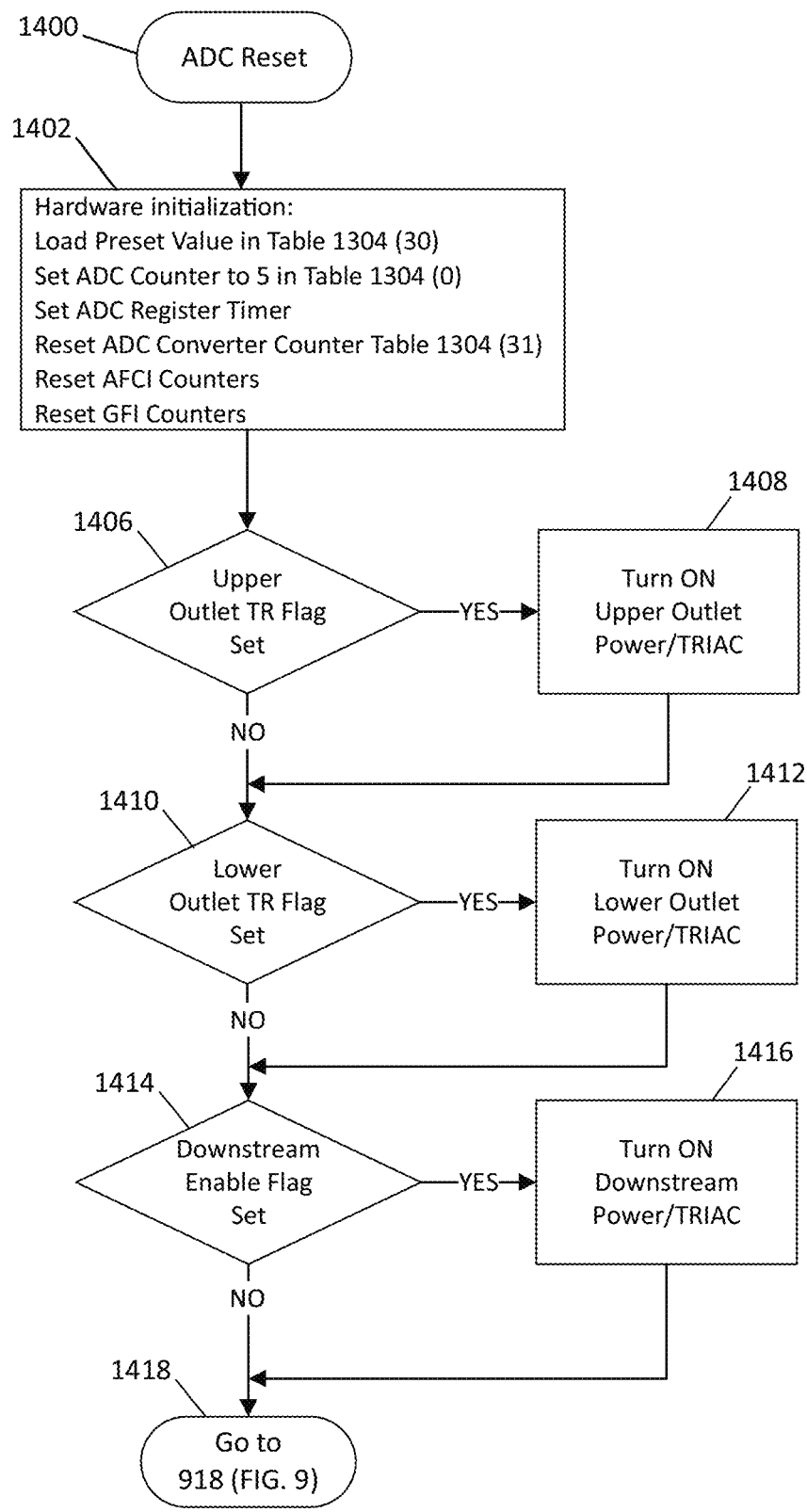
FIG. 14 illustrates an ADC reset process flowchart for the circuits of FIGS. 6A, 6B, 7A, 7B, 7C and 8.

FIG. 14 is a flowchart of the ADC reset process. Interrupt 902 (FIG. 9) signals a manual power reset or power startup condition requiring an ADC reset action for hardware and power initialization tasks to be executed. Block 1402 initializes and resets certain counters and values:

Preset value (e.g. 16), representing the clock cycle, is loaded in 30, Table 1304 Value of 16 is specific to particular ADC hardware; ADC Converter counter is set to the value 5 in Table 1304(0); ADC Register Timer is set by storing the value in Table 1304(30) in the ADC Register Timer; ADC Converter Samples Permissible Counter in Table 1304(31) is reset to 99; AFCI Counters and GFI Counters are reset.

Although other processes may turn on the power Triac(s) independently of a TR testing requirement, in process 1400, Triacs are not turned on at steps 1408, 1412 and 1416 unless the TR function requirement has been met by decision box steps 1406, 1410 and 1414. Steps 1406, 1410 and 1414 turn on the appropriate power Triac(s), depending on whether the Upper Outlet, Lower Outlet and/or Downstream flags have been set.

If 1406 indicates that there is nothing wrong in the upper outlet, the Upper Outlet is turned on at step 1408. If step 1410 indicates determines that the Lower Outlet flag is set, indicating that there is nothing wrong with the Lower Outlet, then the Lower Outlet Power/Triac is turned on at step 1412. If step 1414 verifies that the Downstream power feature is active (i.e.) the enable flag has been set, the Downstream is made available for processing by turning ON the Downstream Power/Triac at step 1416. Turn on (or off) of the Power/Triac for downstream is made for the entire receptacle, although this action can be restricted to one or both of the outlets in the receptacle only. In another example embodiment, plug outlets are not provided by the electrical receptacle and therefore steps 1406, 1408, 1410, 1412 are not required, and the flowchart can proceed directly to step 1414, and step 1416 to control downstream series loads if required.

Figure 15:
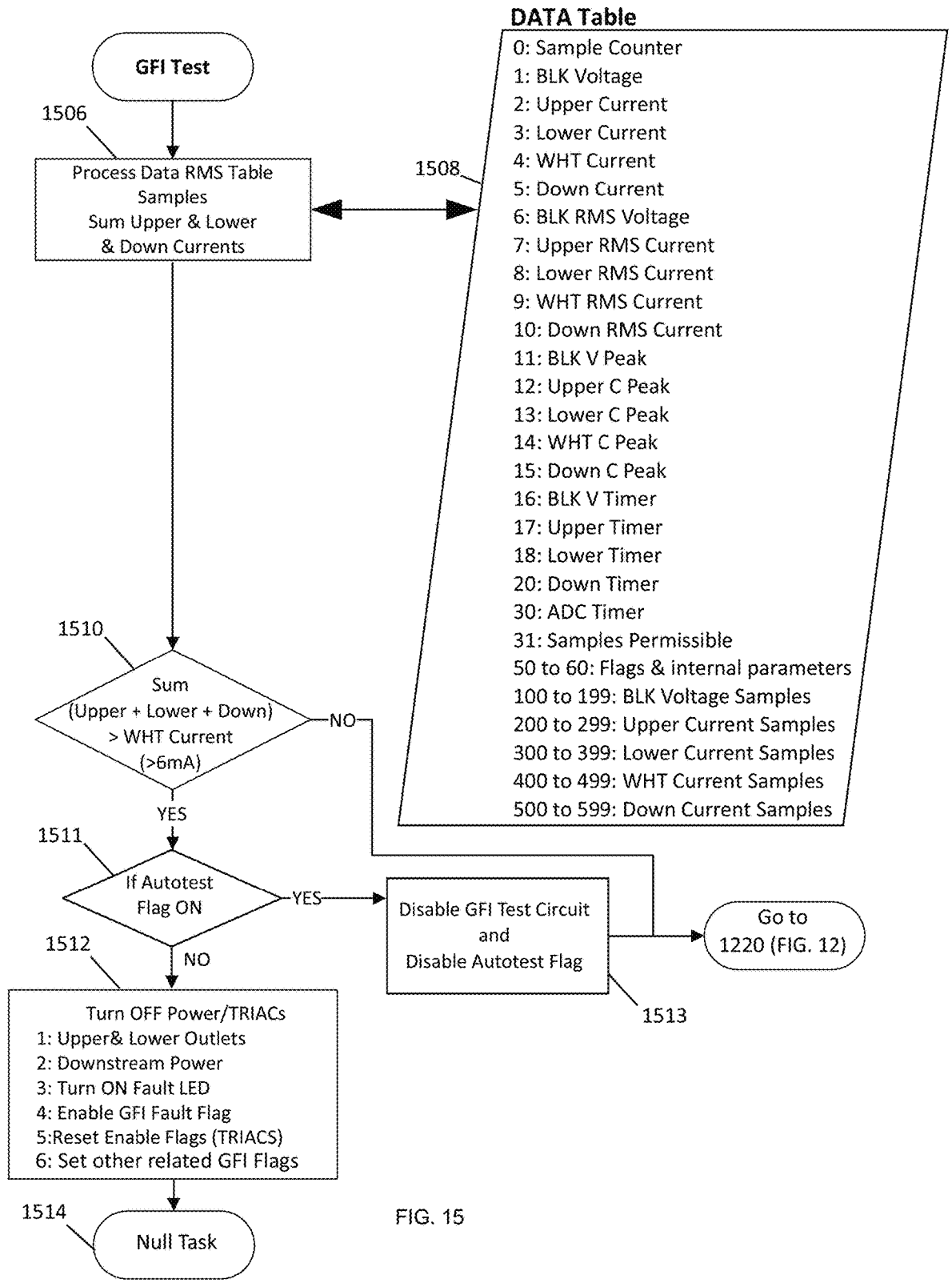
FIG. 15 is an GFI Test flowchart for the circuits of FIGS. 6A, 6B, 7A, 7B, 7C and 8.

FIG. 15 is GFI test flowchart, in contrast to AFCI which works on signatures (block 1214, FIG. 12). GFCI processing works on sample values, RMS values and durations, applying data table 1508, elements 5-20. For example, the RMS (average) values are used for the Black ("BLK") 7, 8 and 10 which is for power in and out; the White ("WHT") 9 represents all return currents. As noted previously, the various data tables 1208, 1304, 1508 and the table of FIG. 18 represent the same processor memory storage. For example, creation of the data table 1508 has occurred during the processes in FIG. 12.

The decision block of step 1510 determines that if the sum of the current of Upper and Lower outlets and the downstream current is greater than 6 ma, then there is a GFI fault and the three power/Triacs are to be turned off for both the upper and lower outlets as well as for the downstream power. The signal Led Fault is turned ON and GFI Fault Flag is set. More specifically, step 1506 processes values in the Data Table 1508 and sums the RMS (average) values for the upper (7), lower (8) and down current (10). Decision block 1510 then determines if this sum is greater than the White Current (4) on a sample by sample basis than a predetermined current (in this embodiment 6 mA has been used), and if not, then there is no GFI fault.

Step 1510 compares the sum of individual values Upper, Lower and Down in 200-299, 300-399, 500-599 respectively, against the value of the matching white values in 400. If this sum of the upper, lower and downstream as compared to the White Current than 6 mA, then a fault is determined and 1512 turns off the power triac(s), whether for the upper or lower outlet and the downstream. The Fault LED is turned ON and the GFI Fault Flag is enabled. In an example embodiment, following a predetermined period of time (e.g. 15 minutes), the system may auto reset, and test if the GFI fault still is present. If not, the system may automatically restart.

Figure 16:
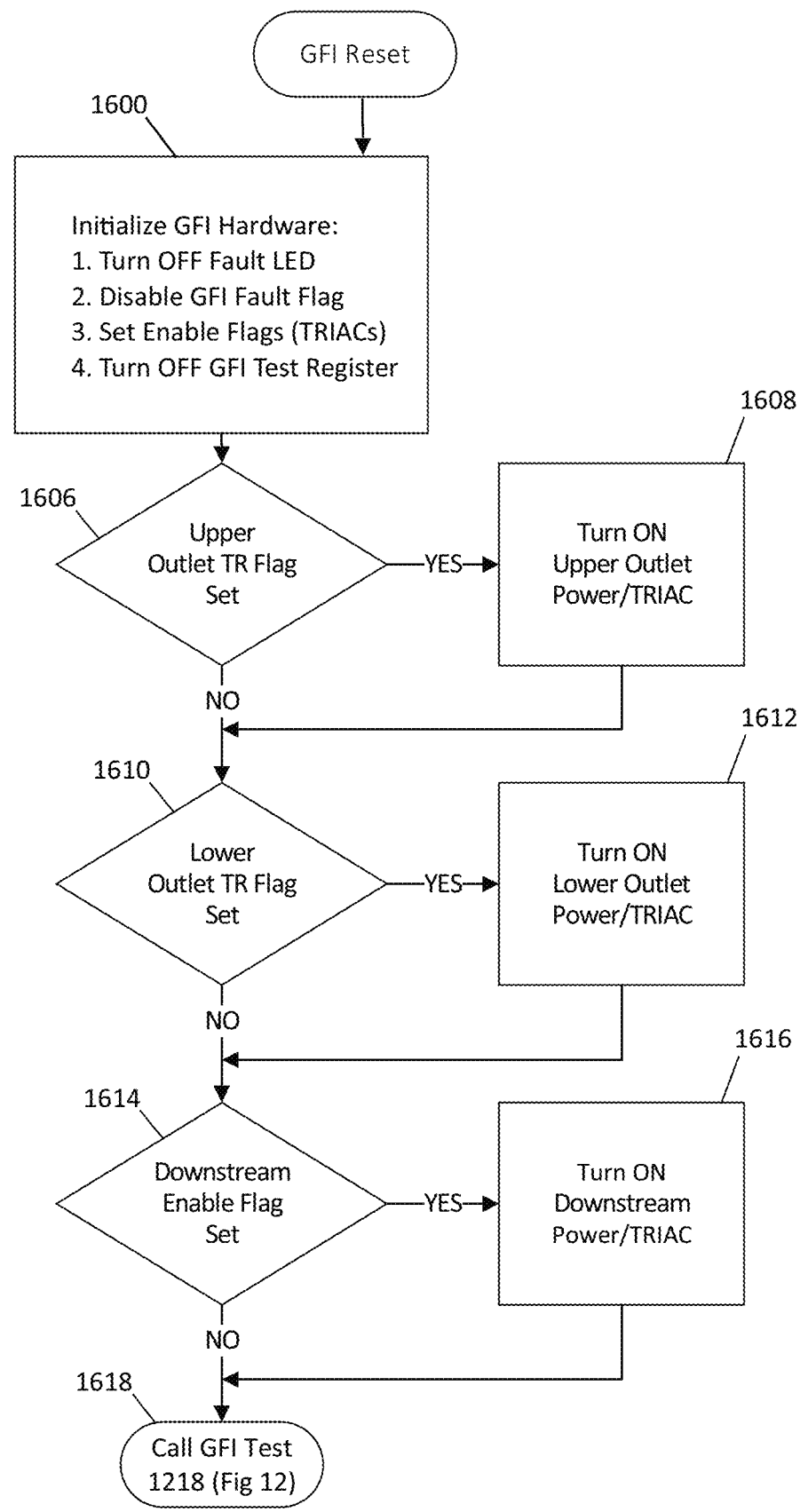
FIG. 16 is an GFI reset process flowchart for the circuits of FIGS. 6A, 6B, 7A, 7B, 7C and 8.

FIG. 16 is a GFI reset process flowchart. This GFI Reset routine block 1600 initializes GFI Hardware by turning OFF Fault LED, disabling the GFI Fault Flag, setting Enable Flags (TRIACS), and turning off the GFI Test Register. Decision blocks of steps 1606, 1610 and 1614 establish if certain Power/TRIACs are to be turned on, depending on whether upper outlet TR flags, lower outlet TR flags and downstream enable flags having been set. Similar to the process in the flowchart of FIG. 14 which turns on power/Triacs used for any or all the upper, lower and/or downstream functions, the GFI reset process turns on any or all of the three Triacs during a GFI Reset process. Following reset, the process step 1618 continues to the GFI Test 1218, FIG. 12.

Figure 17:
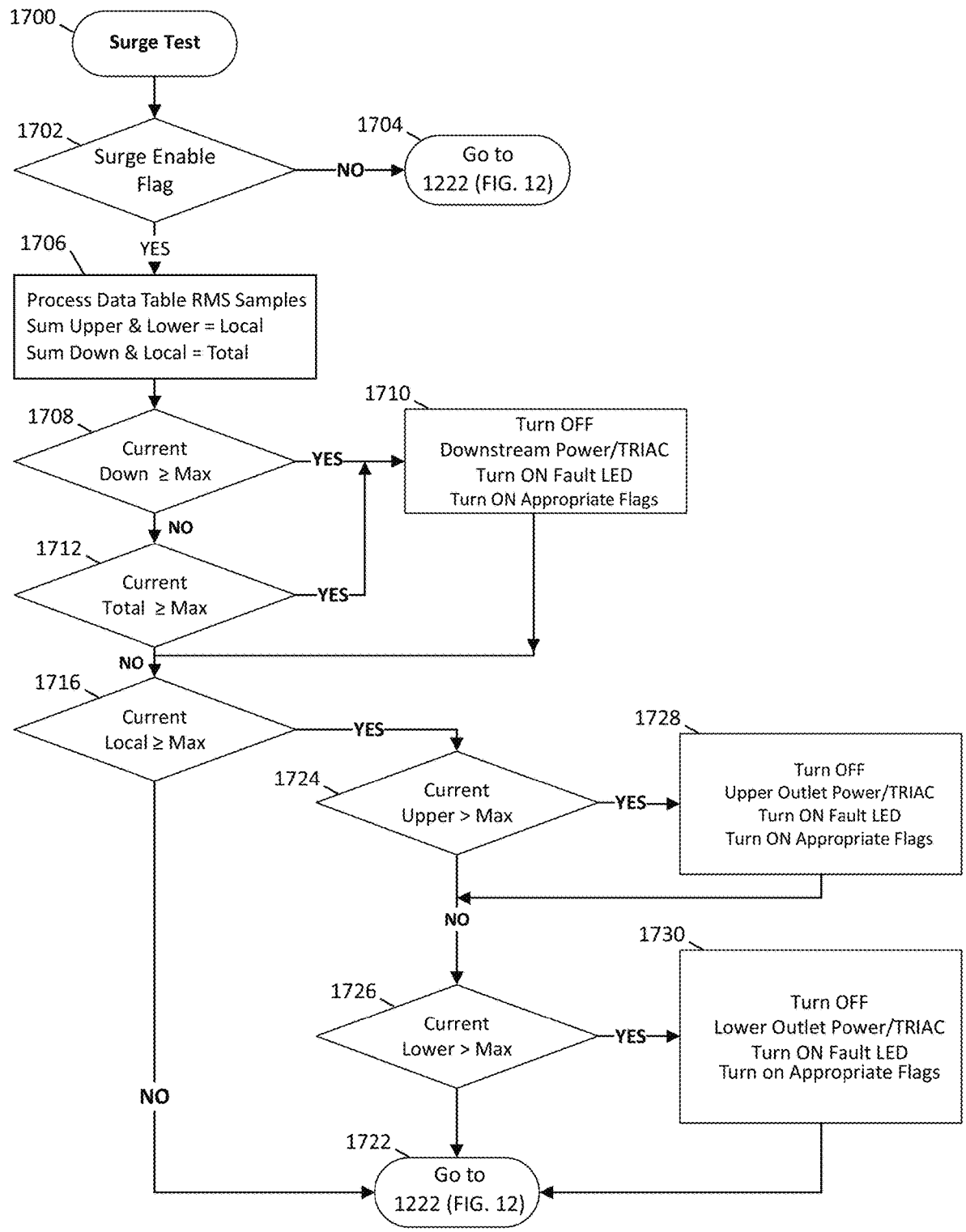
FIG. 17 is a surge test process flowchart for the circuits of FIGS. 6A, 6B, 7A, 7B, 7C and 8.

FIG. 17 is a surge test process flowchart for turning off power/Triacs for overcurrent and surges. The decision block of step 1702 determines if there is a flag indication that Surge Protection is a feature in the outlet. If not, the process returns to FIG. 12 block 1222 and proceeds to call the Auto/Self Test routine.

If the Surge test feature is enabled as indicated by the presence of a Surge Enable Flag at step 1702, it has been determined that there is no Arc Fault occurring, and that there is no current imbalance between Hot and Neutral (GFI). At step 1706, Data Table samples are processed and the process continues to decision steps 1708, 1712, and 1716 to determine if current exceeds the permissible level (15 Amperes or 20 Amperes). Certain overages over the MAX may be permissible for a limited time duration to provide for cases of a limited surge such as a motor start-up.

Step 1706 processes the Data Table Samples (Block 1508): The Local Power is totaled "Local" by adding the RMS values of the Upper and Lower outlets, assuming two outlets are active in the receptacle. Then the sum of the Downstream RMS and the Local RMS generates "Total" Power. The decision blocks 1708 and 1712 then determine if the Downstream Current or Total Current, respectively, is greater than or equal to Max, in which case step 1710 turns off the Downstream Power/Triac, and turns ON Fault LED and appropriate flags. Max is a preset value based on whether the outlet is operating in 15 A or 20 A mode.

There is the capability to determine the Max current parameter depending upon the presence of 15 A or 20 A plug blade. For example, it may be permissible to draw 100% continuous current or 120% for less duration to provide for start up time such as inrush for a hair dryer or air conditioner. Decision block 1716 compares the Local value (sum of both Upper and Lower outlet) to the Max Current Parameter value. If greater, decision blocks 1724 and 1726 compare each of the upper and Lower outlets, shutting off the respective Power/Triacs and turning on the respective Fault LED(s).

FIG. 18 lists the elements in the Data Table. These are preset or accumulated, and/or processed during the execution of various routines. Of the 1 to 5 signals being monitored, 1, 2, 3 and 5 are done on the black input, and 4 ("WHT") is the return path. Current related information is used for GFI, Surges and Overcurrent processing; voltage, for AFCI serial, overvoltage and brownouts. The Sample Counter (0) is preset to a value of 5 as the embodiments are monitoring 5 current, or voltage values: Black Voltage, Upper Black Current, Lower Black Current, Down Black Current and White ("WHT") Current. Timers 21 to 26 are for tracking how long the events occurred. BLK shows individual load current drawn and WHT is the return path for all currents unless there is a fault.

Figure 19:
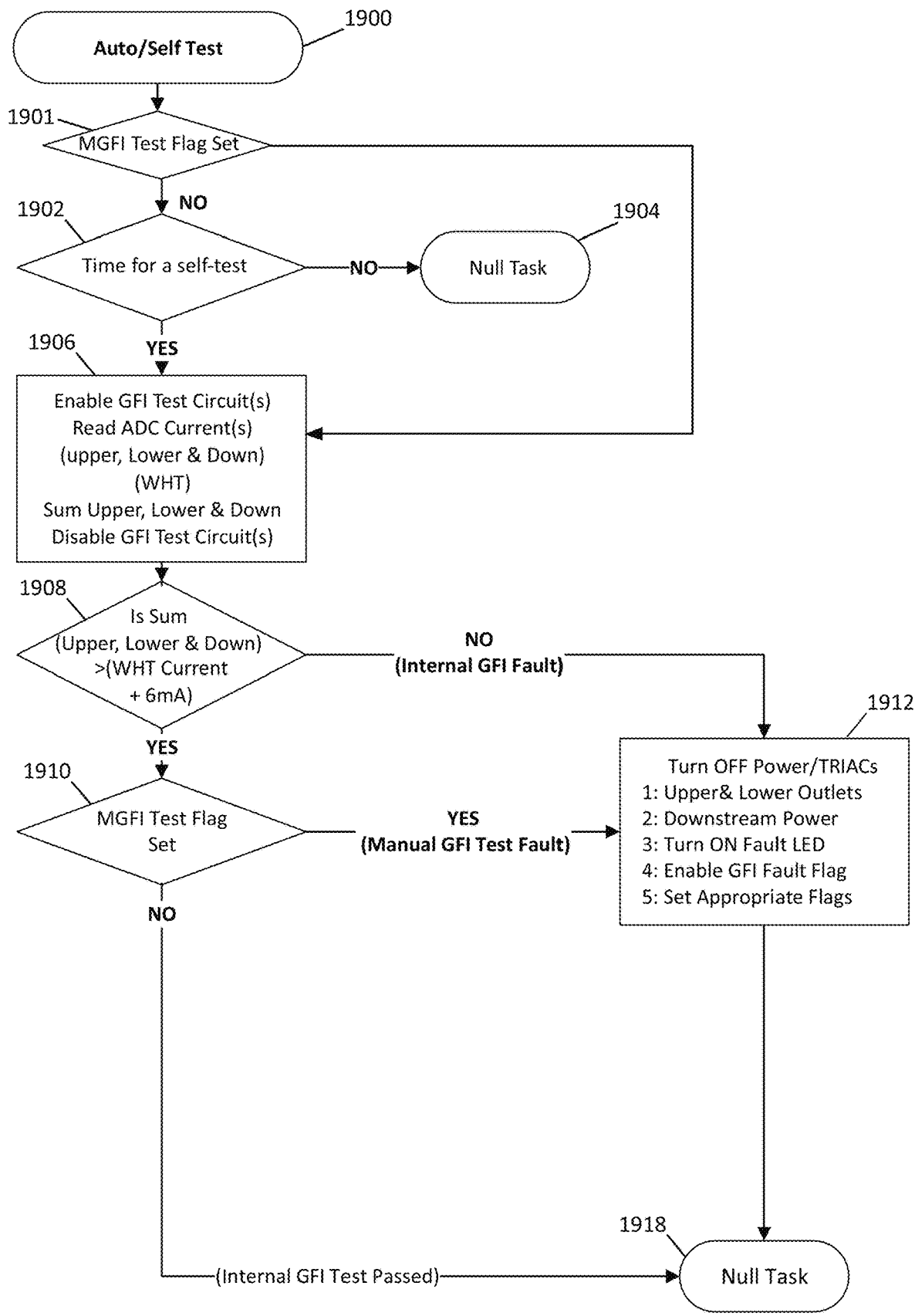
FIG. 19 is an auto/self-test process flowchart for the example embodiment.

FIG. 19 is an auto/self-test process flowchart that is initiated from FIG. 12, block 1222 and is primarily for auto/self testing of the system's hardware including but not limited to the GFI function (decision block 1908). The system may also test information from other sensors for calibration, temperature, etc.

If step 1901 determines that this is a manual test, then the processes in block 1906 are initiated. If a fault has been determined, the power is turned off at step 1904. Whether a self test as established in step 1902, or a manual test as determined in step 1901, step 1906 enables the GFI test circuit, reads the ADC values for the Upper, Lower, the White, and the Black & the White downstream, sums the Upper and Lower values, and disables the GFI Test Circuits.

Step 1908 tests whether an imbalance has occurred. If it was a manual test, the process continues to 1912. If it was an internal test and failed, the power is turned off. If is determined in step 1910 that a manual test failed, the power is turned off.

Figure 20A:
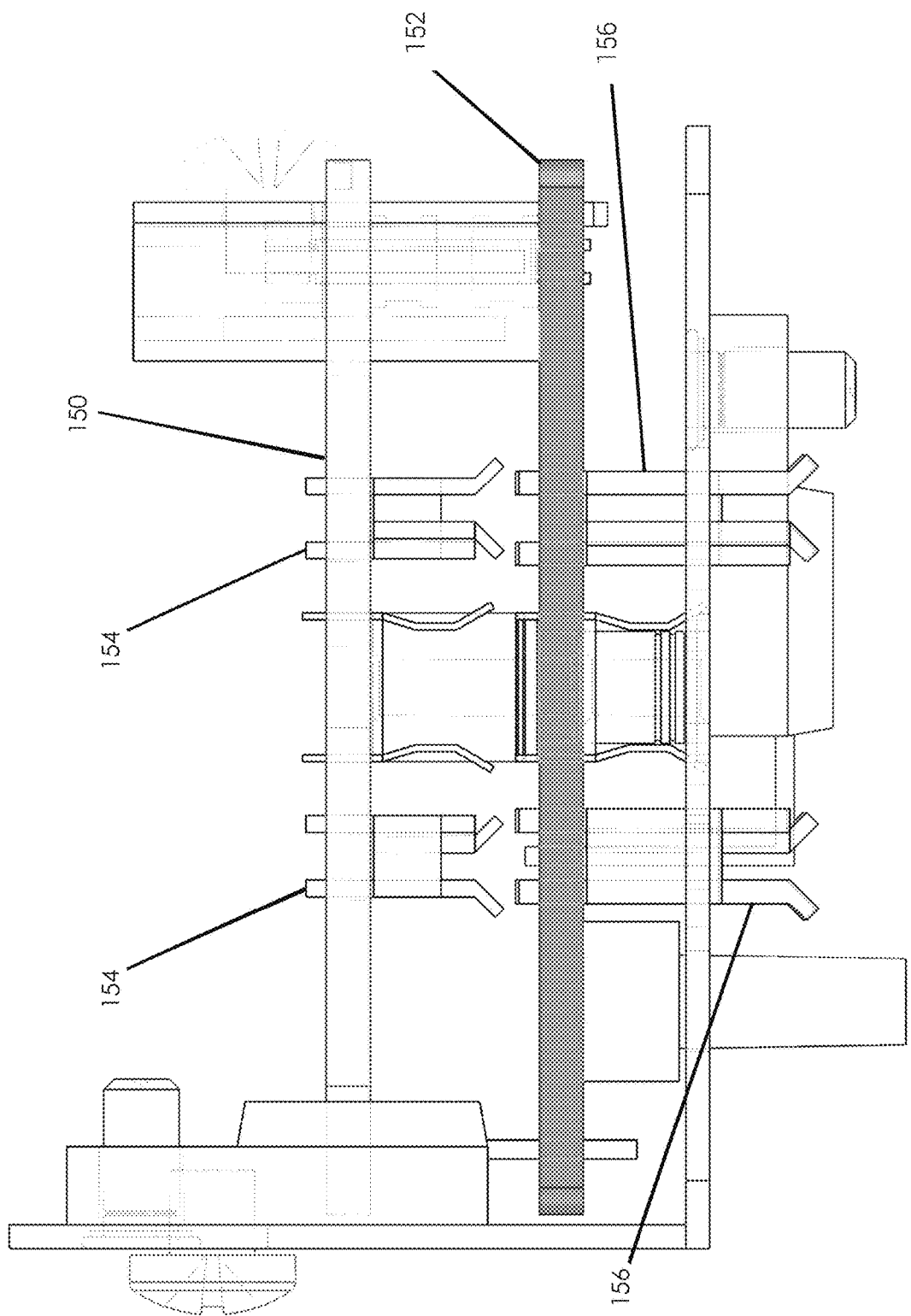
FIG. 20A is a plan view of the receptacle of example embodiment.
Figure 20B:
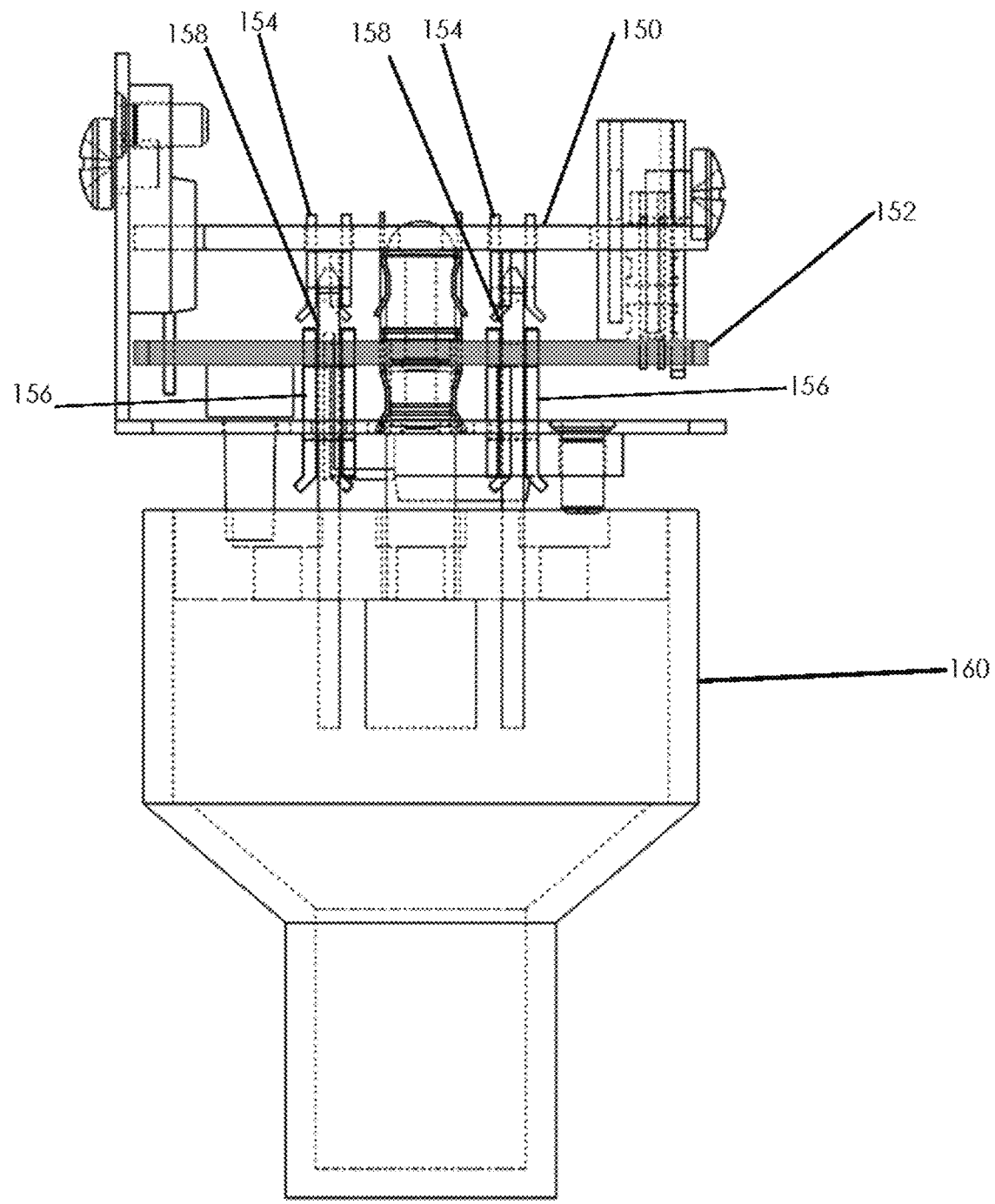
FIG. 20B is a view of the receptacle from FIG. 20A with a plug inserted.

FIG. 20A is a partial plan view of a physical layout of a receptacle, such as described with respect to FIGS. 1A, 1B, 1C, 1D, 1E and 1F, operable by means of the circuits of FIGS. 6A, 6B, 7A, 7B, 7C and 8. A plug has not been inserted in the receptacle. FIG. 20B illustrates the receptacle of FIG. 20A with insertion of plug 160. Power circuit board 152 includes two sprung contacts 156. Daughter circuit board 150 includes two sprung contacts 154. Circuit board 152 includes sprung contacts 156.

Boards 152 and 156 are substantially parallel to, and separated from, each other. Contacts 154 and 156 are aligned with each other, bridged across the separation by inserted plug blades 158, as shown in FIG. 20B. The two circuit boards allow separation between the high voltage power control logic components on circuit board 152 and circuit board 150, the latter containing sensing logic and communication components. More particularly, the voltage sensing, control, connection of high voltage to the plug pins, device power interconnect lines (Upstream [BLK/WHT IN]/Downstream [BLK/WHT Out]) 30 are included on power circuit board 152. Plug pin sensing logic elements are include on circuit board 150. This arrangement provides high efficiency of the power circuitry, as the high current traces are all together. Ability of the GFI and AFCI protection is afforded to measure the currents on both the neutral as well as on the hot lines, and to reliably measure a fine current imbalance, for example as little as six milliamps.

Figure 8:
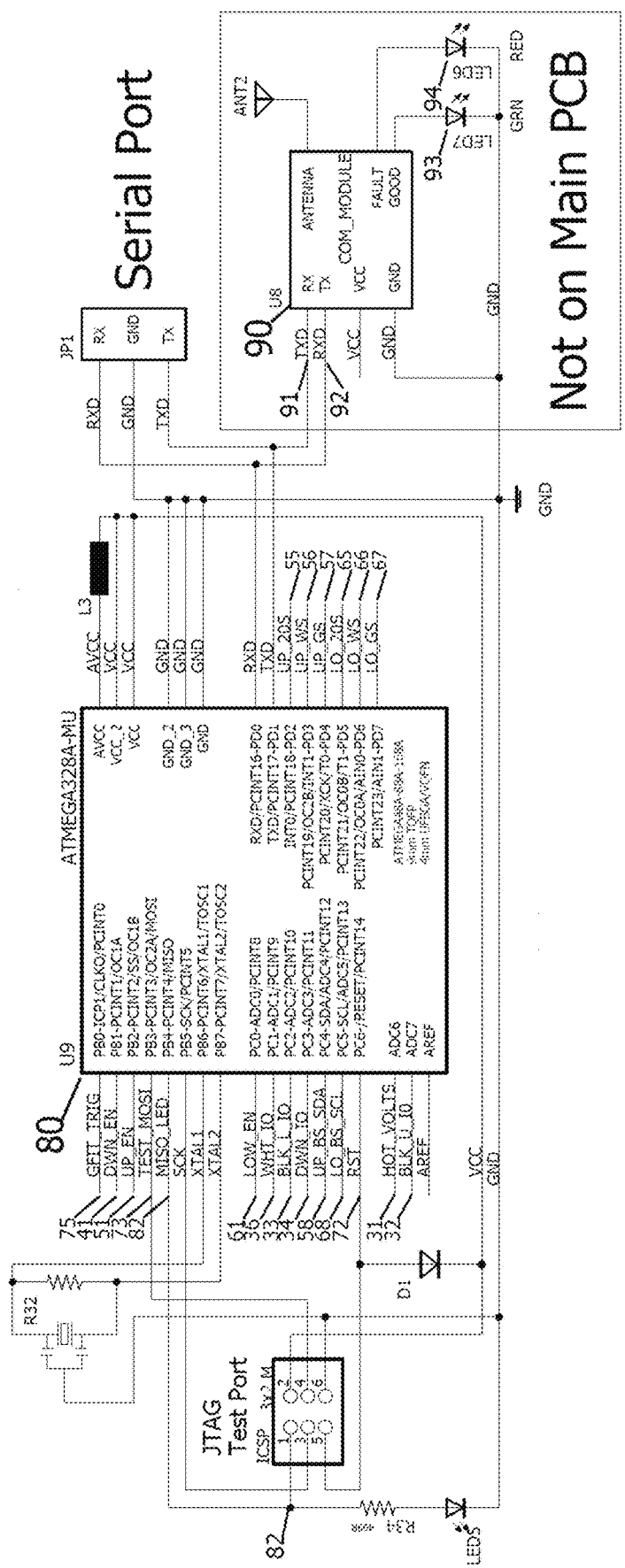
FIG. 8 is a detailed schematic representation of the processor, communications module and logic elements of the circuit diagrams of FIGS. 6A, 6B, 7A, 7B, 7C.

Full insertion of plug 160 completes circuit connection of microcontroller 80 with low voltage sensor circuits 55, 56, 57, 58 and 65, 66, 67, 68, depicted in FIGS. 6, 7B and 8. Microcontroller 80 monitors the sensor contacts to determine whether the power is to be turned on or off. Circuit board 150 monitors the contact sensors to determine the insertion time of the plug neutral and hot blades. Ground prong 57, 67 insertion time is also assessed. The ground prong is longer than the hot and neutral blades. If a ground plug is present, it is detected first to establish distinctive timing criteria. The microcontroller will wait for the other blades to be inserted.

Separation of the current sensors to a single board facilitates measurement of precision, calibration, and long term stability. There is no need to tamper with any of the high voltage variables that are stable, having already been calibrated. The separated board makes provision for addition of other communication functions, e.g., Bluetooth, Zigbee, WiFi power line communications while limiting the number of signals traveling between the two circuit boards.

Figure 21:
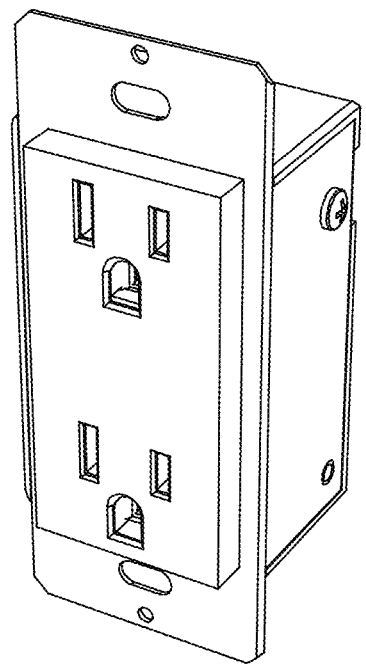
FIG. 21 is an isometric view the example embodiment of the receptacle with side heat sink.
Figure 22:
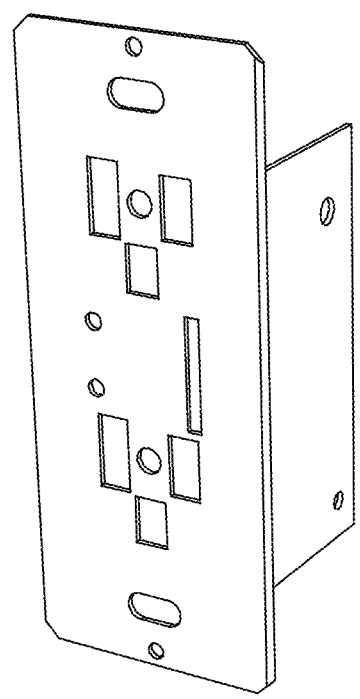
FIG. 22 is a partial view of the receptacle of FIG. 21 shown with a ground plate.
Figure 23:
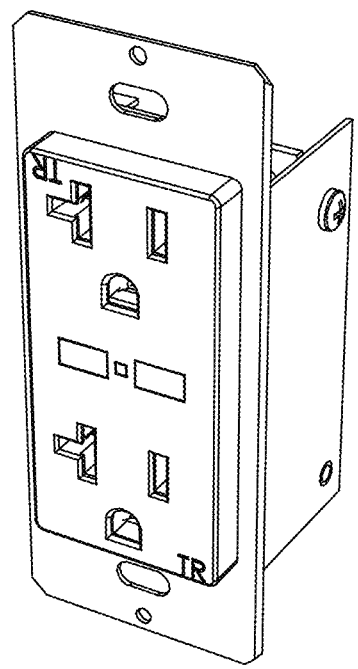
FIG. 23 is an isometric view of the example embodiment for a 15/20 A receptacle.
Figure 24:
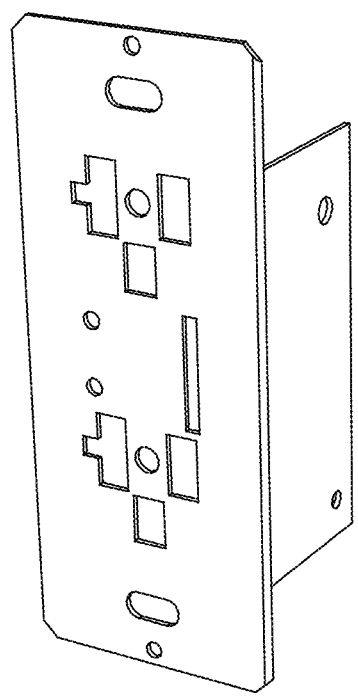
FIG. 24 is a partial view of the receptacle shown in FIG. 23 with ground plate and heat sink flange.
Figure 25A:
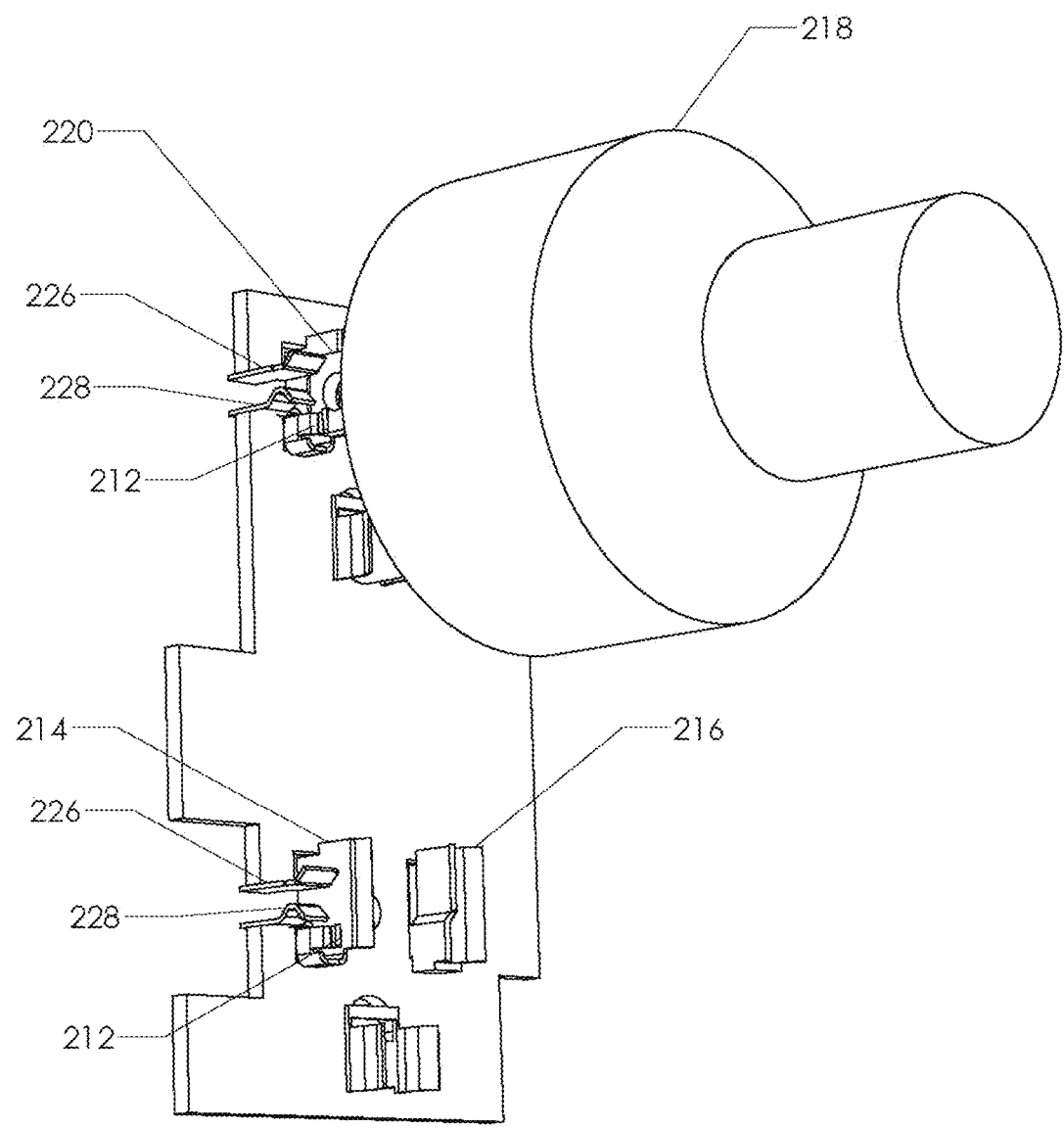
FIGS. 25A, 25B, 25C, 25D and 25E are various views of a 15 A plug inserted into a daughter board of the receptacle shown in FIG. 23.
Figure 25B:
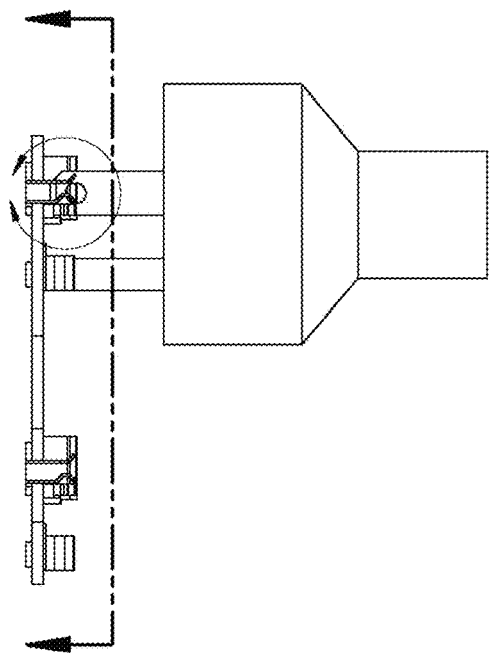
Figure 25C:
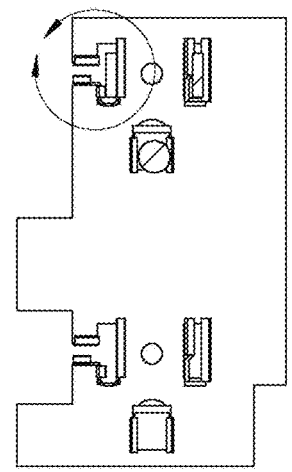
Figure 25D:
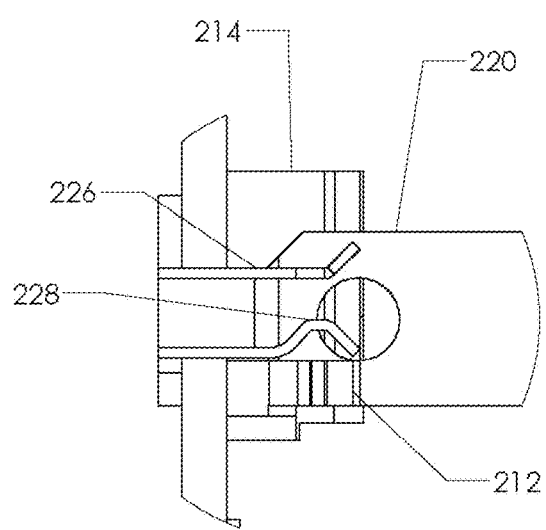
Figure 25E:
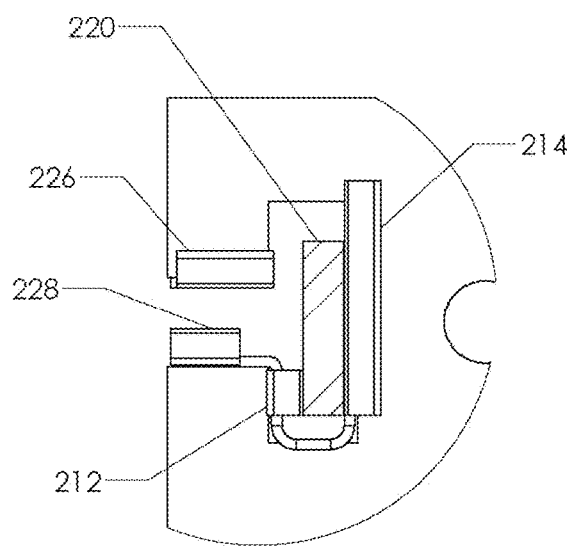
Figure 26A:
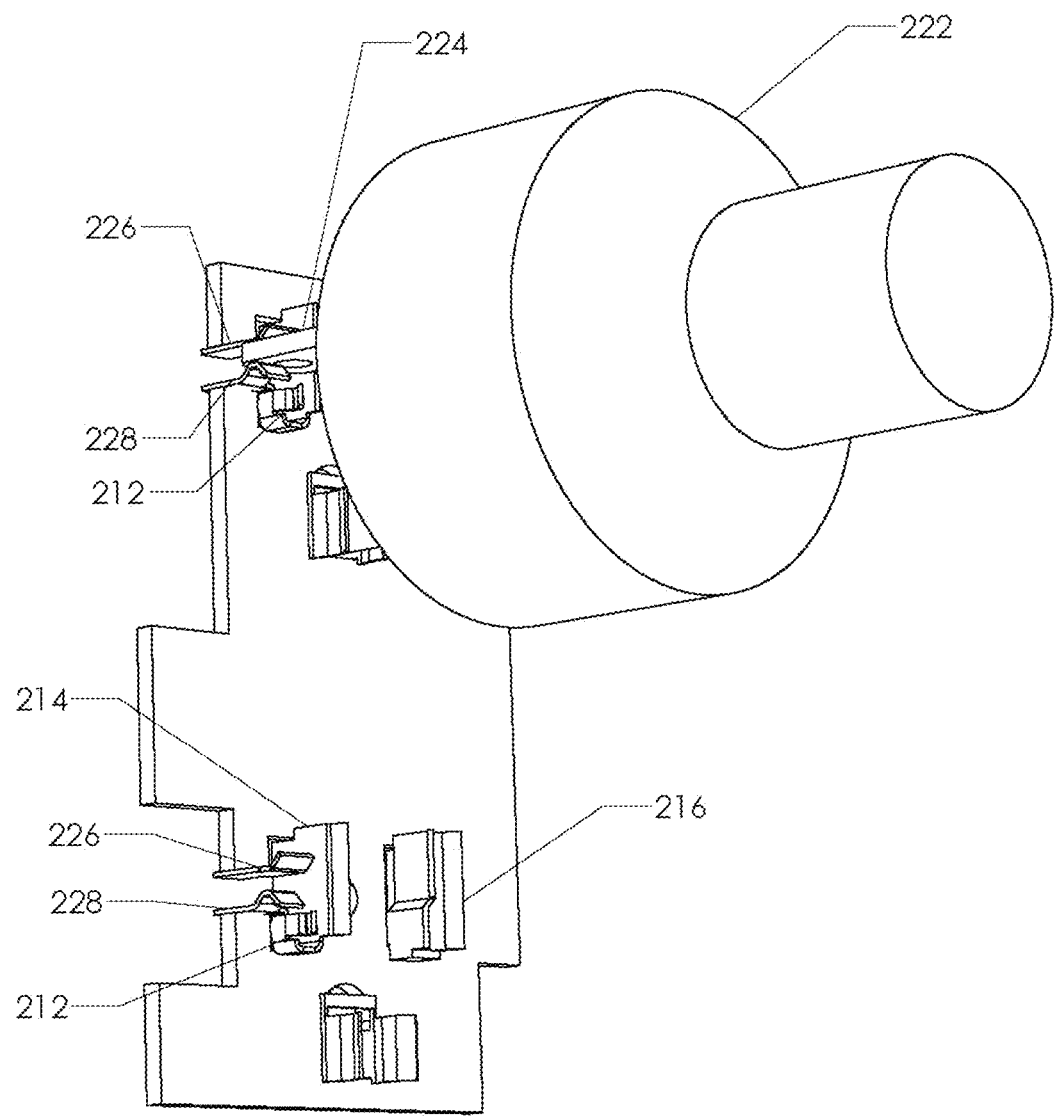
FIGS. 26A, 26B, 26C, 26D and 26E are various views of a 20 A plug inserted into the daughter board of the receptacle shown in FIG. 23.
Figure 26B:
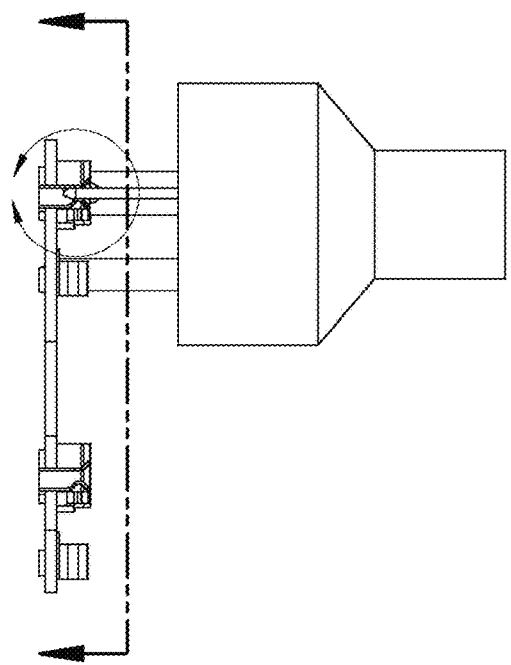
Figure 26C:
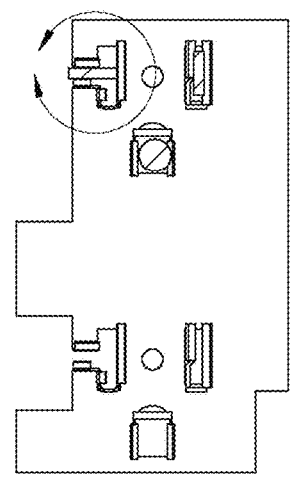
Figure 26D:
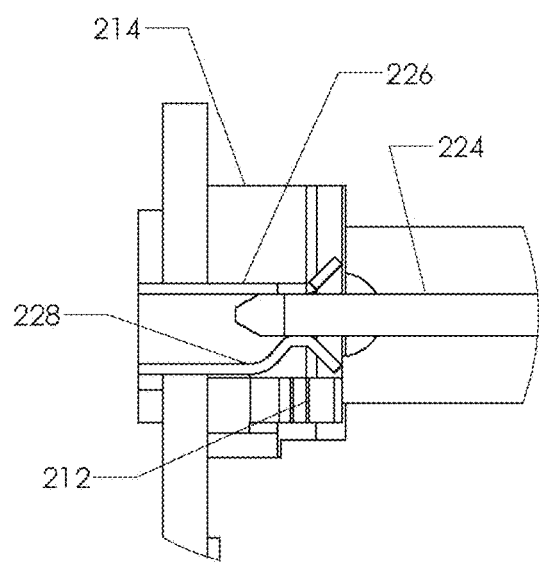
Figure 26E:
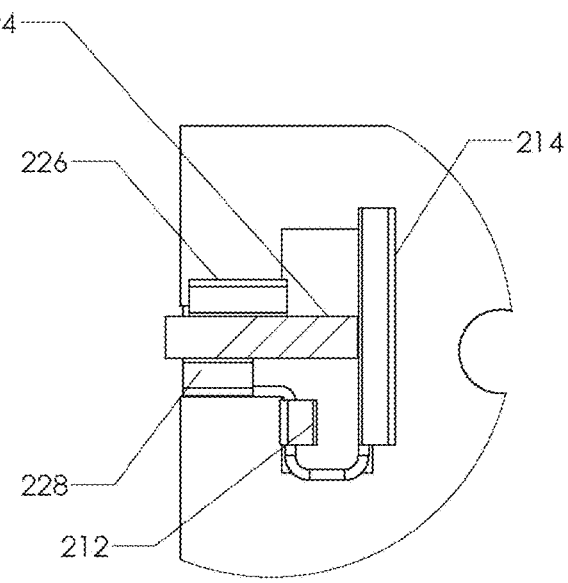

The reliability and lifespan of electrical components are enhanced by maintaining them at a relatively low temperature. FIGS. 21 and 22 exemplify provision in the receptacle of an oversized ground plate that acts as a heat sink for the electrical thermal components that generate heat, such as the exemplified TRIACs. A ground plate width and height are maximized on the front face. A bent flange on the receptacle side adds to the surface area and strength for heat dissipation. The ground plate may be constructed of galvanized steel or alternate thermal conductive materials. Fins may be added to maximize heat conduction surface area. FIG. 23 exemplifies a 15/20 A embodiment of the receptacle. FIG. 24 depicts ground plate with heat sink flange for the receptacle shown in FIG. 23.

Referring to FIGS. 25A, 25B, 25C, 25D and 25E, a 15 A plug 218 is inserted into the daughter board of the receptacle shown in FIG. 23. FIGS. 26A, 26B, 26C, 26D and 26E illustrate insertion of a 20 A into the daughter board of the receptacle shown in FIG. 23. Sprung contacts 212 and 214 and 228 sense insertion of neutral blade 220. Hot sprung contact 216 only senses the insertion of the hot plug blade. A neutral blade 220 for a 15 A plug mates only with neutral sprung contacts 212 and 214, as depicted in FIGS. 25A, 25B, 25C, 25D and 25E. Additional mating with contact 226 occurs only for insertion of a 20 A plug, depicted in FIGS. 26A, 26B, 26C, 26D and 26E. Blades 214 and 216 are sensed to determine the arrival time of each of the blades to confirm insertion of a plug rather than foreign objects. The orientation of the blades is also sensed by the contacts in order to determine if the plug configuration is for a 15 A appliance or a 20 A appliance 226. On the neutral side, there is the possibility of two neutral plug blade orientations. THE WHT/Neutral pin can be inserted vertically or horizontally. If vertical then the plug is signaling that it is a 20 Amp plug. If it is horizontal then it is a 15 Amp plug. For example, when the TR features of the circuit detects the second pin has been fully inserted, it sets the TR flag for the particular (upper or lower) outlet and sets its current rating. The current limit/rating for the downstream power is set by software (at manufacturer or by installer).

Figure 27A:
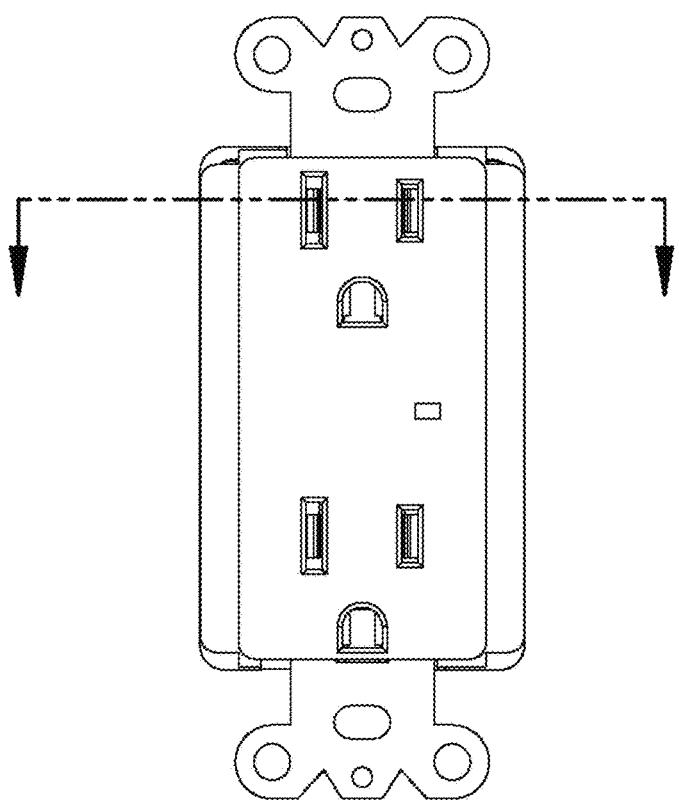
FIG. 27A is a front view of an example receptacle embodiment with micro-switch implementation for blade detection.
Figure 27B:
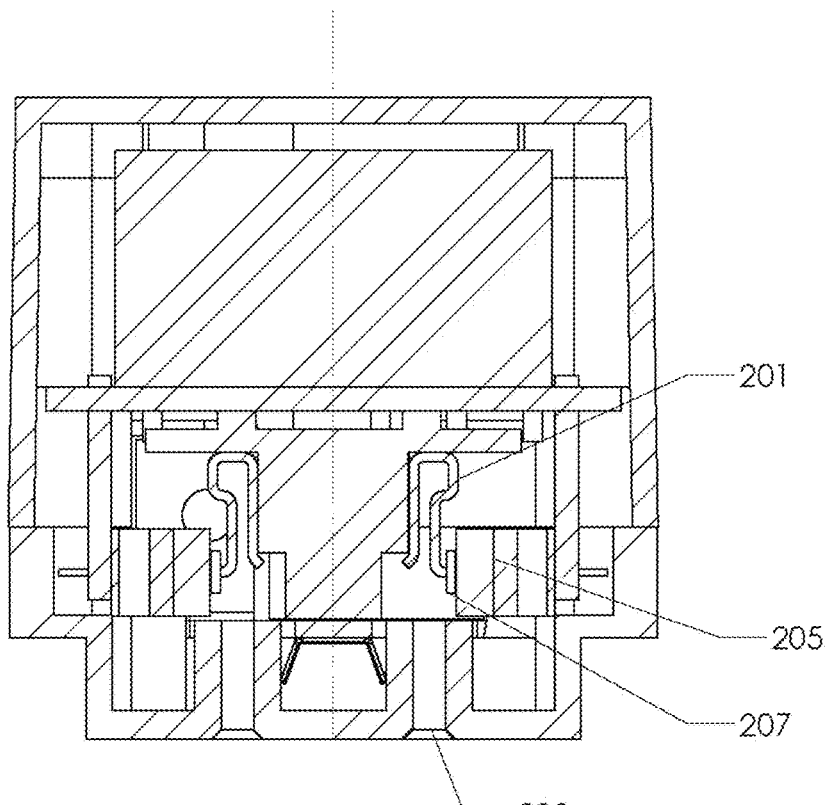
FIG. 27B is a section view taken from FIG. 27A.

Referring to FIGS. 27A-27B, micro switches 205 are used to determine whether there is full insertion of a plug blade. Sprung contacts depress switch push buttons upon insertion. Micro switch plunger 207 is depressed by the sprung contact 201 that is deformed when a plug blade is inserted into the outlet socket 203. The side of the plug blade is used to determine insertion time. This is because the variation in blade length allowed by standard is quite large.

Figure 28:
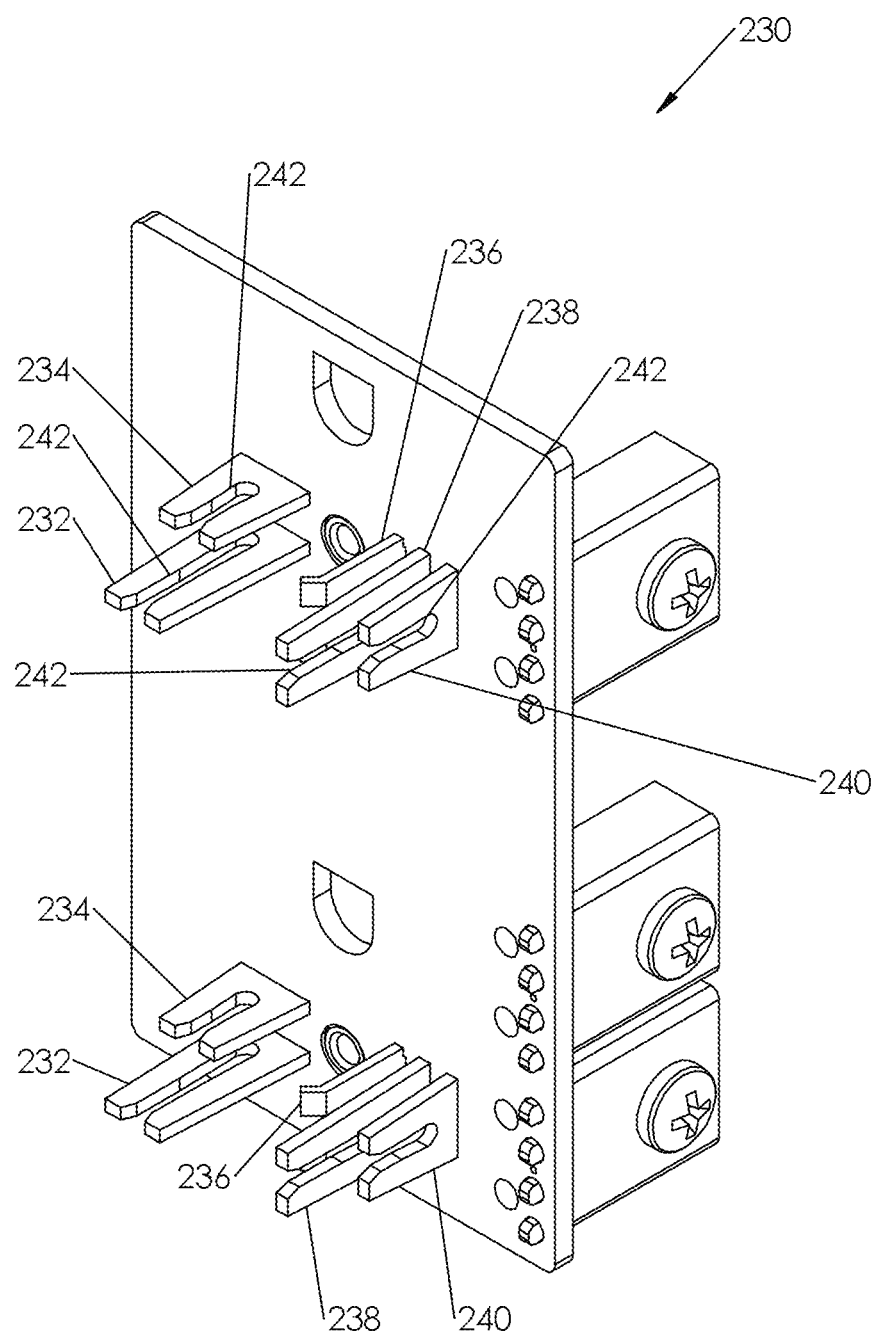
FIG. 28 is an isometric view of single circuit board of the embodiment of FIGS. 20A and 20B.
Figure 29:
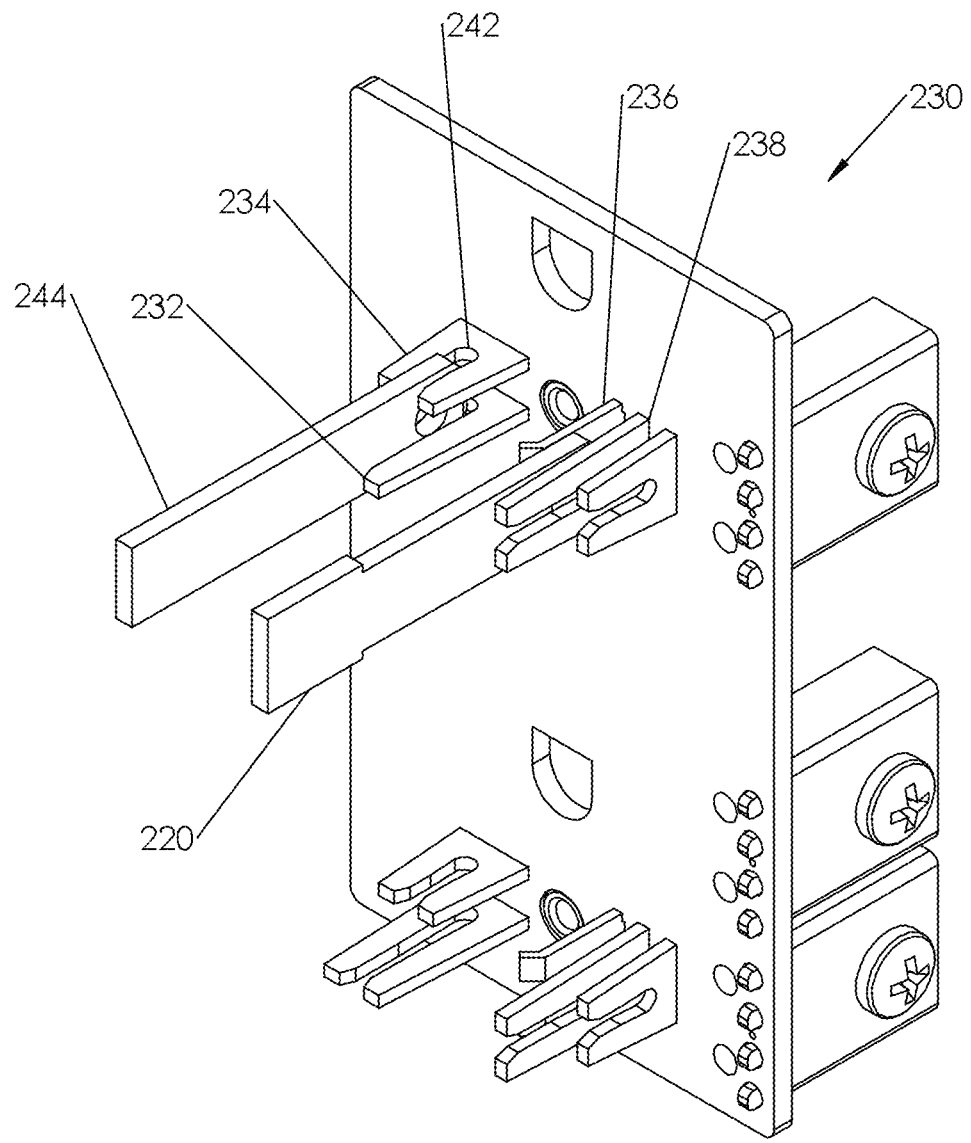
FIG. 29 is an isometric view of the blades of a plug in the single circuit board embodiment shown in FIG. 28.
Figure 30:
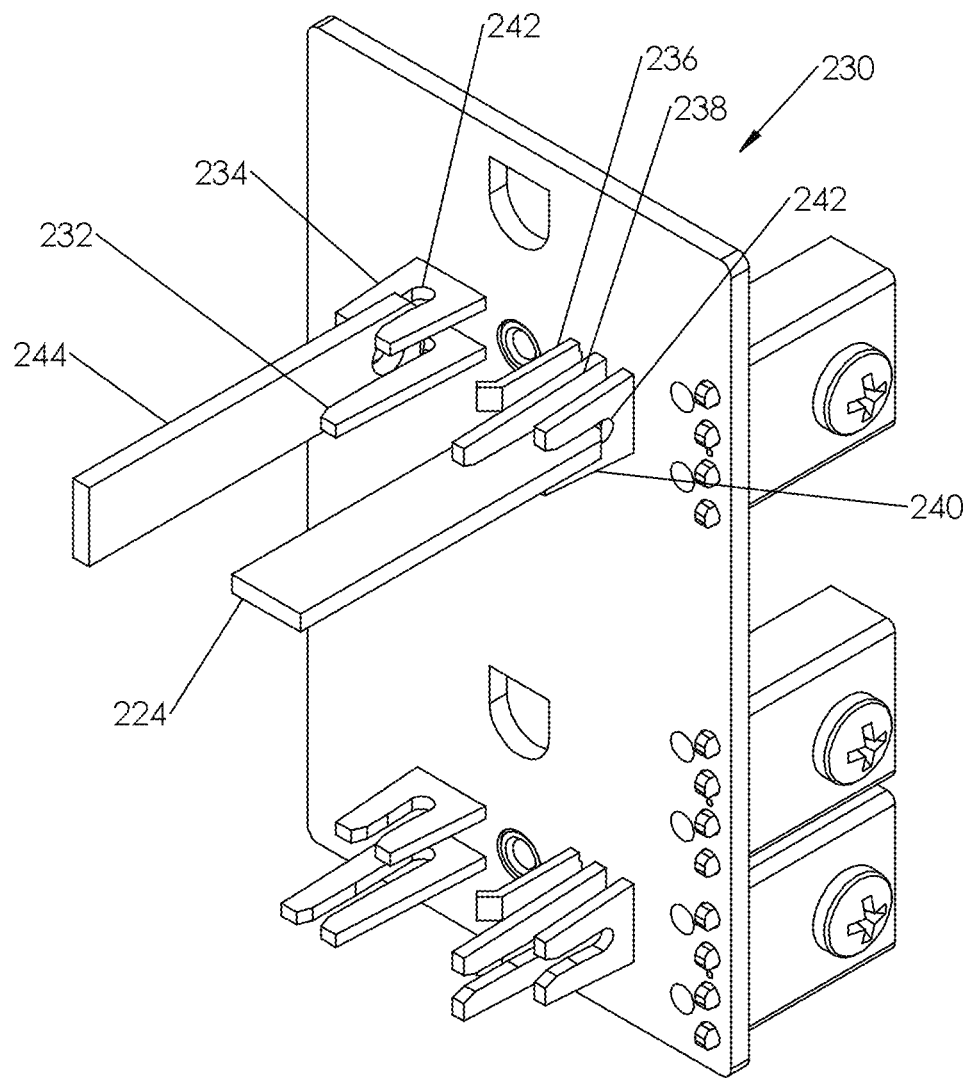
FIG. 30 is an isometric view of blades of a 20 A plug in the single circuit board embodiment shown in FIG. 28.

FIG. 28 is an isometric view of single circuit board that used both to sense blade insertion and supply power to the blades of the receptacles of FIGS. 25A, 25B, 25C, 25D and 25E and FIGS. 26A, 26B, 26C, 26D and 26E. The receptacle housings and ground plate have been hidden for clarity. FIG. 29 depicts insertion of a 15 A plug in the circuit board of FIG. 28. FIG. 30 depicts insertion of a 20 plug in the circuit board of FIG. 28. This configuration of contacts allows assessment of the arrival of blades and supply of power to the power contacts. Identification of whether a 15 A plug or 20 A plug has been inserted permits setting of the maximum trip current of the outlet.

For each of the two outlets of circuit board 230, there are two sprung hot contacts 232 and 234. Hot contact 232 supplies power to the hot power blade. Hot contact 234 is the sensing contact. For each of the two outlets of circuit board 230, there are three sprung neutral contacts 236, 238 and 240. Neutral contact 236 is the 15 A sensing contact, neutral contact 238 is the power contact and neutral contact 240 is the 20 A sensing contact.

Hot blade 244 closes the circuit between hot contacts 232 and 234, effectively sensing the arrival of the blade. Slots 242 in contacts 232, 234, 238 and 240 are sized slightly smaller than the thickness of the blade to allow the contacts to spring outwardly when a blade is inserted and apply pressure on the blade ensuring electrical conduction.

Neutral 15 A blade 220 closes the circuit between neutral 15 A sensing contact 236 and neutral power contact 238. Neutral 15 A sensing contact 236 is positioned at a distance, slightly less than the thickness of neutral 15 A blade 220, away from neutral power contact 238. When neutral 15 A blade is inserted neutral 15 A sensing contact flexes allowing the blade to be inserted and apply pressure on the blade ensuring electrical conduction.

Neutral 20 A blade 224 closes the circuit between neutral power contact 238 and neutral 20 A sensing contact 240. Neutral 20 A blade 224 does not contact neutral 15 A sensing contact 236 due to a clearance slot.

In this disclosure there are shown and described only exemplary embodiments and but a few examples of its versatility. It is to be understood that the embodiments are capable of use in various other combinations and environments and are capable of changes or modifications within the scope of the inventive concept as expressed herein. For example, the term "processor" has been used in this disclosure in a generic sense to include integrated circuits such as microprocessor, microcontroller, control logic circuitry, FPGA, etc. The terms "upstream" and "downstream" are used to refer to the respective relative direction in relation to the circuit branch originating at the electrical supply. The term "socket" has been used to indicate an individual contact of the outlet to mate with an individual plug prong. The terms plug "prong" and plug "blade" have been used interchangeably. While optical sensors have been illustrated, the concepts disclosed herein are applicable to the use of other equivalent sensors. Moreover, the data tables are shown as 1208, 1304, 1508 to relate to flow chart FIGS. 12, 13, 15 and 18. A single memory table of processor 80 comprises all of the described data tables. Reference to "deactivation" does not necessarily mean an explicit deactivation signal. Rather, the processor can comprise interlocking flags that ensure that the triac pulses on the pins do not pass through, are not active. When they do not pass through, this means that the power remains turned off and is not being turned on or explicitly activated.

Some example embodiments illustrate, but are not limited to, receptacles which typically include two outlets. These concepts are applicable to other receptacles of multiple other multiple outlets, one of which may lack a series switch. Moreover, although an electrical receptacle is described an example embodiment, the application of the features and means of accomplishing them are not limited to an electrical receptacle. While switches 2211 and 2213 of FIG. 2 are depicted as being tripped by an object inserted in the N socket, such tripping can, instead, occur from insertion of an object in the L socket. While a maximum time period of 25 ms for source connection has been exemplified in the description of FIGS. 2 and 3, a different time period is within the contemplation of this disclosure.

Figure 31:
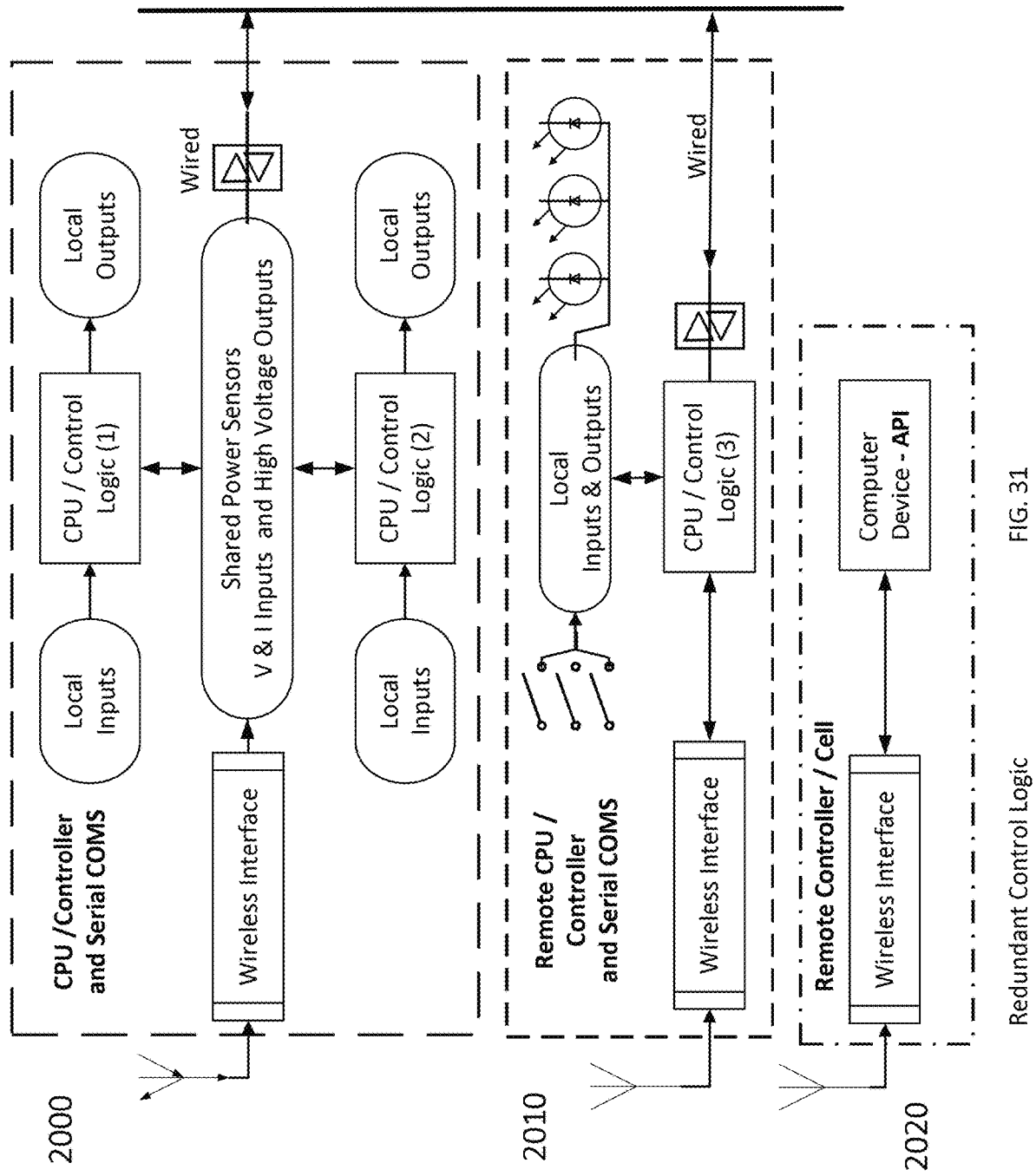
FIG. 31 is a block diagrammatic view of an example system which includes another example embodiment of the electrical receptacle, with shared processing.

FIG. 31 illustrates a block diagrammatic view of an example system which includes another embodiment of the electrical receptacle, with shared/distributed logic and shared/distributed processing. In an example embodiment, each block 2000, 2010, 2020 generally represents a separate processor. In an example embodiment, each block 2000, 2010, 2020 resides separately, at least as separate circuit boards. For example, in an example embodiment, blocks 2000, 2010 are separate circuit boards (with separate processors) residing in separate packaging, e.g. block 2010 is located at an electrically safe distance and can have its own associated local inputs and/or outputs. Block 2020 represents a separate device. "Wired" in FIG. 31 refers to the wired interface, buffer. The "wired" can comprise a data bus or connection such as an RJ-45 Data cable.

In the example embodiment shown, there are two separate processors, CPU/Control Logic (1) and CPU/Control Logic (2), which each can each handle (share) the same inputs and outputs (I/Os), including high power line signal inputs and outputs. There is a communication link between the two processors, which can be wired, wireless, or both wired and wireless. For example, these two processors can be configured to have serial communication (wired and/or wireless) there between. Antenna as input/output to wireless interface provides wireless (versus wired) communication between sensors and the control logic.

Block 2020 represents a separate wireless communication device, which can be a third party device, OEM (original equipment manufacturer) device, or other device that has its own CPU controller. Examples include wireless communication devices, mobile phones, laptops, and tablet computers. As shown in FIG. 31, there is also a wireless link that can go to block 2020.

The system shown in FIG. 31 illustrates an architecture that also gives redundancy to do enhanced safety type, in accordance with example embodiments. In block 2000, the CPU/Control Logic (2) is a redundant section for enhanced reliability.

Block 2000 can be used for the functionality of block 80 (described above with respect to at least FIG. 8). Block 2000 represents the control logic comprising of a processor and/or control logic, and its respective inputs local to the processor (such as sensors e.g. smoke, ozone, temperature, carbon monoxide etc) and outputs local to the processor (e.g.

LED's, sounder, separate relay, etc., providing an alert or voltage or signaling to another device). Another example sensor is a temperature sensor which senses electronics and temperature inside the receptacle casing. The provides a calibrated sensor source in-unit, wherein current sensors have certain variation so they can be compensated for drift by the appropriate processor.

The power sensors for Block 2000 can comprise high power current sensors and/or incoming voltage sensors. The high power current sensors can be Allegro™ sensors, in an example embodiment. For the high power lines, the block 2000 performs the monitoring, control and safety functions as described herein.

Block 2000 also provides for shared inputs and outputs processed by the second processor ("CPU/Control Logic (2)"). The processors for the CPUs, Control Logic (1) and Control Logic (2), are configured to communicate to each other through the central block as they share the wireless interface and/or the wired interface. CPU/Control Logic (2) can be a failsafe or override should CPU/Control Logic (1) fail. Therefore, in one example embodiment, CPU/Control Logic (1) acts as the primary control of the triacs and other control functions, while CPU/Control Logic (2) acts as a backup control. In another example embodiment, there is shared control by both the CPU/Control Logic (1) and the CPU /Control Logic (2), for example using an OR gate to decide on any particular control activity (e.g. activation, deactivation, interrupt).

Block 2010 differs from 2000 in that it does not have the related high power inputs and outputs. Therefore, in an example embodiment, block 2010 is a low power circuit board (e.g. all 5V as logic power), while block 2000 is a high power circuit board for passing and controlling the power lines, which comprise high power inputs and outputs, as well as lower power circuitry for logic and control functions. In an example embodiment, block 2010 can have its own separate power source, which can include a battery and/or a suitable AC to DC power converter, or receive its power (e.g., 10 volts or less) through the wires in the data bus such as an RJ-45 Data cable operating as POE (Power Over Ethernet) configuration. Zero power functions can also be included, such as including one or more manual dry contact switches that are processed by the CPU in block 2010.

Block 2010 can have its own associated local sensors inputs and/or outputs. Block 2010 can be a remote control head that passes commands off through a communication line to Block 2000, e.g. through the applicable wired and/or the wireless interface. Block 2010 sends messages to the power block 2000, to implement the safety features, monitoring and control, as described herein.

In some example embodiments, there are more than two processors in block 2000, multiple blocks 2010, multiple blocks 2020's, and/or multiple blocks 2000, which are all wired on independent buses or the same bus and/or may be configured to all communicate wirelessly to each other.

In an example embodiment, a dry contact switch can be included in any or all of the CPUs of block 2000 and/or, block 2010. The dry contact switch shorts two pins of the chip packaging of one of the CPUs, therefore providing a manually operated input command that can be processed by the CPU. The CPU can be configured to implement a suitable task or series of tasks in response to activation of the dry contact switch. The task can include deactivation of a triac or sending a message to one or more other processors. A dry contact switch does not require active voltage to manually input a command, but rather the applicable CPU can be configured to detect a short between two of its pins.

The vertical bar on the right of FIG. 31 is a data communications bus, for example discreet wires such as RJ46, twisted pair, low voltage low level wires carrying data in different directions.

Block 2020 represents a wireless communication device. In an example embodiment, block 2020 can be any type of wifi wireless computer programmed with a suitable Application Program Interface (API). Block 2020 illustrates that external devices can communicate with the electrical receptacle and the processors such as blocks 2000, 2010. Further user applications can be installed onto the wireless communication device to allow the user control of the settings, functionality, and some manual controls of the electrical receptacle. Typically, a user interface device is provided to the user through block 2020 in order to control the user applications, e.g. on, off, and dimmer.

The messages and commands are passed over various interfaces, such as wired (RG 45, RG 46 or other wires for different distances and environments) and wireless interface (e.g., wifi, zigbee, etc.).

With the second processor second processor "CPU/Control Logic (2)" it is possible to share the local sensors which senses the plugs when inserted, or temperature, or other input sensors, and accordingly control the power circuitry the load. In the event that one of the processors CPU/Control Logic (1) or CPU/Control Logic (2) goes down, the receptacle is still able to keep running. The processors can communicate with each other and with the controlled loads. The processors can operate the loads with on/off, or other power controls such as dimming, for example, effectively operating as low voltage switches or controls.

Figure 32:
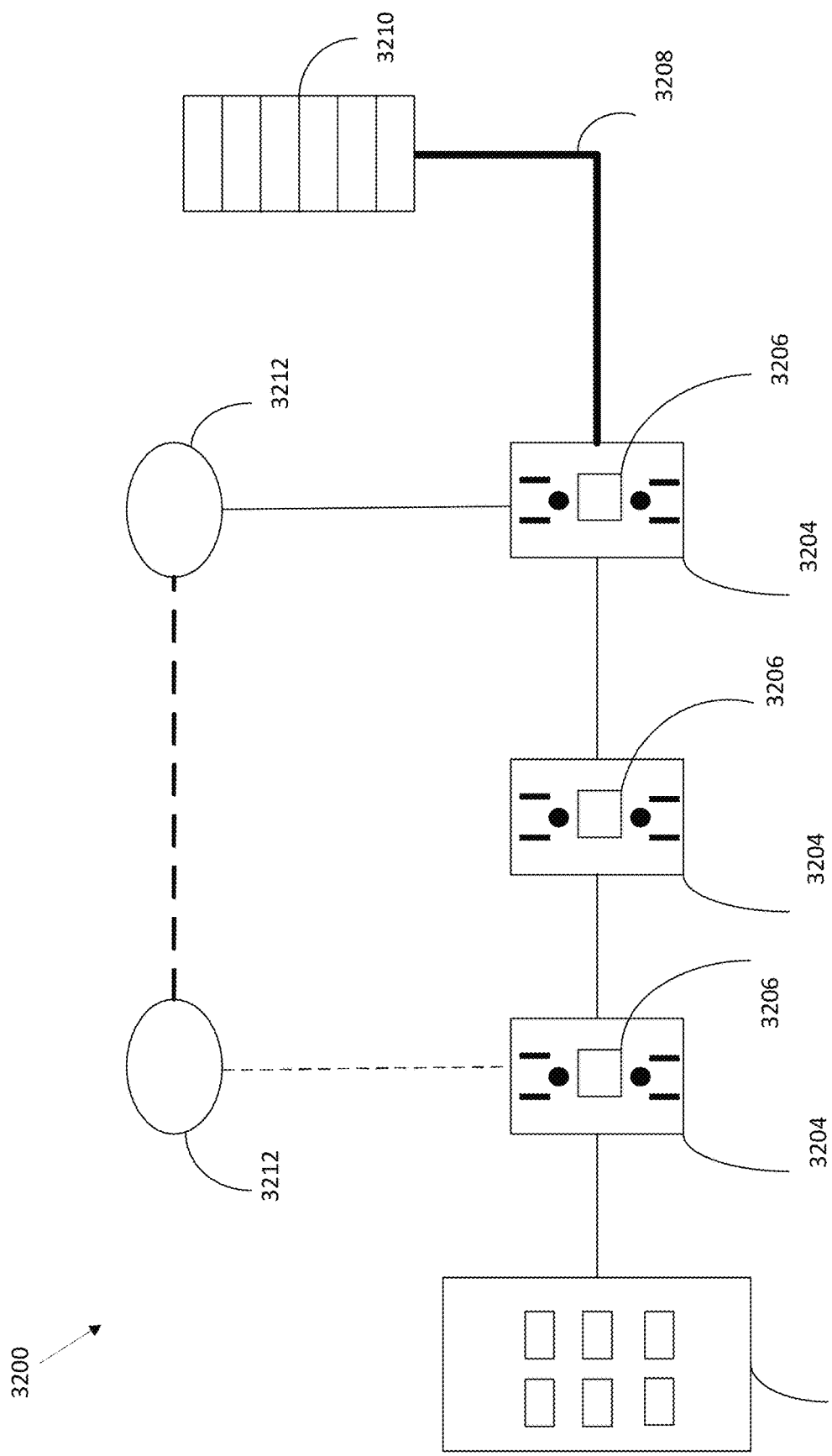
FIG. 32 is a block diagrammatic view of another example system which uses the electrical receptacle for monitoring and control, in accordance with an example embodiment.

FIG. 32 illustrates a block diagrammatic view of an example system 3200 which includes the electrical receptacle, for monitoring and control of local and remote loads, such as lights or remote lights of a home. In the example of FIG. 32, the system 3200 includes a breaker panel 3202, a plurality of electrical receptacles 3204, such as electrical receptacles having outlets and/or electrical receptacles without outlets, and a low voltage switch panel 3210.

The breaker panel 3202 divides an electrical power feed into electrical receptacles 3204 (and thus the loads 3212, which are remote to the breaker panel 3202), and provides a protective circuit breaker for each electrical receptacle 3204. Each of the electrical receptacles 3204 may supply power to the one or more loads 3212, such as one or more lights in a room or a house.

In an example embodiment, the low voltage switch panel 3210 replaces line voltage switches, 8 way switches, 4 way switches, etc. The low voltage switch panel 3210 may include a single switch low voltage panel or multiple switch low voltage panels.

The low voltage switch panel 3210 may be connected to at least one of the electrical receptacles 3204 via at least one communication cable 3208, such as a Power over Ethernet (PoE) communication cable.

In the example of FIG. 32, each electrical receptacle 3204 includes a Wi-Fi module 3206, which allows the electrical receptacle 3204 to communication with a processor or a wireless device. For example, the data collected at the electrical receptacle 3204 may be transmitted to the processor, such as the low voltage switch panel 3210, or the wireless device by the Wi-Fi module 3206; the processor, such as the low voltage switch panel 3210, or a wireless device can control the remote loads 3212 via the Wi-Fi module 3206. In an example embodiment, each Wi-Fi 3206 can be configured as an access point, a network extender, and/or a mesh network node. Each Wi-Fi module 3206 can include an antenna and applicable signal processors, hardware, and/or software. In an example embodiment, a Wi-Fi chip can be used as the Wi-Fi module 3206.

A plurality remote loads 3212, such as lights, may be grouped electronically. The low voltage switch panel 3210 may control the plurality of remote loads 3212 simultaneously as a group, for example when a plurality of downstream outputs or remote loads 3212 are grouped electronically.

The safety features of the electrical receptacle 3204 are included in a multi-zone controller giving full safety protection to the remote loads 3212, such as lights, that are desired to be controlled and monitored.

In an example embodiment, a keypad, touchscreen, or any suitable user interface can be installed to control multiple loads within a room, such as light switches, temperature controls, etc. In an example embodiment, the installer can run, e.g., 5 feet (152 cm) of CAT5 cable (or RS232 or twisted pair) and the rest over wifi to the receptacles 3204 from the lighting circuit area (switch, keypad, multiple buttons, etc). Control information can then be sent through the CAT5 to the receptacle 3204, which then controls and manages the power to the remote loads. User controls can be made to the keypad or touch screen to control the loads at the receptacle level.

In an example embodiment, the receptacle 3204 can be used so that an output contact/lead directly connects to a load such as a light receptacle, for safety, monitoring and control thereof. For example, a traditional light switch is a form of power control, but turning it on and off can generate arcs or sparks. The receptacle 3204 can protect against arc faults during on/off control of the lighting switches by applying the zero crossing switching technology described herein, because the switches do not carry power until turned on. The processor of the receptacle 3204 can further control the dimming functions of the light receptacle. Low voltage control of the light receptacle can also be performed by the processor 3210, for example using Power over Ethernet (PoE). In the example of FIG. 32, a PoE communication cable 3208 is used to connect a low voltage switch panel 3210 to a Wi-Fi module 3206 of an electrical receptacle 3204, for example, the electrical receptacle closest to the low voltage switch panel 3210. By connecting with the Wi-Fi module 3206 of an electrical receptacle 3204, the low voltage switch panel 3210 has access and control of all electrical receptacles 3204.

In an example embodiment, the Wi-Fi module 3206 of the electrical receptacles 3204 also can be configured to collectively define a wireless Local Area Network (WLAN), using the wired Local Area Network as a backbone (e.g. one of the power lines and/or low voltage lines), that can be used for local network access or Internet access. In an example embodiment, a gateway 3310 (FIG. 33) is configured to verify and authenticate access to the WLAN. The Wi-Fi modules 3206 are configured as access points to the network.

The receptacle 3204 enables replacing a light switch by using an in-line receptacle in accordance with example embodiments, whether the controller communicates with the receptacle via wires or wireless. In another embodiment, example embodiments of the receptacle can eliminate the light switch by controlling the power at the receptacle level, by using a logic command from a personal wireless device to communicate with the receptacle. The receptacle further provides the safety and fault response functions to the load (e.g. lighting receptacle) as described herein.

Another example embodiment includes a virtual control unit to shut off, which can include a dimmer, of a control switch for loads such as a light switch. An example embodiment can eliminate the traditional control switch. For example, the receptacle can be installed to act as a full control unit for downstream circuits. This has the benefit of minimizing wiring in a room by enabling, e.g. 1-2 outlets to become the command and communication central for an entire room or large area. Communication to the virtual control unit can be performed using a wireless communication device, for example.

In FIG. 32, all loads 3212 and lighting circuits of the system 3200 can take advantage of the fault protection systems described herein. For example, the system 3200 allows arc fault detection on the switching circuits of the loads 3212 (e.g. lights).

In an example embodiment, the receptacle is "always powered off" until initiated by the processor in response to turning on using the keypad or touchscreen or wireless communication device. Once it is determined that the safety checks are satisfied, the output power can is activated/energized to source the selected load(s).

Figure 33:
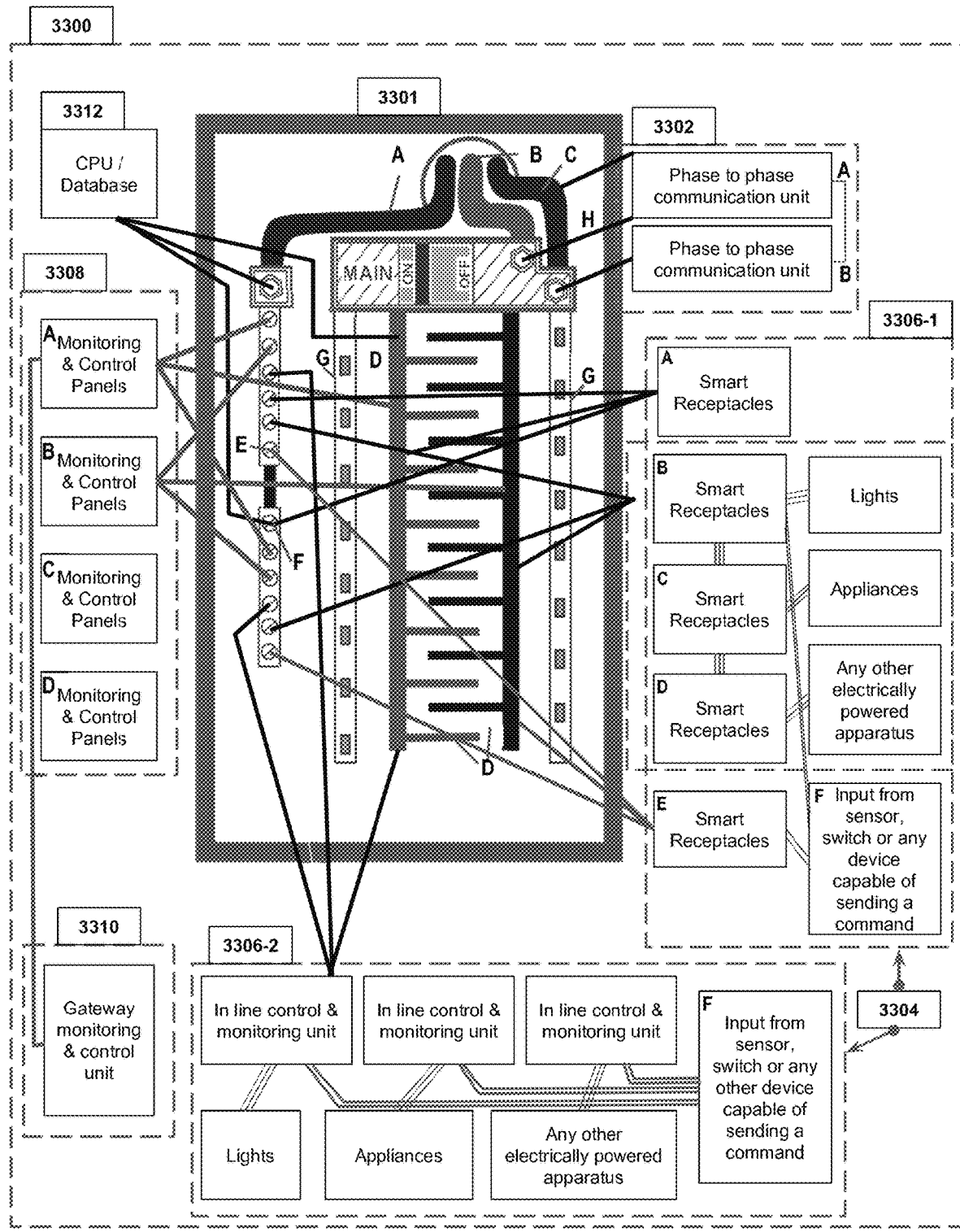
FIG. 33 is detailed schematic representation of an integrated control and monitoring system, in accordance with an example embodiment.

FIG. 33 is detailed schematic representation of an integrated control and monitoring system, in accordance with an example embodiment. FIG. 33 (BLOCK 3300) is a schematic representation of an integrated power control and monitoring system incorporating a breaker panel (3301), phase to phase communication units (3302); plug receptacles incorporating their own CPU and power monitoring and control systems (3306-1); in-line receptacle units incorporating their own CPU and power monitoring and control systems (3306-2); an external CPU and database system (database may be accessible externally) (BLOCK 3312); a gateway (BLOCK 3310); and monitoring and control panels (which may be wired or wireless) (BLOCK 3308). FIG. 33 illustrates having input(s) for sensors or any other device capable of sending a command to activate a specific part of the receptacle, whether upper outlet, lower outlet in the case of a plug-type receptacle, or downstream.

FIG. 33 illustrates integrated connectivity and the relationship between different apparatus within the system. FIG. 33 also highlights the concept of behind and outside a secured contained logical and physical space ("fence"), the fence defining and restricting/limiting access to and between protected units. In an example embodiment, the fence is in-wall, e.g. installed behind drywall or other wall boundaries.

A gateway (BLOCK 3310), in an example embodiment, illustrates that all the other communication is a "ring fence"; e.g. there is no external way to communicate with each and every receptacle or inline control unit without going through the gateway or without being physically connected to the electrical network of either the house, factory, plant, commerce that the system is installed into. The fence comprises a local wired network, that is associated with the electrical receptacles for communication there between, and for other communication functions.

BLOCK 3301 is a circuit breaker panel.
ELEMENT 3301-A is a neutral feed.
ELEMENT 3301-B is live feed phase 1.
ELEMENT 3301-C is live feed phase 2. Note that live feed phase 2 has a different phase than live feed phase 1.
ELEMENT 3301-D are ungrounded conductor (Hot) Bus that circuit breakers mount to.
ELEMENT 3301-E are connection points for neutral (white).
ELEMENT 3301-F are connection points for ground.
ELEMENTS 3301-G are mounting brackets for breakers.

BLOCK 3302 also discloses phase-to-phase communication, in an example embodiment. In particular, communication between two phases 3301-B and 3301-C is illustrated by means of two inline connection units (BLOCKS 3302A and 3302B) which connect to each of the two phases through connection points logs (ELEMENTS 3301 H) which are connected to each phase. These two units (BLOCKS 3302A and 3302B) incorporate their own CPU and can communicate to each other, and in an example embodiment monitoring and controlling voltage and/or current. The embodiment illustrates two phases, but there may be multiple phases and multiple respective inline receptacles.

Connecting a phase-to-phase communication unit to each phase and interconnecting each phase, allows for communication between each phase. The BLOCK 3302 acts as a bridge between the two or more hot power line phases. For example, the BLOCK 3302 can acts as a repeater, man-in-the-middle, etc.

Alternatively, in another example embodiment, ground (3301-F) to neutral (3301-E) wired communication can be used, replacing Block 3302. This is described in greater detail herein.

BLOCK 3306-1 represents plug receptacle power line connection to a breaker panel and to the potential downstream apparatus and control devices.

Although communications through the power line among each other is illustrated in this embodiment, the communications from the plug receptacles may be through low voltage wiring, or any of a number of wireless communication means and protocols.

Although plug receptacles with their own CPU ("Smart Receptacles") have been described in BLOCK 3306 of the illustration, the downstream of 3306-E may be traditional plug receptacles with, in an example embodiment, traditional tripping means.

BLOCK 3306-2 reflects power line communications to a breaker panel. It is a similar to the scenario in BLOCK 3306-1, but instead of specifying Smart Receptacles (with plug outlets), it illustrates a particular example of communicating in-line control and monitoring units (without plugs) to be inserted and connected within the circuitry of lights, appliance or electrically powered apparatus.

Figure 34:
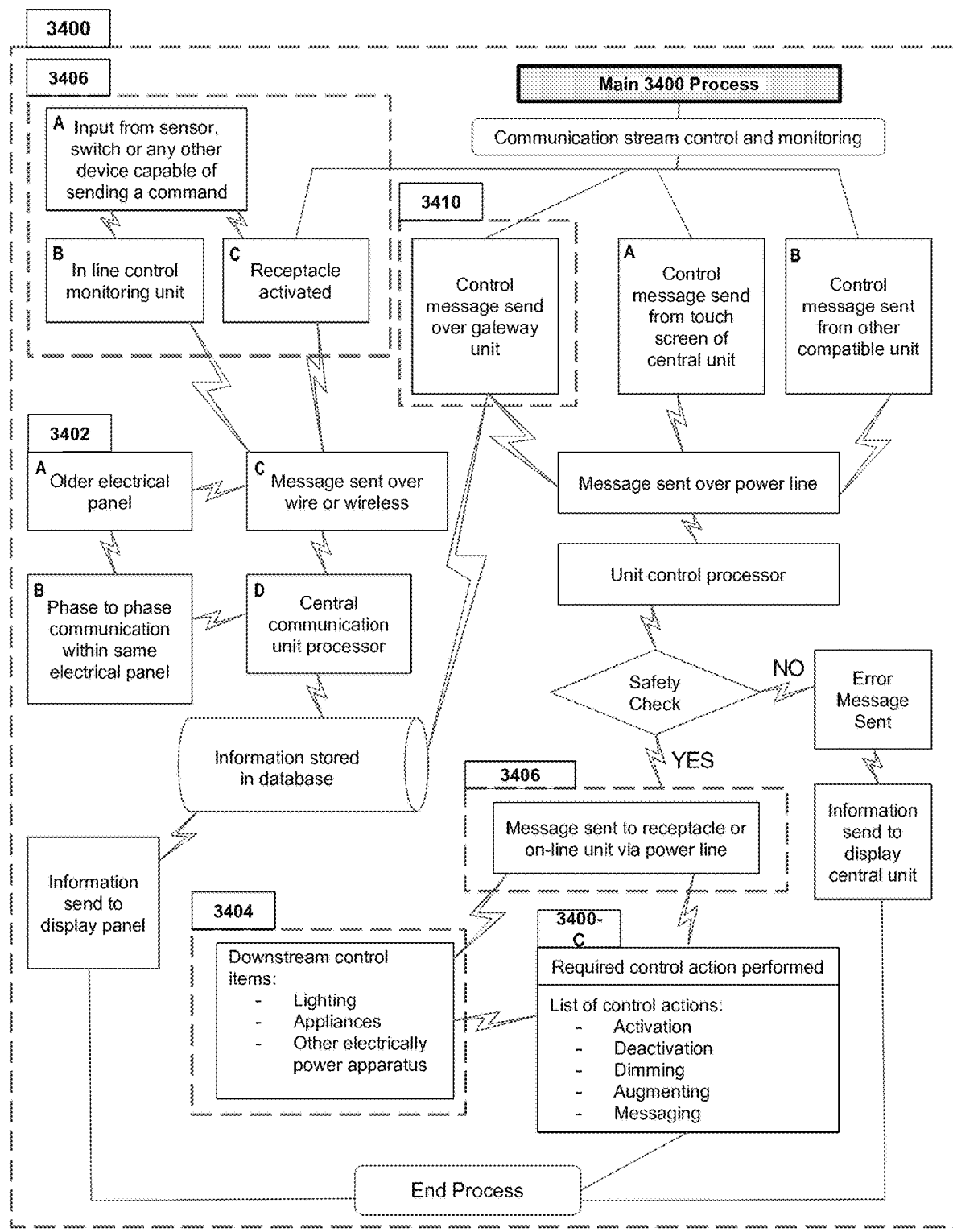
FIG. 34 is a communications diagram, in accordance with an example embodiment.

Communication and actions can also be triggered by any input from sensor or switch or device capable of sending a command (BLOCK 3306-2F and BLOCK 3306-1F) and as illustrated in FIG. 34, BLOCK 3400C.

Although communications through the power line through the breaker panel to communicate with each other is illustrated in this embodiment, in another example embodiment, the communications from the in-line receptacles may be through low voltage wiring, or any of a number of wireless communication means and protocols.

BLOCK 3306-1F and BLOCK 3306-2F illustrate that a command may be sent to control end of the plugs or downstream apparatus to the receptacle or in-line control and monitoring unit, whether light, appliance or other electrical apparatus, the command being initiated by any kind of input connected to the receptacle or in-line control and monitoring unit (for example originating from BLOCK 3306).

BLOCKS 3306-1 and 3306-2 also illustrate having more than one Smart Receptacle and having them able to talk to each other. On occurrence of a fault, no matter from where it comes from, there may be logic that may send a force trip to any upstream receptacle in the circuit. Detection of wiring faults or any other faults that may be detected from receptacle to receptacle or alternatively from control units shown in BLOCK 3306-2 or a combination of both. Block 3304 provides direct communicative connectivity between 3306-1 and 3306-2, if needed.

For example, if receptacle BLOCK 3306-1D detects a fault, it can be configured to send a signal to either 3306-1C or 3306-1B to ultimately trip themselves. Even on the downstream of receptacle BLOCK 3306-1D at any other electrically connected apparatus (including possibly a traditional receptacle), if BLOCK 3306-1D detects the fault, the logic behind BLOCK 3306-1D will determine if a tripping signal should be sent to BLOCK 3306-1B or 3306-1C disabling partially or completely the entire circuit.

In BLOCK 3306-1, top receptacle BLOCK 3306-A is stand-alone receptacle on a single stand-alone (dedicated) circuit (e.g. may be used for a refrigerator).

The three lower receptacles BLOCKS 3306-1B, 3306-1C and 3306-1D.

BLOCK 3306-1B is the first upstream receptacle going straight to the circuit.

BLOCK 3306-1B has downstream connection to some lighting and is also downstream to another receptacle incorporating a CPU. That downstream receptacle is also controlling potential appliances.

And BLOCK 3306-1D which is part of the same circuit is also part of controlling any other electrically powered apparatus. In case of a fault, whether the fault occurs from D's downstream, or any other receptacle it still detects a fault. Then depending on the logic instigated by that particular fault, it may force trigger 3306-1B or 3306-1C to trip.

In the above example, where BLOCK 3306-1 has been referenced, 3306-2 may be replaced analogously, or one may have a combination of Smart Receptacles and inline control and/or monitoring units.

In an industry environment which upon detection of a fault, requires the entire line to be shut down, the system in accordance with example embodiments may shut down either just the downstream of D, or may send a forced shutdown to C either for its downstream or for its 2 plugs (up and down), or send a full shutdown to B, which in turn may send a false trip, tripping everything through the breaker.

As losing power may cause loss of communications, battery circuitry may be incorporated in the receptacles to maintain communications functionality in the case of losing power.

BLOCK 3308 is an additional embodiment providing for monitoring input/output control panels (e.g. being display screens) which allows users to monitor and/or control activity of the entire the house. In this embodiment, the control panel(s) can control any receptacle unit or downstream circuitry.

This external CPU in BLOCK 3312 enables co-ordination and is different from the CPU's referred to in BLOCK 3306-1 which illustrates an embodiment using plug receptacles (having outlets), and from BLOCK 3306-2 which illustrates in-line voltage and/or current monitoring and control receptacles without plug outlets.

The CPU may reside inside BLOCK 3308 in the Control and Monitoring panel(s) or can be self contained.

BLOCK 3312 illustrates a CPU (e.g. processor) with a database stored in a memory. BLOCK 3312 may reside inside one of the monitoring control panels or be contained in its own separate box.

BLOCK 3312 acts as the central processing unit ("Brain") acting as an-line CPU and Database system to host all the information, reporting logic and control logic. This CPU 3312 is connected either wirelessly or wired into the system.

Each of BLOCKS 3306-1, 3306-2 and 3608 have own CPU and their own logic for their own usage.

However to monitor and/or control overall logic, interface and inter-relationships, the processor unit in BLOCK 3312 acts as an external processor providing control over the system.

BLOCK 3308 monitors the entire system. It illustrates additional functionality of monitoring and control (send messages) including any of the monitoring and/or control panels having segregated information to act upon.

The independent monitoring and control panels BLOCKS 3308-A, 3308-B, 3308-C, and 3308-D are shown as within their own secure area ("fence"). These monitoring and control panels illustrated are independent, enabling them, in an example embodiment if desirable, to be segregated, enabling the monitoring and/or control of specific I/O's. For example, this may be advantageous for use in multi family dwellings, and/or in environments where segregation is required such as business centers where one may want to separate the information, monitoring and/or control of power for different organizations. If sharing the same breaker panel, an example embodiment may segregate the information and/or controlled functions that is shared, enabling the segregation within the entire system.

BLOCK 3310 is a gateway 3310 which in this particular embodiment is connected to at least one of the monitoring units in BLOCK 3308 or may be connected through BLOCK 3312. In this example, the logic may reside at the circuit breaker panel 3301. Alternatively, the gateway 3310 may be connected through the 3306-1 and/or 3306-2. In an example embodiment, the gateway 3310 includes a Wi-Fi module for wireless communication and access to the fence. In an example embodiment, the gateway 3310 (or gateways) is the only way a device can wireless access the fence. In an example embodiment, the monitoring and control panels may be operably connected wirelessly.

BLOCK 3308 connects to the breaker panel and to the gateway 3310. In an example embodiment BLOCK 3308 can also connect through the communication plane to BLOCK 3306-1 and BLOCK 3306-2.

Triggers to launch any actions can be controlled by sensors, switch or any other mode of communication that can give a command. Can be simple switch or information (smart message that sends identification of who triggered the request to turn something on, then through communication can check data base and perform pre-established action for that individual, based on the data base of BLOCK 3312).

Both receptacle and inline units can be controlled by a mechanical or logical device within the secure "fence". Communications between objects can be controlled as a function of information, parameters, criteria in the database.

By connecting to the fence a device can have access to "everything". An example embodiment of the fence includes a mini-network of low voltage (input from sensors). Another example embodiment of the fence is communication over the power lines, e.g. the hot power lines or the neutral power lines. Sensor information may be sent through low voltage wires or wirelessly, in example embodiments.

Alternatively, replacing the phase to phase unit of BLOCK 3302) as described in some example embodiments, in an example embodiment there is a neutral-to-ground communication between the electrical receptacles, with or without communication with the circuit breaker panel 3301. The neutral to ground communication comprises inserting a small current between the white (neutral) and the ground in order to establish a communication plane that is not going through breaker system, thereby eliminating the need for phase to phase communication because the neutral and the ground is common to all element. The small current is voltage modulated to encode the desired communication signal.

Neutral to ground communication does not need to go through the circuit breaker panel.

Normally in the industry, communications taking place through inline wiring is interrupted if there is a power failure or disruption. Industry is typically limited to using the 110V carrier to transport a communication message. The disclosed means and processes in accordance with example embodiments eliminates this by inserting a low current between the white and the ground; and use this for communications. Communication between phases is not required with the additional advantage of preserving the communications in case of a breaker tripping event.

Industry is presently doing power line communications mainly by using hot to ground communication and using the 110 v as a carrier.

This results in problems: a. 110 v carrier is not steady carrier, variation in power is numerous and may cause issues; b. in a breaker box phase to phase communication is a major issue. An example embodiment bridges the hot line power phases on the communications side to ensure phase to phase communications is possible. Traditionally, using the hot as a method of communication, as soon as breaker trips, you lose complete communication.

An example embodiment includes neutral-to-ground as a way of sending data communications. At least one contact is connected to neutral (white) and another contact is connected to ground. A processor is configured to send wired communications over the neutral-to-ground.

The advantages of neutral to ground communications are numerous. There are no phase to phase issues. By adding a separate power supply, for example long life D battery (lithium) or rechargeable battery, the system can supply power if no power is provided by the power lines. Ground to neutral communication is not affected by breaker tripping. Another example embodiment includes a display screen having a user interface that controls other circuits, not losing communication is important. The system is not limited by the 110 v carrier and the associated limitations/problems. As the system is on Hot-Neutral small DC carrier or, in an example embodiment, RF communication can be done and allow for larger bandwidth to be transmitted.

Extra bandwidth on the power line communication taking place using ground and neutral wiring can be used to transmit data information or be used in isolation (e.g. using different frequencies) as a carrier for different signal(s) including but not limited to wireless (e.g. regardless of protocol such as WiFi, Zigbee, Z-Wave, Thread, Bluetooth etc.).

In an example embodiment, ground-to-neutral is being used as a communication conduit enabling the exchange of information between devices, for example by using a small (perhaps negligible such as <2%) portion of the bandwidth. The rest becoming available to be a carrier of any other information.

In an example embodiment, ground-to-neutral circuit is used as a communication conduit (sending/receiving data). In an example embodiment, a device acts as an interface enabling communications from wireless to communicate with a ground-to-neutral communication circuit. In an example embodiment, ground-to-neutral circuit is used as a wireless extender. In an example embodiment, ground-to-neutral circuit is shared by more than one communication function (e.g. isolation enables this).

With battery (e.g. lithium ion D battery, having a 20 year life, or a rechargeable battery), communications can be maintained if there is a power failure and/or breaker trips.

An example embodiment includes insertion of small DC current over neutral and ground. Then sending data over the DC current. Another example embodiment includes insertion of a RF modulation signal over the neutral-to-ground. For example, broadcast service such as Bell's service offering "Bell Fibe" ™ is broadcasting their TV signals over WiFi. An example embodiments uses the disclosed system to broadcast TV signal(s) within homes over the neutral-to-ground, thereby decreasing the significant powerful radio waves current used.

Furthermore, Wifi would not be required when the converter incorporated a communication chip, complete TV broadcasting can be done in the home using the neutral-to-ground network.

As well, generally there are access points whereby someone will try to cover large areas with few access points (e.g. one). There are health issues related to high power electromagnetic wave emissions. A person may be affected by waves/radiation. There is need to solve wireless radiation. There exists a need to reduce signal strength while providing wireless communications sufficient to satisfy increasingly higher speed requirements. Reducing signal strength to provide coverage for smaller distances such as five or ten feet may be advantageous.

An example embodiment includes power line communications whereby the described electrical receptacle acts as a repeater, access point, mesh network node, etc. The RF signals are sent to a receptacle that is configured to be emitting from the wired connection backbone. A Thread protocol can be a pipe (repeater). Each receptacle is configured to operate in a similar manner, for example as a pipe, repeater. An example embodiment includes using power line communications whereby each electrical receptacle is a signal line distributor, reducing strength of RFI, EMF. Access to the network is "localized" rather than transmitting over wide areas, sending data and acting as pipe. In another example embodiment a custom chip is used within the electrical receptacle that has Wi-Fi functionality and a processor of the electrical receptacle integrates the wireless communications within the backbone fence.

Another example embodiment is a neutral-to-ground communication device that comprises a plug that plugs into an electrical outlet. The communication device can further include an Ethernet port or other wired interface so that further communication devices can communicate over the neutral to ground power lines, via the communication device. The communication device can further include a wireless (e.g. Wi-Fi) module to wirelessly communicate with further communication devices, enabling those communication devices to communicate over the neutral to ground power lines. The communication device can be an Access Point, router, etc., in an example embodiment.

The access to the wired network backbone can move with the user. As the device of a user is accessing the particular Wi-Fi module and changes rooms, the same Wi-Fi signal comes from another electrical receptacle. The access point follows the user/device.

One aspect of this system is that there is a low cost device with power safety. This means that low signals are used instead of WiFi related higher radiation.

Existing industry systems do not bypass the breaker on breaker panel using Ground to Neutral. Breaker only opens the hot in the industry systems. An example embodiment of the communication system is bypassing the breaker by using neutral to ground communications. Traditionally industry goes through line voltage, hot, for a single hot line phase.

In an example embodiment, the communication over the power line does not use the hot, as it is not using 110 v for communications; rather neutral to ground is used. In another example embodiment, communication between the electrical receptacles over a low voltage lines also bypasses the breaker.

Regarding having a great deal of bandwidth available in neutral-to-ground communications to replace wireless. Rather than using wireless, the system is transmitting data using the described neutral-to-ground communications. An example embodiment includes replacing wireless in rooms by using extra bandwidth available in the described neutral-to-ground communications.

By establishing communication neutral-to-ground, the system is establishing a communication pipe while using only a very small percentage of it (in bits versus gegabits). Accordingly, have large excess bandwidth enabling the system to distribute internet to all the outlets that have communications in them. In each electrical receptacle (in-line or smart receptacle) there is a wifi (wireless) chip to provide communications in a room, which acts as a repeater. Similar to switching from one cell to another when driving a car; mobile devices can have the same handover operability for the rooms in a house. Rather than blasting wifi throughout a house, the system can use communication points of the communication fence to supply wifi to one room. Each room can have their own wifi.

An example embodiment is not restricted to using "a portion" of the neutral-to-ground circuit and the "remainder" being used for a means of creating wifi repeating. An example embodiment uses neutral-to-ground entirely; and another example embodiment uses the "remaining" bandwidth left over after a very small portion of the bandwidth is reserved for receptacle-to-receptacle monitoring and control communications.

An example embodiment includes distributed repeaters on neutral-to-ground circuit without using some of the technology features described herein (e.g., smart receptacles, tamper resistance, units). In another example embodiment, the neutral-to-ground communication is embodied by using a communication device that has a plug, and the neutral line is accessed through the neutral prong or pin of the plug, and the plug also has a ground prong or pin. In an example embodiment, the communication device is configured as an access point for wireless and/or wired access to the fence. In another example embodiment, the communication device is part of a load or appliance that is accessing the network through the neutral prong or pin. Another example embodiment does so in combination with the technology features described herein.

Typical devices in the industry, for example those that are plugged into a wall or Ethernet, do not neutral-to-ground. Industry is accustomed to sending data communications over 110V or low voltage wires, they have not traditionally considered communications over neutral-to-ground as the industry would not put 110 v through neutral-to-ground. And so the industry did not typically consider sending low voltage communications over neutral-to-ground.

In an example embodiment, the hot power line circuitry (110 v circuitry) is bypassed by the power line communication network. In an example embodiment, the neutral-to-ground circuit is used as a communications carrier using low voltage current. The neutral-to-ground circuit is used for the devices to talk to each other, as well as for external access (e.g. Internet, receiving a broadcast or RF signal).

An example embodiment does not require having to link all kinds of phases. In a warehouse, there can be many phases, e.g. 12 daughter panels with 2 or 3 phases in each. The neutral-to-ground circuit is common to all of them.

The modulation of the data, and sending current is described further. A driver sends current. Modulation of current and changes on that current that sends data/information. On neutral-to-ground, the device can be configured to send communication signal that is almost equivalent to point to point RF. In another example embodiment, the device is injecting a small DC current for communications over neutral-to-ground. There is no 110 v being affected here. The device is configured to send a message on current travelling over neutral-to-ground or, in an example embodiment, an RF signal. The RF signal is transported over a small DC current. Traditionally, on 110 v they are modulating data. The device eliminates the need to communicate on line voltage or wirelessly. As well, the communication network backbone does not require special wiring. It is desirable to use existing power lines to create wireless network. No need to use Ethernet or line voltage lines.

A specialized chip can be used by each electrical receptacle which will receive the neutral-to-ground communication, the complete bandwidth of gigabyte(s) and on other side of chip it can then transmit full gegabytes into a room. Typical industry chips are not available for neutral-to-ground.

An example embodiment includes a means or process which takes data which is coming from neutral-to-ground, and re-transmits it through wireless, or vice-versa. An example embodiment uses a wireless-enabled chip to transmit through wireless. The chip takes data that originates from neutral-to-ground and re-transmit through wireless. A combination chip takes communications coming from neutral-to-ground and converts (transmits through) to wireless (wifi, zwave, zigbee), Bluetooth etc.

Referring still to FIG. 32 and FIG. 33, an example embodiment is a dry contact switch that results in a series of activities from the electrical receptacles (e.g. smart receptacle or in-line unit). A processor or microcontroller can be used to implement the functionality. An example embodiment uses dry contacts which can be shorted to effect activities over extremely long distances. For example, a large manufacturing assembly might cover 1-3 km. The system uses the fence backbone. For example, at every e.g. 10-20 feet, there can be provided a panic button in parallel allowing any of a few hundred panic buttons to send a "stop" message.

By shorting the two wires connected to two pins of the processor, and instead of inline in the circuitry the two pins are shorted triggering information to be sent to one (or more) of the receptacles or inline units. This can include a preset task or tasks assigned to a closed circuit. So by shorting the two pins of a processor, a set of instructions would be executed by processor (or indirectly via at least one other processor). In example embodiments this results in immediate shut down for safety purposes.

Furthermore this would allow for typical security system to be connected to entire system through a single receptacle or in-line power unit, at that point, keypad, iris scanner, fingerprint scanner, voice-face recognition can be configured to transmit over twisted pair and the processor of that specific on line controller or receptacle can send information to the CPU 3312 and trigger pre-programmed instructions.

Industry systems normally go to mechanical response versus to any of the power on the circuit(s) to be controlled. Industry systems often use line voltage (at wall switch), the live 110 v lies there. On the other hand, in some example embodiment the switching is low voltage or dry contact. Example embodiments can provide for cheaper installation and longer distance that can be covered.

The dry contact switch refers to shorting two pins of a processor. In response, to the shorting, information is sent to another device (e.g. down the line) so that something takes place as a result. The shorting of 2 wires within the system, in an example embodiment, results in a consequential action that has been pre-determined. For example, the processor in the receptacle or inline unit, when the 2 pins are shorted, triggers a preprogrammed series of information to be sent to database engine, which when receives these instructions triggers series of events. For example, in a manufacturing plant when someone hits the panic button, everything stops. This is different from existing industry panic buttons which are connected to live power, and not through an electrical receptacle as in example embodiments.

An example embodiment is a system which intelligently deals with shorting. The shorting triggers an action. Upon a short, a processor is specifying a series of activities to be performed (based on database information). In traditional industry cases, it's usually one power line action as a result of a short. An example embodiment includes sending data down over a communication line upon detection of a short. An example embodiment implements a power control sequence in response to the short. Hit button, triggers series or sequence of other shut downs. In an example embodiment, controlling the electrical receptacle itself can be a result of a short.

The receptacle that includes the dry contact switch can stay live in example embodiments. The short of the two pins on a single receptacle can send a message to a device that is unrelated to that specific receptacle. The device can be another device that is contained in the entire system. By shorting the 2 pins on the processor of that receptacle, it can effect the closing/opening of something on another receptacle or device depending on what has been programmed.

In an example embodiment, the shorting of the pins triggers a message that the receptacle is to send another message(s). When message is received by the processor, it does database check which, based on condition detected, establishes and controls one or more receptacles and/or devices to be shut down (or what should be turned on; such as siren, sound). The triggering is low power or no power at all (e.g., dry contact, short).

The button does not necessarily have power in it, it is a short without a reference voltage. Note by shorting 2 pins on a processor, an action can be dictated or preprogrammed. In an example embodiment, that action is to communicate with the main CPU 3312 (FIG. 33) and tell the main CPU 3312 that there was a dry contact shut down by shorting the two pins. The main CPU 3312 in turn reacts to effect a major shutdown, when this occurs, to trigger "self destruct" sequence (shut down). A set of instructions which have been preprogrammed (or input in real time) are executed. The concept is that the dry contact is not only for that receptacle (as that receptacle might stay alive).

An example embodiment is a shorting of a device does not necessarily result in shutting down the particular outlet where the short took place.

An example embodiment is shorting of a device for anything other than shutting off an outlet directly related to the short. An example embodiment includes communication means that a short took place, which triggers other activities, not necessarily shutting power at the outlet. The communication can be either through low voltage sending information or just having dry contacts that by shorting them actions/instructions are triggered.

In an example embodiment, the low voltage is connected to Iris scanner, before entering room scan Iris, system recognizes the person, etc. Two pins on processor which allows twisted pair to be connected to. Any time the two twisted pairs are shorted a message is triggered which is sent to the database (e.g. of the CPU 3312) to determine and activates the next action. This includes but not limited to acting as a panic button; or turning on specific lights; or based on identifying information, turning on or not turning on power to specific outlets. Some example embodiments are not limited to 2 dry contacts, can be more in some example embodiments.

Having two dry contacts which as a result of shorting allows the system to perform series of activities, sending information that contacts where shorted, to the database where there are pre-determined set of actions to be taken based on the contacts having been shorted, e.g., not necessarily having anything to do with that particular outlet. The outlet can be configured for simply sending information to the power line phase that the particular short took place.

Reference is still made to FIG. 33, wherein examples of smart appliance and interaction with the smart receptacles 3306-1 and/or in-line units 3306-2 will now be described.

In appliances, example embodiments incorporate all described safety features of the described electrical receptacle outlets as well as communication ability to outlets/inline devices; and as well communicate to other appliances.

An example of a smart appliance is an oven having a camera. Based on face recognition, the oven won't be allowed to be turned on if it is a child who is recognized. The appliance is live, but the power button or use of oven is not permitted if facial recognition detected kid. Other devices can be used, such as biometric reader, finger print scanner, recognizing a mobile communication device and its associated identifier.

Example embodiments implement further safety features. The appliance, when turned on by the button, does not get any power from the electrical receptacle if the user is recognized to be a child. Other devices can be used, such as biometric reader, finger print scanner, recognizing a mobile communication device and its associated identifier.

In the case of an in-line unit 3306-2, in an example embodiment, a computer is hardwired, and the computer is provided a power profile of entire room, which can be controlled by the computer.

Typical industry breakers cannot communicate that the breaker has tripped. An example embodiment uses breakers communications that a breaker has tripped.

In an example embodiment, a power monitoring and control unit can be embedded in the circuit breaker panel 3301 in the same manner as embedded in an appliance, and upon trip, the circuit breaker panel 3301 can send message to entire system or to external unit/medium via the gateway unit, that the breaker has been tripped.

In an example embodiment, when an appliance wishes to be turned on, a message is communicated to a smart receptacle 3306-1. The smart receptacle 3306-1 is configured for testing if there is no power, concluding that a breaker has been tripped, e.g. voltage or current not at a specified level or within a threshold, or no voltage or no current, and communicating a message that breaker has tripped. It is possible to identify which breaker using information of knowing which circuit does not have power, since that is the hot power line phase that the electrical receptacle is installed.

An example embodiment includes monitoring current and voltage and determining that a breaker has been tripped, and sending such information or outputting to an output device, e.g. display screen.

As the inline fence communication is not breaker sensitive in example embodiment (the receptacle is sensitive for power, but not for communication) in the event that someone tries to plug a load into a receptacle or turn on a load from an inline control unit and no power is available, then the electrical receptacle can send message to an in-house screen, or wirelessly to an external source like a cell phone or user's device or to a monitoring station, that no power is available, e.g. "check breaker".

In an example embodiment, referring still to FIG. 33, 3306-1 and 3306-2 can determine that a breaker was tripped and can send a message "trip breaker". Alternatively, the communication device can be embedded in the breaker and the breaker itself can send message and based on logic in breaker it can be configured to also send out the reason for the tripping.

An example embodiment includes a breaker (or circuit breaker panel) that is configured to transmit information generated within breaker. The described the technology for electrical receptacles can be incorporated into a breaker in an example embodiment. For example, the breaker can communicate its load, potential power availability before a trip, allowing for reports to be done, on screen or printed of the entire power consumption circuit by circuit, or communicated to a monitoring system. An example embodiment includes adding breakers as communicating devices within the Internet-Of-Things (IoT) market. An example embodiment includes a breaker configured for collecting the information related to the tripping. An example embodiment includes the breaker communicating that information. An example embodiment includes the breaker being within the secure communication fence.

FIG. 33 illustrates communication within an appliance. As appliances are able to be connected via a smart receptacle and/or inline communicating unit, not only from power standpoint, but also communication standpoint. The system (BLOCK 3300) does not preclude communication via a power line. Further, the inline power monitoring and control board can be incorporated in an appliance; thereby enabling communications with the other receptacle (in-line units, smart receptacles, breakers).

In the case of an appliance having a battery system the power monitoring unit can be configured to detect 100% battery charge and shut down battery charging from the system. The electrical device can stop the power and send message ("unit fully charged"), the industry does not have such communications in theirs. The electrical receptacles stops providing power (e.g. deactivates the applicable TRIAC) in response to the battery being fully charged.

In an example, this does more than protecting against over charging, the system stops charging and continue automatically when there is a decrease in battery, and when the plug is plugged in.

FIG. 34 is a communications diagram, which illustrates an example embodiment. FIG. 34 is a block diagram of the possible communication activities deriving from electrical activities that are self triggered or remotely triggered within the integrated system illustrated in FIG. 33.

BLOCK 3410 illustrates a gateway control unit which acts as middleware or a hub, in that it can connect input source to another existing external controlled system. In an example embodiment, the gateway control unit 3410 describes the functionality of the gateway 3310 (FIG. 33). In an example embodiment, the gateway control unit 3410 is the only way in which external devices can be authorized to access the fence, either wired or wirelessly. Applicable passwords and/or IEEE 802.11 protocol implementation can be used to verify and authenticate access to the fence. In an example embodiment, the gateway control unit 3410 can be configured as an authentication server, such as a Radius and/or AAA server.

Whereas BLOCK 3410 illustrates activity triggering outside a fence; BLOCK 3400B illustrates command sent by a unit contained within the fence. BLOCK 3400A may be a user input; BLOCK 3400B may be a sensor input; BLOCK 3400-A may be from an external input source such as manual input, mobile device, existing control unit, etc.

BLOCK 3406 shows that a Smart Receptacle or an in-line control unit (in example embodiments with or without communications capability) may be activated in multiple ways:

BLOCK 3406-C illustrates a receptacle having a load connected to it. This triggers the communication activity of sending power to the actual unit. Alternatively the triggering of the activation of the receptacle can be done by an external device, 3406-A whether a sensor or a switch, or any capable device.

The same device may either activate a receptacle, or an in-line control unit in 3406-B.

Upon the activation of an inline control monitoring unit or a plug receptacle, Block 3402 illustrates that a message can be sent (3402-C) over wire or over wireless.

3402-A shows the case of wired with an older breaker panel but incorporating phase to phase communications from FIG. 33 (BLOCK 3302) whereby one device per phase would be installed to link communication between the phases.

In an example embodiment, a message is sent to the CPU 3312 which retrieves from the database the actions required upon either a receptacle being activated or the inline control.

This information is used by one or more of the display panel units (BLOCK 3400A being equivalent to BLOCK 3308 in FIG. 33).

In order to inform one or more users or one or more systems, that a specific receptacle, for example, was activated. Furthermore upon sending a message to an external device or system, the system may wait for confirmation or further instructions.

The triggering can be done using inline control monitoring as illustrated in BLOCK 3406.

The logic determines whether it was safe to activate or not.

The inner logic inside the CPU of the two apparatus (either or both Smart Receptacles or in-line control & monitoring units) are determining whether or not it is safe to proceed, or by connecting to the CPU unit shown in 3302-D.

Where 3400A or B the message may come from a display panel unit in which case it is sent over wired or wireless to the unit control processor, which has to run a safety check to see if its safe to power the specific plug receptacle or inline control unit receptacle. If it is safe, then in the logic of 3406 a message is sent to the plug receptacle or the inline control receptacle unit via wire or wireless (3406) and at that point the information to start the downstream control is sent.

3400-C shows a list of potential control actions. 3404 lists potential downstream items that may be remotely controlled; e.g. lighting, appliances, electrically powered apparatus.

Accordingly, this enables the turning on-off, or activating or de-activating, dimming and/or augmenting, and the sending of messages.

In an example embodiment, there is a complete series of triggers that can launch any of the actions. These can be controlled by sensor(s), switch(es) or any mode of communication that may launch a command. Two wires transport a signal which may be triggered by a simple switch or smart message information which identifies the person who sent the request to turn something on, then based on information about individual appropriate actions can be taken.

Both receptacle and inline unit may be controlled by logical device within the fence. Logic in CPU 3312 can be configured to determine the action(s) to be taken.

By connecting to 110 v circuitry, all information is available.

An example embodiment also may include low voltage network within the system (inputs from sensors in blocks 3306-1 and 3306-2 may be low voltage). May send communications wirelessly or through low voltage wire. All the apparatus are all connected through ground, neutral and connection to a 110 v phase. In an example embodiment, communications between devices are going through the breaker panel to communicate with each other.

Figure 35:
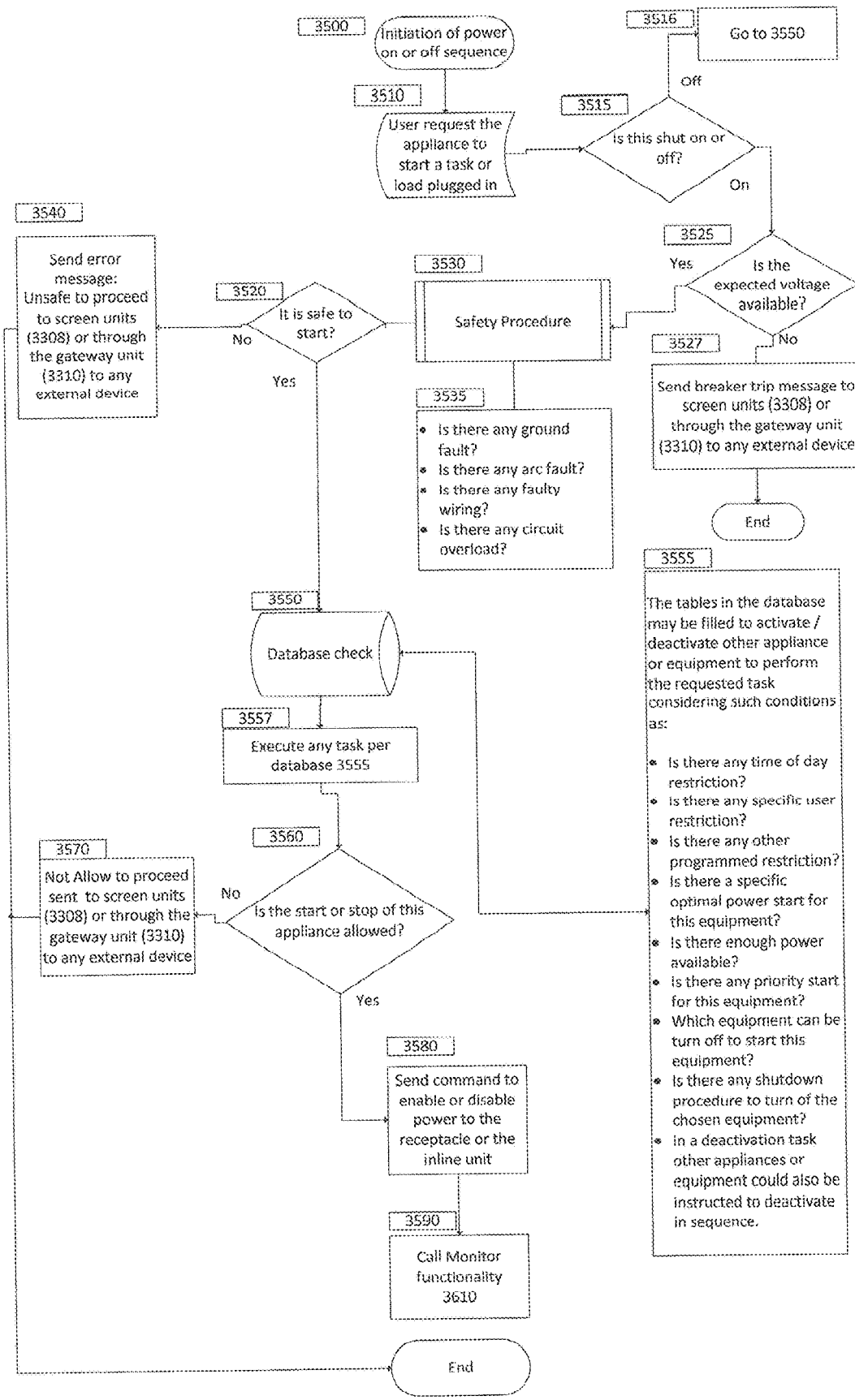
FIG. 35 illustrates a processing task flowchart of criteria and activities related to initiation of power upon a user-initiated or load request.

FIG. 35 illustrates a processing task flowchart of criteria and activities related to initiation of power upon a user-initiated or load request (Step 3500). At the first step 3510, a request has been initiated (for example from an input screen, or remote gateway, or switch on a wall to turn on or off power to the circuit of a receptacle or an in line monitoring and control unit; or a plug is plugged in to a particular receptacle, or request for the downstream on a receptacle.

For example if there is a single string of lights, the entire string could be turned off remotely. Each circuit is independent so data base can include instructions to power and/or de-activate power for a particular circuit on a receptacle (such as upper outlet, lower outlet or downstream) or in line unit. Turning on or disconnecting power may be triggered by a number of events, including but not limited to: plugging or unplugging a load; sending a command to an in line unit; or sending a command to the downstream of a receptacle or in line unit.

In addition to processes to be initiated upon the turning on of power, there are circumstances as well, upon which it may be desirable to have initiation of processes which take place upon disconnection of power.

Devices may be unplugged for a variety of reasons. Although the action of unplugging a load may not be prevented, a message (including but not limited to audio, display, video etc.) could be transmitted to other devices, outlets, receptacles, in line monitoring and control units, and user(s) (or to a cell phone, an alarm monitoring company, etc.) communicating that a particular critical device has been unplugged; for example in the case of a critical device such as a dialysis machine, artificial respirator, etc. being unplugged.

Similarly, if such device(s) is hardwired into an in line control unit rather than being plugged into an outlet or receptacle, a communication might be initiated and for example an affirmation response or a security password might be required prior to permitting the power to the device to be disconnected.

Step 3515 establishes whether power is being turned on or off. If power is being turned off, the process continues to the power down sequence. Step 3560 considers safety issues (including but not limited to ground faults, arc faults, faulty wiring, over current etc.) related to turning on or off equipment and then proceeds to step 3580 which will enable or disable the receptacle or in line monitoring and control unit, or specific circuit of each. If at step 3515 power is being turned on, then the next step proceeds to 3525 to see if power to the receptacle is available. Step 3516 checks the database at step 3550.

If yes, proceeds to a first set of safety procedures; 3520 send message that it is unsafe to start (3540). If safe to start, proceeds to 3550 for a data base check. At step 3557 database commands are executed; if any of these commands are a start or a stop, then proceeds to step 3560; otherwise the process continues to step 3570. If it's allowed, the process continues to proceeds to step 3560, to enable the power. Once power is enabled, the circuit becomes monitored by the process in FIG. 36.

Once a load request has been initiated, at step 3525, the voltage is verified to be as expected; for example, 110 v or 220 v (or within an acceptable range of the expected voltage. Should the voltage not be as expected (block 3527), a message is sent to inline display screen(s) or through the gateway to any external device indicating that the breaker is tripped. In an example embodiment, the circuit breaker is tripped, and/or the power to the outlet is disabled. In an example embodiment, there is a system measuring a voltage on a circuit, and upon determining that the voltage is not within an acceptable voltage value or (predetermined) range, communicating that the breaker has been tripped.

If the power is as expected, the process continues to block 3530 to test for one or more safety conditions. At step 3520, should any of the illustrated faults in block 3535 (examples only) be established, then it is determined that it is not safe to start, and the process continues to block 3540 whereby an appropriate error message notification is transmitted to an e.g. display screen (3308) or through a gateway unit (3310) to any external device. At this point power is not provided to the appliance or load which may have been plugged in.

At step 3520, if it is determined that it is safe to proceed to initiate power, at 3550 a database check is performed (as illustrated with examples in block 3555) providing criteria determining whether the particular outlet or appliance should be powered, whether other equipment or appliances should be powered or have their power disabled, whether a particular sequence of turning power on or off (de-activated) should proceed, and more.

Following the database check (Block 3550), at step 3560 if the start of the particular appliance or load is not permitted based on the database check, then step 3570 proceeds, transmitting an appropriate communication to a displace screen (3308) or through the gateway unit (3310) to any external device. Providing of and/or disabling of power to outlets, receptacles, devices, and/or inline units proceeds according to the database criteria established and identified in 3555.

Following the database check (Block 3550), at step 3557, should any load or device require power, then the 3500 routine would be initiated on a sequence of its own for the particular device(s) identified in the database.

Following the database check (Block 3550), at step 3560, if the start of the particular appliance or load is permitted, then at step 3580, a command is sent to activate power to the receptacle or the inline unit. In an example embodiment, information related to the activation may be communicated to any output means such as an inline display units (3308) and/or through the gateway unit (3310) to any external device.

Upon power being activated the processes outlined in FIG. 36, to monitor the ongoing integrity of the circuit is initiated. The processes in FIG. 36 apply to all units which may have been activated as a result of the database check at step 3550 as illustrated in 3555.

In FIG. 35, the process constantly waits for load request(s) and for the occurrence of possible faults (e.g. Gfi, Afci, faulty wiring, overcurrent, etc.). Block 3555 is organized by different categories of information in a database that is being checked. Block 3555 a set of possible instructions preprogrammed in a database (alternatively, dynamically input by user) to allow or disallow turning on either an appliance or plug load.

For example: there can be groups for specific appliance in discussion such as time of day or specific user restrictions or based on the circuit availability information or specific power requirement for that equipment. If there is not sufficient power available for that specific equipment, is there a priority list that would shut down temporarily other equipment to provide sufficient power for this equipment/appliance.

In an example embodiment, the system can therefore implement an "acceptable" overload. This differs with some existing standards or factor-of-safety industry practices that require conservative breaker selection, since those methods cannot react quickly or cut off power at the particular fault.

If there is no issue, e.g. wiring not heating up, integrity of circuit is ok, the system operates as no longer. In other words, the system design is no longer bound by existing 80% "safety" standards. Some example control of the breaker trip may even exceed 100%, for example go to 105% (acceptable "overload").

Referring again to FIG. 33, note that there are loads that are downstream to the receptacles. A smaller version of power control and monitoring unit can be further than downstream into electrical components and talk directly to the load (e.g. appliance).

In an example embodiment, a toaster can have low voltage battery controlling circuitry without power, and upon time to start toasting can be configured to talk to the receptacle. This can have advantages: limiting power consumption to minimum; providing outstanding safety as although appliance is connected, it would not receive power until required (and power safety features). There are additional green energy savings (besides safety).

All power control and monitoring can be concentrated on single circuit and applied to the appliance which becomes arc fault, ground fault, surge, over current etc protected as well as supplying power to the appliance itself.

Any appliance, engine, pump, anything functioning with electricity, can be equipped with functionality, subset of micro circuitry. Bringing households, commercial, industry—closer to complete power control. Circuit gets closed as lever is brought down (live) but electricity is always there with possibility of getting electrocuted. For example, a knife closes the circuit. As soon as toast pops back up, there is no longer any power provided by the electrical receptacle. In the present case, a utensil accessing toast would have no possibility of shorting circuitry as power is off. Circuit can be embodied in any appliance.

An example embodiment is an appliance decides when to turn power on from the electrical receptacle. A battery can be used to keep logic control alive. There is no 110 v until toaster lever pushed down; then within few milliseconds when lever up again, sends message that power no longer needed. To prevent a person from being electrocuted, when lever off, the toaster communicates with plug and gets power when needed only. The circuit board can have small battery to keep logic on. Until lever at bottom, no power. In an example embodiment, toaster can communicate through the ground-to-neutral communication phase (if it has ground). The toaster can configured to send low dc voltage to keep logic control of the plug up.

Example embodiments can require one circuit board, rather than the multiple circuit board devices described herein. The device needs only one, in an example embodiment.

An example embodiment is a means enabling an 'appliance' (e.g. toaster) to have safety features and not be powered until the processor of the electrical receptacle decides it is ok to do so based on safety features or other criteria, and upon said decision activate power to the appliance.

An example embodiment is an appliance comprising of a CPU monitoring current and/or voltage having communication means to receive external instruction to turn power on.

Other appliances or loads can be used in other example embodiments, and are not limited to a toaster, for example. Extend one step further the "no juice until needed" by bringing it to the appliance.

Since there is unit to unit (receptacle or inline units) communication. Circuit starts at breaker, all receptacles talk to each other; and from one to the other they know the current that the other one is expecting. If not getting what is expected, then there is a wiring issue and can establish preprogrammed events.

Conditions, actions based on conditions, profiles. When there is means to identify a person, the system (electrical receptacles) can be customized to that person's needs. The system can restrict others based on their profiles, so that power access to an electrical receptacle is restricted. For example, an appliance such as a stove or oven can be configured with a camera or biometric reader to identify the person who is turning on the appliance. The identification of the user can be verified against the database. For example, the person turning on the appliance may be a minor that is under 18 years old, and appliance will request the electrical receptacle to turn on power, and the electrical receptacle will not activate power upon receiving the instruction. Similarly the electrical receptacle will activate power to the receptacle if the person is authorized (e.g. authorized adult). The database can be stored as a white list and/or a black list, in example embodiments.

In an example embodiment, the CPU of the electrical receptacle knows the current on the circuit when a device is being plugged in, so if exceeding 15 A when plugging in a device, do not activate the electrical receptacle and can send message to closest screen unit that have exceeded capacity of circuit (e.g. total 15 A). When another device is plugged in, while not allowing the "offending" device to be plugged in, the another device may be activated with power if permitted.

The system can recognize power losses, and identify which wires have a problem. An example embodiment is an apparatus within a circuit talking to each other, preventing overload and electrical fires by monitoring current all the way through. Even if improper wiring (too small gauge) the system can identify and then eliminate potential electrical fire. Electrical fires, accompanied by power losses, the CPU of the electrical receptacle know where power has issued and so does not turn power on. With the described systems, a designer can exceed 80% of 15 A safely, and the system can prevent overload specifically.

In example embodiments, using a processor can be used to optimize power sent to device. For example, deliver specific wattage based on voltage and current the device wants to receive. This provides modification of the signal in real time. The electrical receptacle can be configured to optimize and deliver power actually sent to device to its performance characteristics. For example, if an engine works best at 12.3 A at 110 v; if voltage fluctuates to 120 v, the electrical receptacle can be configured to reduce to 11.7 A, for example. The electrical receptacle can dynamically always ensure target power is provided to engine for example.

In an example embodiment, the electrical receptacle can be configured to control both voltage and current delivered; therefore constantly modify and send what's ultimately and optimally required. For example, skipping phase, or even injecting additional current from a power source to compensate.

For an appliance, in an example embodiment, the electrical receptacle can attenuate or enhance based on voltage variation. If current is optimal is there then any traditional system would work; but if power fluctuates, the described electrical receptacle can deliver specific power, and control current and can let voltage fluctuate, and make sure power never changes with respect to a target power.

Another example embodiment includes attenuating or enhancing (increasing) wattage to optimize use of appliances, using an electrical receptacle.

Another example embodiment provides further protection when within the appliance: for example the feed from the wire is encapsulated in a waterproof environment so that when the 110 v (example) circuit is opened no person can get electrocuted as it still is not closed by the water infiltration to live wires. One aspect is that the high voltage side is isolated so that the water penetration cannot close the circuit.

Rather than destroying the circuit of the toaster (frying the circuit) the circuitry detects the ground fault and shuts down (i.e. stays "off", doesn't turn on the triac) the power to the toaster. For an appliance such as a hair dryer, line voltage side is completely isolated If GFI the low voltage side gets disconnected completely.

In an example embodiment, one set of instruction that can be preprogrammed. One step further is a smaller version of a circuit board and providing with communication unit to appliance manufacturers. For example, a toaster can be equipped with system. It would have zero power until push lever all the way down, coordination between the appliance safety system of the toaster and the circuit board can be achieved either with prioritization or timing. Then toaster would communicate with the plug (e.g. request 110 v). When toast comes out, it communicates in milliseconds and it becomes tamper proof.

Devices, appliances (toasters, oven, etc.) can be safe with power not being turned on unless there is no safety fault. An example embodiment is a safest appliance whereby power isn't turned on unless no fault. An example embodiment is the appliance is communicating with the outlet.

An example embodiment allows different receptacles and/or inline units to talk to each other and also verify that the voltage and current expected to arrive is actually arriving; and if not, then declaring that there is a fault and the cause/reason, and communicating that that reason should be investigated. Therefore shutting down and, in an example embodiment, sending a message to investigate. For example, faulty wiring, faulty equipment, etc. Until this is resolved, the power will not be turned back on.

Block 3510: examples of sending a request to equipment/appliance to start a task includes but is not limited to turning on elements for toaster; turning on elements of a stove;

turning on lights. If someone plugs in an appliance in a receptacle, this makes the switch turn on and requires an action.

Sending trip to breaker: In the database, if an event is of such magnitude that it's safer to turn entire circuit off. Refer 3300 which refers to 3306-1 and 3306-2 which illustrates on a single circuit smart receptacle and inline communications module can be interspersed, mixed matched.

FIG. 36 illustrates a processing task flowchart (3600) of ongoing monitoring of the integrity of power line circuitry and response to fault(s), and associated block circuit diagram (3650-1). Block 3640 is a starting point describing ongoing monitoring facility of circuit integrity. The process loops monitors for faults, including but not limited circuit overloads, until a fault is found. If fault is found, then step 3645 proceeds with a data base check at block 3655, which initiates a fault sequence shut down. If fault detected at step 3645 is an overload, at step 3649 the entire circuit is examined. Both occurrences trigger access to the data base but different sections. However, one is searching for a string sequence shutdown 3655; the other is looking for information related to alternative priority access to available current on the circuit 3651.

Example, if equipment on the circuit can be temporarily cut off, to give another plugged in device priority. After step 3652 a user may be informed of an action taken (step 3653) after which the integrity of the circuit is re-established therefore returning to step 3640 (step 3654).

For example, in a kitchen, should a device, appliance require power, but such power would exceed circuit safety considerations or specifications, then a refrigerator could be turned off for a few seconds or minutes, and then be turned back on again, when there is sufficient current. Accordingly, data base information may provide either a specific shut down sequence due to an electrical fault, or the circuit load balancing and/or prioritizing can take place if there is an overload. In the data base for example with medical equipment one could have a priority sequence for certain equipment over others which are not as dangerous to shut off, or for a limited time, etc. The disclosure herein can also be applied to load leveling and peak shaving applications. Upon detection of a fault, at step 3658 a message can be sent to a display screen or gateway.

In case of power overload, a circuit balancing message can be communicated (3653) that temporarily a particular piece of equipment had its power disabled in order to allow another specific load to be powered (as specified in the data base) and prevent circuit overload. The data base can include sophisticated If/Then conditions.

Step 3659 examines and acts upon if a major fault is detected. If so, a force trip can be sent to the circuit breaker causing it to trip.

In an example embodiment, on one side continually monitor if there is a new load request. If there is, then call subroutine 3510. If there is not, continue monitoring. At same time, constantly monitor the safety of the circuitry (e.g. arc fault, ground fault, faulty wiring, etc.). In order to do so, constantly monitor if all the units along a circuit are receiving the expected voltage and current based on the circuit loads; if true, then loop back to 3640; if false make decision at step 3649 which can go to 3655 and do a database dip (step 3655) to check for the shutdown sequence required based on the event that was monitored. At step 3658, send a message to the closest screen or any unit programmed through the gateway that has been pre-programmed to receive that message. In case of major fault the first unit in the circuit sends a force trip to the breaker at which point the circuit is fully shut down. In order to be re-established it needs to go back to 3510 procedure for restarting. Step 3658 sends an error message. Step 3659 sends force trip to the breaker.

Decision step 3649 can determine if the fault is due to overload, if so step 3651 checks database for overload management task or sequence of tasks. Step 3652 executes overload management task or sequence, step 3653 sends applicable error message, and then step 3654 proceeds to step 3640, e.g. continuous monitoring.

System 3650-1 in FIG. 36 explains how the circuit integrity actually works and the relationship between each and every one of them. When the breaker (3301, FIG. 33) is intelligent, it becomes a device within the fence as illustrated FIG. 34. The breaker 3301 would be the first one in line, in an example embodiment. In the event that the breaker is smart breaker with the circuitry described herein, the breaker is part of the secure fence communications network.

In FIG. 36 and system 3650-1, intentional tripping of the breaker can also be implemented. Smart breaker would not need to control the receptacles 1 to 8. It can communicate directly with appliances/loads in an example embodiment.

Cross-interaction can be implemented. Normally a breaker trip and would result in shutdown of everything. In the present case the system can be configured to shut down certain receptacles based on load created issues; without tripping breaker.

FIG. 36, beginning at 3600 discloses ongoing circuit integrity monitoring. The intelligence being on all the equipment, e.g., receptacles and/or inline units having a CPU monitoring and controlling current and voltage. The circuit allows for a complete monitoring and acting on all possible events that can occur on an electrical circuit; including but not limited to faults such as ground faults, arc faults, overload conditions, etc. In an example embodiment, specific action(s) can be triggered based on a data base preprogrammed action plan. Block 3600 monitors power quality and safety conditions on a continuous basis. Block 3650-1 is a graphic representation of an electrical circuit behind the fence. 3650-1 describes units on circuit receiving expected voltage and current.

FIG. 3650-1 is a representation of an electrical circuit illustrating a receptacle(s) and/or in line monitoring and control unit(s), showing that the voltage and current can be monitored at each and every step, and detecting the fault if the expected voltage or current are not what is expected (e.g. due to faulty wiring). The relationship between receptacles and in line units is primordial. In case of major event, system can force breaker to trip.

If a breaker itself incorporates the processes or means herein disclosed, within the security fence, then breaker device itself can be incorporated within security fence. Monitoring the interaction of every unit in a circuit and being able load balance, shed off load based on data base priorities.

In FIG. 36 at Block 3650-1, the concept of each receptacle or inline unit are ordered in sequence on a circuit and they interact with each other:

They exchange load, voltage, current and safety condition

From one to the other in sequence with the system it is now possible to calculate expected voltage and current and compare it to actual values and therefore being able to detect abnormal losses, detecting potential hazards and taking action based on the preprogram sequence of event in the database.

Based on the gravity of the fault certain units can be shutdown or a message may be sent to unit 1 to send a trip to the breaker.

In the event that the breaker is equipped with the logic and communication circuitry than it becomes part of the calculation and string of actions.

In all event, messages can be sent to the monitoring screens (3308) or to the gateway unit (3310) for external apparatus depicting the events and their gravity.

This functionality can also be used for load measurements and prevent breaker trips, preserving the integrity of the entire circuits and unexpected shutdowns.

Step 3640 continuously monitors both safety and load requests (3510, FIG. 35). As long as there are no issues detected at step 3645, another decision is made at step 3650 which can proceed so that the monitoring will continue (3640) continuously monitoring if there is a load; if request for new load it will call on 3525 (FIG. 35). The information at 3640 will know the load went down; but went down in the expected manner (not a fault). Decision step 3650 can also determine that the units on the circuit 3650-1 are not receiving the expected voltage and current, and proceed to step 3655.

The process illustrated maintains the integrity of the circuit; can prevent at minimum unexpected shut downs, unexpected breaker trips; and because of sensitivity of software the electrical receptacle can control the trips far quicker than any breaker can. In the event the breaker does not have logic and communications circuitry inside it, then the first receptacle or inline unit on the circuit will act as a gateway and will have ability to send forced trip to the breaker if required.

Figure 37A:
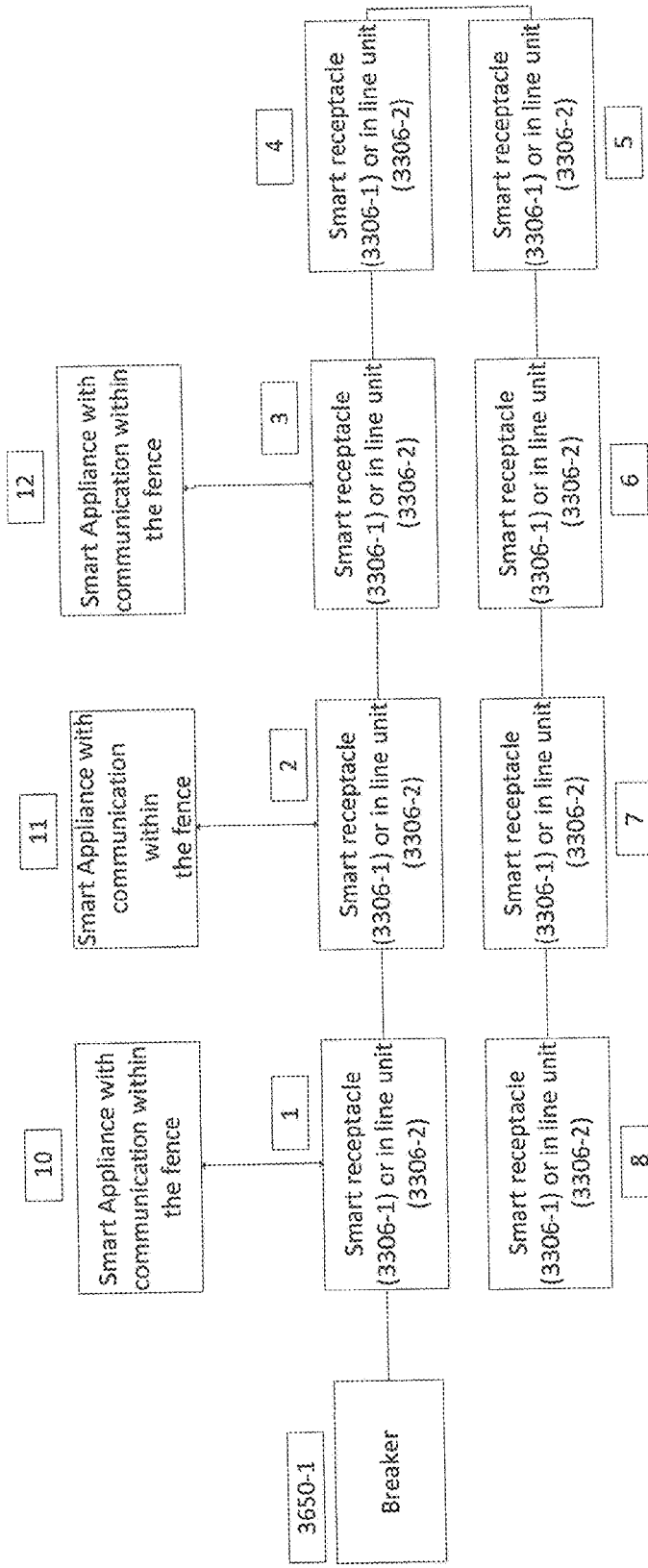
FIG. 37A illustrates a block circuit diagram of another example embodiment of a system which includes smart appliances.

FIG. 37A illustrates a block circuit diagram of another example embodiment of the system 3650-1, which further includes smart appliances. FIG. 37A shows appliances included to network of receptacles and/or in line monitoring and control units. The sensors monitoring the inputs and the outputs of the voltages, can send messages to the local intelligence of the appliance.

FIG. 37 illustrates an example embodiment of microcircuitry that can be integrated into an appliance or another powered device. Shown are BLOCKS 3700, 3701, 3702, 3703, 3704, 3705, 3706, 3707, 3708, 3709, 3710, 3711, 3712, 3713, 3714, 3720 and 3721. Block 3700 describes another embodiment, namely a minimized version of the circuit board with the capability of being integrated inside appliances. The circuit board includes a processor and memory. The functions that are taking place are similar to the ones taking place in a receptacle, but specific to control a single power input. This can allow the complete monitoring of voltage and current within an appliance, allowing therefore the security fence to be pushed back in one step further into the electric circuitry. It can be used both independently just to monitor power and currents and power faults, or can be used in conjunction with the communication module, thereby allowing it to be used within the communication matrix referred to in FIG. 33, 3306-1F and 3306-2 F, being within fence while having access within the communication matrix.

Block 3710 overall shows the complete functionality of the system that allows for constant monitoring the faults, allowing the added security of making an appliance Ground and Arc fault proof, thereby extending the safety net one step further. Block 3701 indicates an input trigger by a touch sensor. Upon the sensor activation, the CPU engages with the preprogrammed control and through the optional communication unit could request power from the receptacle or in line control unit to the specific appliance.

Message can be sent to a graphic display within the fence referred to in FIG. 33, step 3308, or within the appliance itself on its own graphic display.

Upon database verification as shown on FIG. 35, at step 3510, if it has been established that the power is acceptably delivered, then at this point the system is now one step deeper downstream into the circuitry shown in 3600.

BLOCK 3707, 3708 or 3709 refer to the logic within an appliance and interaction taking place within the circuit. BLOCK 3710 refers to the possibility of interacting with wireless communications interface to use the gateway or any communication interface within fence to remotely start appliances. BLOCK 3720 uses the system gateway (FIG. 33, step 3310) to allow external source(s) to send commands to a specific appliance. The system allows an appliance to be controlled directly remotely (for example, from smart phone devices, tablets or other means).

Figure 38:
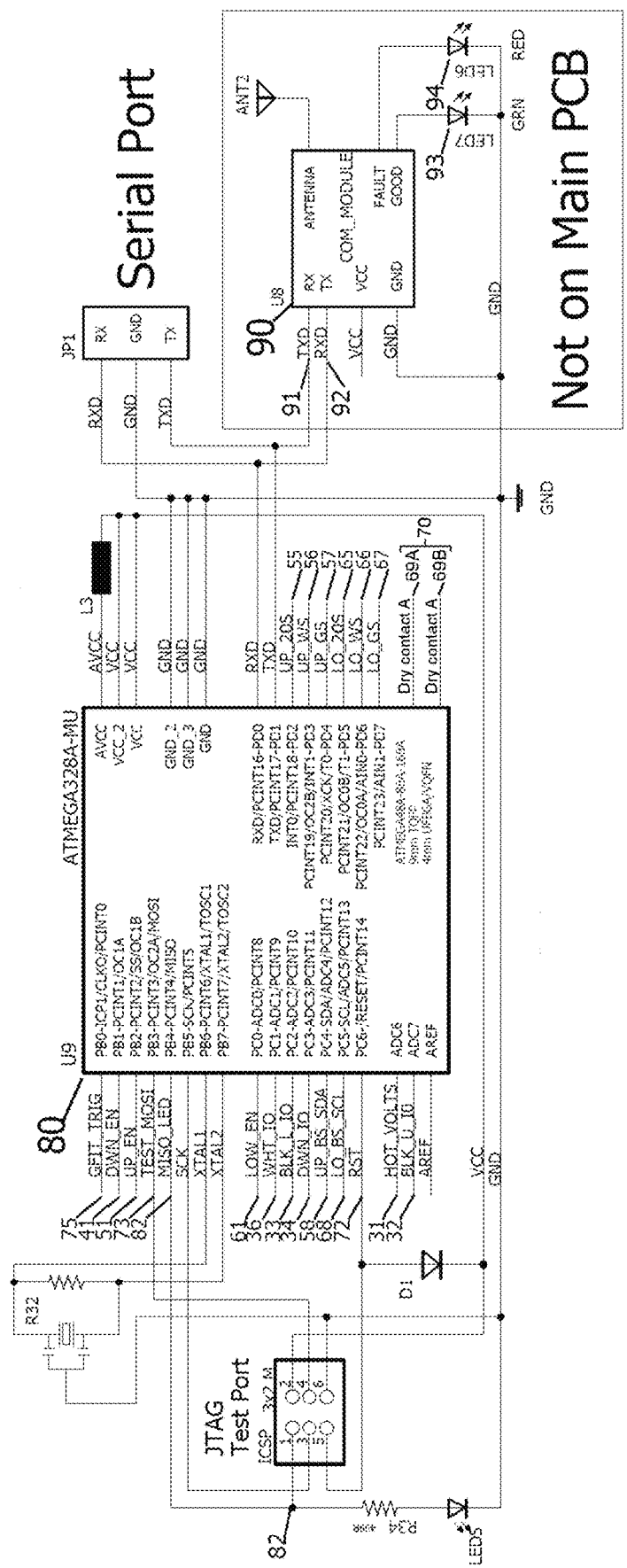
FIG. 38 illustrates a processor having dry contact switches, in accordance with an example embodiment.

FIG. 38 illustrates a processor that implements a dry contact switch that can be manually operated. By shorting each member of a dry contact (pins 69A and 69B in this Figure, set 70), a preprogrammed sequence in the processor can now be applied, triggering an action on FIG. 35 at 3510; whether it is for a turned on or turned off event; or the triggering of any preprogrammed procedure. An advantage of such a system is the ability to cover longer distances; at that point the processor is configured to detect a short circuit. As long as circuit is opened, no reaction will be triggered. If circuit is already closed, then the opening the processor can be configured to generate a reaction and execute a command(s) within processor of receptacle or in line unit, triggering an action on FIG. 35 at 3510.

Figure 39:
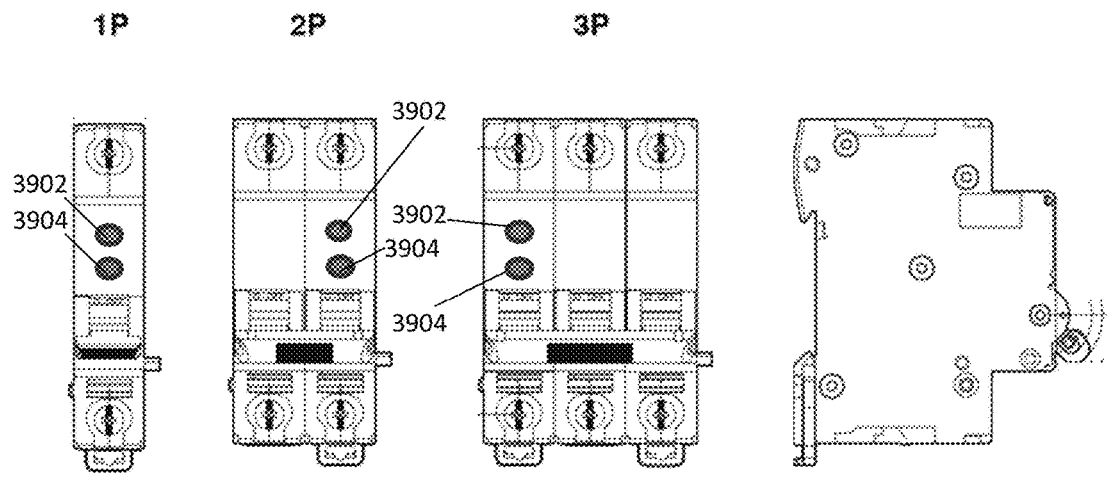
FIG. 39 illustrates side views of a physical representation of single-, double-, and triple-circuit breakers, respectively shown left-to-right, and a front view of all of the breakers, with connectors enabling power line communication, in accordance with example embodiments.

FIG. 39 illustrates side views of a physical representation of single-, double-, and triple-circuit breakers, respectively shown left-to-right, with connectors enabling power line communication, along with a front view on the right that is common to these embodiments. Each circuit breaker is also connected to a hot power line, and opening of the circuit breaker opens the hot power line. In the example embodiment shown, the circuit breaker has a respective connection pin to neutral 3904 and connection pin to ground 3902. In an example embodiment, the circuit breaker can further include the circuit board microcircuitry as described herein, include a processor and a memory. In an example embodiment, the processor can control (open or close) the respective one or more breakers.

By connecting the circuit breaker to neutral and/or ground, power line communication can be achieved. In an example, because the circuit breaker is equipped with the described microcircuitry in accordance with example embodiments, the circuit breaker can be part of the communication fence. In an example embodiment, the circuit breaker is configured to communicate over hot power line to neutral. In another example embodiment, the circuit breaker is configured to communicate over neutral power line to ground. In another example embodiment, the circuit breaker is configured to communicate over hot power line to ground.

Another industry problem in the electrical world is the difficulty to detect on regular circuitry problems that may occur in future. Early detection can result in significant benefits, eliminating fires, possible shorts, whether from receptacle to receptacle, or from series of receptacles, or receptacles interchangeable with inline power monitoring unit, it is now possible because all receptacles are on same circuit, they can communicate, e.g., unexpected power losses (wires getting frail or exposed), in GFI or AFI can be programmed that based on deemed severity of fault various action can be taken, e.g. command to send force trip to breaker, e.g. trip entire circuit. This can ensure integrity of entire circuit is not compromised.

By having receptacles talking to each other, comparing voltage, current would have more control; e.g. circuit overload. Normally in the industry, once there is too much current, the breaker trips. In the present case by receptacles talking to each other, when too much current is found, no additional loads would be permitted and also can communicate what has happened. Breaker tripping would be limited to real faults. Depending on sensitivity of units, the first receptacle on circuit would trip downstream.

Example embodiments can deliver exact power required. For a 15 amp circuit, an electrician will go up to 80% load design. The described systems in some example embodiments can go beyond 95% because downstream current is monitored, and as soon as load is added to the total, exceeding what would blow the fuse, the user is simply prevented from adding further loads, since the relevant electrical receptacle or plug outlet will not be activated. Multiple devices best to turn off further power being used. The system can allow going to 14.5 A for example without risk. Note that inrush can be passivated and can control overages. The industry does not perform this kind of current monitoring (for whole dynamic measurement control purpose).

Breaker panel is center point of all feeding, breakers tripping. Main breaker or surge protector can trip based on events from outside. Stopping most electrical fires. Appliance based fires would not be considered "electrical fire".

Currently manufacturers are adding $10-$15 of extra cost to reduce power factor and reduce power. The described electrical receptacles can remove quiescent power drain. Can sense power washing cycle is complete and can shut down until user restarts cycle. Use less power, be safer.

The described devices can draw more than 15 A or 80% of 15 A as the electrical receptacle can control the increase of amperage on a circuit. The system can with security exceed these as the device can prevent the addition of local power if too close to max. If not safe, the device does not turn power on for that particular unit; if still safe, then the device activates power. New level of safety where others may trip breakers. The device can even measure temperature to stop power if in a dangerous situation.

Optimizing wattage for appliances: the described devices have more control; i.e. able to supply exact wattage needed to best use an appliance's engineering specs.

Other GFI devices simply look for a current mismatch between hot (black) and the neutral white. If there is a difference, the current must be flowing from the black through a person to Ground.

The circuit is measuring extremely accurately the difference between the Black, White and can also differentiate between individual outlets and the downstream.

The processing algorithm allows the system to extract with a higher accuracy; however as higher accuracy also increases the possibility of false triggering, there are secondary routines which look at the signal to determine if the signals are high enough to cause harm, and are they in a consistent manner that they will cause harm. Apparent GFI faults might not be valid GFI faults. The intelligence determines whether or not there is sufficient voltage difference occurring a sufficient frequency to not be an aberration; rather a legitimate ground fault. And compare this against known profiles to establish legitimacy. Further, an example embodiment includes having a self tester at programmed intervals to test leakage and compare against known amount of leakage, and adjust accordingly. The devices are calibrated at factory more than traditional GFI's in order to maintain greater sensitivity and higher certainty of capturing a safety issue.

Similarly with Arc Faults, these have a leakage component like GFI, but at a higher level. It is recognized that this higher level of leakage is acceptable, unless it is detected certain other attributes which are those of an arc fault. The system can recognize much more valid circuits and remove false triggers which would otherwise occur (eg due to a toaster, drill, vacuum cleaner). The system can look for multiple occurrences across different cycles rather than accepting that something occurred only one time; i.e. has to occur with certain repetition to differentiate that this is not a one time event that is characteristic of an acceptable "normal" arc-like signal. To prevent false triggering, the traditional GFCI's or AFCI's have "raised the floor" of what they look for to trigger a trip. They do not look for the other attributes. In example embodiments, the device establishes whether a tripping trigger would be false, or whether a tripping trigger should take place.

Speed & Calibration: The electromechanical nature of the industry's AFCI's, GFI's limit the speed at which they respond and do not have dynamic calibration. Rather they are just simply testing that their circuitry can trip the switch.

Self test: comparing the calibration reference to the measured differences. Currently in normal outlet they rely on the mechanical wing which generates connection between third prong and screw; however example embodiments have a sensor that senses that one as well enabling checking of the signal. For example, for bad wiring, there should be no voltage drop between black and white; any drop is relative to current. For good wiring, there is no current travelling on ground; if there were, the system can detect it and report bad wiring.

An example embodiment can consider a ground fault that is not a GFI fault. Connections, wiring, plugs, not good zero ohm connection on ground, suddenly starts rising. The device is comparing the ground and safety ground. The processing enables the device to dynamically test all the time the ground path. If the ground path rises and there's any compromise the device can report it, e.g. within half a second, and/or deactivate power, and/or open a breaker.

Another example embodiment is to manually short hot power line to ground. Using the receptacle, one is manually triggering a short. This can be done with a short to ground. A user can manually go to the plug, intentionally short to the Ground using a manual switch, and the electrical receptacle and the system will smartly react.

In the disclosed system, an example embodiment is a manual button that shorts hot to ground, that triggers a CPU. An example embodiment is intentionally creating ground fault to trigger an activity. A triggered ground fault can be a trigger of different activities including, in an example embodiment, shutting down receptacle due to the CPU of the receptacle detecting ground fault or GFI fault. Detection of arc fault or ground fault can be used to trigger additional security steps. Existing industry ground fault and arc fault shut themselves down only. The device can shut breakers down, different apparatus elsewhere. For example, if water damage to outlet, can preprogram that other outlets/inline devices should shut down too, or other action taken. An example embodiment includes communicating event happening on one circuit to devices on another circuit(s) (one or more), such as on a different hot power line phase.

Reference to breakers, circuit breakers, and circuit breaker panels may be interchangeable used or interchangeable as to their functionality as described herein, as applicable. The disclosed concepts are applicable to power strips, power bars, extension cords, receptacle adaptors, circuit breakers, circuit breaker panels, in-line electrical receptacles, and other devices that facilitate provision, safety, and control of electrical power from power lines to downstream loads. Such receptacles may or may not include plug outlets for a matching plug, or other output connectors such as fixed electrical wiring, terminal screws, sockets or pins. While a North American 110V 60 Hz receptacle is exemplified herein, the disclosed concepts are applicable to other international receptacles or devices. Similarly, the disclosure is not limited to plug blades as the mating means for the receptacle outlet, but is applicable interchangeably to other plug configurations such as found in other international standards. Moreover, although the present disclosure has been exemplified in a single phase alternating current context, the disclosure is operable in the contexts of direct current and three-phase systems.

The following numbered clauses define further examples and/or example embodiments.

1. An electrical receptacle comprising:
a first plug outlet comprising first and second contacts configured for electrical connection to a hot power line and a neutral power line, respectively;
a controlled state switch connected to the first plug outlet contact in series relationship with the hot power line, the switch comprising a control terminal;
first and second sensors coupled respectively to the first and second plug outlet contacts;
and a processor comprising an output coupled to the control terminal of the switch, the processor further comprising first and second inputs connected respectively to the first and second sensors;
wherein the processor is configured to output an activation signal or a deactivation signal to the switch in response to sensor signals received at said first and second inputs, said sensor signals indicative of conditions relative to the first and second contacts.

2. An electrical receptacle as recited in clause 1, further comprising:
a current sensor coupled to the hot power line, the current sensor have an output coupled to a third input of the processor;
wherein the processor is configured to output a deactivation signal to the switch in response to receipt at said third input of a current sensor output indicative of ground fault, arc fault or over-current conditions.

3. An electrical receptacle as recited in clause 1, further comprising:
a second plug outlet comprising a pair of contacts;
a second controlled switch connected in series relationship between one of the pair of second plug outlet contacts and the live power line, the second switch comprising a control terminal;
third and fourth sensors coupled respectively to the pair of second plug outlet terminals;
and
the processor further comprises an output coupled to the control terminal of the second switch, and a further pair of inputs connected respectively the third and fourth sensors;
wherein the processor is configured to output an activation signal or a deactivation signal to the second switch in response to sensor signals received at said further pair of inputs, the received sensor signals indicative of conditions relative to said pair of second plug outlet contacts.

4. An electrical receptacle as recited in clause 3, wherein each said switch comprises a TRIAC.

5. An electrical receptacle as recited in clause 3, wherein said processor signals output to the switch of the first plug outlet are independent of the processor signals output to the switch of the second plug outlet.

6. An electrical receptacle as recited in clause 1, further comprising a metal oxide varistor (MOV) coupled across the hot line and the neutral line, thereby providing voltage protection against a voltage surge.

7. An electrical receptacle as recited in clause 1, wherein the processor is configured to output a deactivation signal to the switch prior to operation of mechanical breaker protection in the power lines.

8. An electrical receptacle comprising:
a first plug outlet comprising first and second contacts configured for electrical connection to a hot power line and a neutral power line, respectively;
a controlled switch connected to the first plug outlet contact in series relationship with the hot power line, the switch comprising a control terminal; and
a circuit board mounted with integrated circuitry, the integrated circuitry comprising:
a processor and an interrupt detection circuit, the interrupt detection circuit, the interrupt detection circuit having an input coupled to the first and second contacts of the first plug outlet and an output coupled to the processor;
wherein the processor comprises an output coupled to the control terminal of the switch and is configured to output a deactivation signal to the switch in response to an input received from the interrupt detection circuit indicative of ground fault detection, arc fault detection or over-current detection.

9. An electrical receptacle as recited in clause 8, wherein said switch comprises a TRIAC.

10. An electrical receptacle as recited in clause 8, further comprising:
a second plug outlet comprising a pair of contacts;
a second controlled switch connected in series relationship between one of the pair of second plug outlet contacts and the live power line, the second switch comprising a control terminal; and wherein:
the interrupt detection circuit comprises a further input coupled to the pair of contacts of the second plug outlet;
the processor further comprises an output coupled to the control terminal of the second switch; and
wherein the processor is configured to output a deactivation signal to the control terminal of the second switch in response to sensor signals received from the interrupt detection circuit, the received sensor signals indicative of conditions relative to said pair of second plug outlet contacts.

11. An electrical receptacle as recited in clause 10, wherein said processor signals output to the switch of the first plug outlet are independent of the processor signals output to the switch of the second plug outlet.

12. An electrical receptacle as recited in clause 10, further comprising a metal oxide varistor (MOV) coupled across the hot line and the neutral line, thereby providing voltage protection against a voltage surge.

13. An electrical receptacle as recited in clause 10, wherein the processor is configured to output a deactivation signal to a respective one of said switches prior to operation of mechanical breaker protection in the power lines.

14. An electrical receptacle as recited in clause 8, further comprising a voltage protection circuit coupled across the hot line and neutral line.

15. The electrical receptacle as recited in clause 14, wherein the voltage protection circuitry comprises a metal oxide varistor (MOV) across the hot line and the neutral line.

16. An in-wall electrical receptacle comprising:
at least one plug outlet, each said outlet comprising first and second contacts configured for electrical connection to a hot power line and a neutral power line, respectively;
at least one circuit board comprising a control circuit coupled to the first and second contacts of a respective said plug outlet for electrical connection thereof to said power lines; and
a voltage surge protection circuit coupled to said circuit board and said power lines to protect the at least one circuit board against upstream voltage surge from at least one of the power lines.

17. An in-wall electrical receptacle as recited in clause 16, wherein the source voltage surge protection circuitry comprises a metal oxide varistor (MOV), said varistor connected across the hot and neutral power lines.

18. An in-wall electrical receptacle as recited in clause 16, wherein said control circuit comprises a processor having an input coupled to said power lines.

19. An in-wall electrical receptacle as recited in clause 18, wherein said processor is configured to record a number and intensity of overvoltage occurrences of the electrical receptacle.

20. An in-wall electrical receptacle as recited in clause 19, wherein said processor is configured to output an end-of-life indication based on a threshold of maximum number or intensity of the overvoltage occurrences.

21. An in-wall electrical receptacle as recited in clause 16, further comprising a downstream series electrical connection to a second electrical receptacle, and wherein said second electrical receptacle comprises a second voltage surge protection circuit, thereby providing a tighter voltage capping tolerance.

22. An in-wall electrical receptacle as recited in clause 16, further comprising a controlled switch connected to the first plug outlet contact in series relationship with the hot power line, the switch comprising a control terminal.

23. An in-wall electrical receptacle as recited in clause 22, wherein the processor comprises an output coupled to the switch control terminal for activating electrical connection of the plug outlet contacts to the power lines.

24. An electrical receptacle comprising:
at least one plug outlet, each said outlet comprising a pair of contacts configured for electrical connection to a hot and neutral power line respectively;
a controlled switch connected to a contact of each respective said plug outlet in series relationship with the hot power line, each said controlled switch comprising a control terminal; and
a processor coupled to the power lines, the processor comprising:
output terminals coupled respectively to the control terminals of each said controlled switch; and
means for determining from sampled signals of the power lines that a sum of current of all hot lines is not within a set threshold, to apply a deactivation signal to an associated switch control terminal.

25. An electrical receptacle as recited in clause 24, wherein each said switch comprises a TRIAC.

26. An electrical receptacle comprising:
at least one plug outlet, each said outlet comprising a pair of contacts configured for electrical connection to a hot and neutral power line respectively;
a switch connected to a contact of each respective plug outlet in series relationship with the hot power line, each said switch comprising a control terminal; and
a processor coupled to the power lines, the processor comprising output terminals coupled respectively to the control terminal of said switch of each said plug outlet;
wherein the processor is configured to output a deactivation signal to the control terminal of each switch in response to sampled signals of the power lines indicative of a current fault.

27. An electrical receptacle as recited in clause 26, wherein the processor comprises a dynamic memory in which the sampled signals are dynamically stored.

28. An electrical receptacle as recited in clause 27, wherein the processor is configured to reconstruct waveforms of the sampled signals from the sampled signals stored in the dynamic memory.

29. An electrical receptacle as recited in clause 28, further comprising a memory for storing criteria for temporal signal imbalance, waveform criteria, minimum values, maximum values, table lookup values, reference datasets and/or Fourier analysis criteria, with which the sampled signals are compared.

30. An electrical receptacle as recited in clause 26, wherein the processor is configured to store a minimum monitoring time period of the sampled signals sufficient to detect a possible fault.

31. An electrical receptacle as recited in clause 26, wherein the processor comprises a reference lookup table comprising criteria relating to a temporal signal imbalance occurrence of the sampled signals.

32. An electrical receptacle as recited in clause 31, wherein the processor is configured to determine temporal imbalance from sampled current of the hot line.

33. An electrical receptacle as recited in clause 31, wherein the processor is configured to determine temporal imbalance from sampled voltage of the hot line.

34. An electrical receptacle as recited in clause 26, wherein each said switch comprises a TRIAC.

35. An electrical receptacle comprising:
at least one plug outlet, each said outlet comprising:
a pair of contacts configured for electrical connection to a hot and neutral power line respectively;
a socket configured to receive a plug prong having one of a plurality of prong orientations;
a controlled switch connected to a first of said pair of contacts in series relationship with the hot power line, the switch comprising a control terminal;
a processor coupled to the plug outlet contacts, the processor comprising:
output terminals coupled respectively to the control terminal of said switch of each said plug outlet;
a memory for storing threshold current values correlated with respective said prong orientations;
wherein the processor is configured to determine prong orientation of a received plug and output a deactivation signal to the switch control terminal in response to sampled signals of the power lines indicative of a current fault for the determined plug orientation.

36. An electrical receptacle as recited in clause 35, further comprising a plug orientation sensor coupled to the plug contacts and the processor.

37. An electrical receptacle as recited in clause 35, wherein the threshold current value is 20 Amperes for one of said prong orientations and 15 Amperes for another said prong orientation.

38. An electrical receptacle as recited in clause 35, wherein the electrical receptacle is connected to a second electrical receptacle that is unaffected by said deactivation signal.

39. An electrical receptacle as recited in clause 35, further comprising a second plug outlet, wherein said deactivation signal does not affect said second plug outlet.

40. An electrical receptacle as recited in clause 35, wherein each switch comprises a TRIAC.

41. An electrical receptacle comprising:
a plurality of plug outlets, each said outlet comprising a pair of contacts configured for electrical connection to a hot and neutral power line respectively;
a plurality of controlled switches, each said switch connected to a contact of a respective one of said plurality of plug outlets in series relationship with the hot power line, each said switch comprising a control terminal; and
a processor coupled to the plug outlets, the processor comprising a plurality of output terminals coupled respectively to the control terminals of said switches;
wherein the processor is configured to sample signals at each plug outlet and, in response to the sampled signals at one individual plug outlet satisfying criteria, outputting a deactivation control signal the respective switch of said one individual plug outlet independent of respective electrical connections of other said plug outlets.

42. An electrical receptacle as recited in clause 41, wherein the electrical receptacle is connected across the hot and neutral power lines and to a second electrical receptacle that is unaffected by said deactivation signal.

43. An electrical receptacle as recited in clause 42, wherein the second electrical receptacle comprises a controlled switch connected to the hot power line, and a control electrode of the electrical switch of the second electrical receptacle is coupled to the processor;
wherein deactivation of each of the electrical receptacles is controlled independently of each other.

44. An electrical receptacle as recited in clause 41, the processor is configured to output a deactivation signal to the switch prior to operation of mechanical breaker protection in the power lines.

45. An electrical receptacle as recited in clause 44, wherein the processor is configured to communicate a fault signal to the breaker upon outputting the deactivation signal.

46. An electrical receptacle as recited in clause 41, wherein the criteria comprises ground fault detection, arc fault detection or over-current detection.

47. An electrical receptacle as recited in clause 41, wherein each switch comprises a TRIAC.

48. A system comprising:
a plurality of electrical receptacles coupled to hot and neutral power lines;
a first said electrical receptacle comprising:
a plug outlet comprising a contact configured for electrical connection to the hot power line;
a communication subsystem configured to communicate with a downstream load and/or a second said electrical receptacle which is downstream to said first said electrical receptacle;
a processor configured to sample signals at said plug outlet and sample signals downstream of the first electrical receptacle and, in response to the sampled signals satisfying criteria, outputting a deactivation signal to the communication subsystem for deactivation of said second receptacle from the hot line.

49. A system as recited in clause 48, wherein the criteria includes a threshold for the sum of current of the plug outlet and current downstream to the electrical receptacle.

50. A system as recited in clause 48, wherein the criteria includes a threshold for current downstream of the electrical receptacle.

51. A system as recited in clause 48, wherein the output deactivation signal is not applied to control of said plug outlet.

52. A system as recited in clause 48, wherein said second receptacle comprises a second plug outlet, said first and second plug outlets comprise, respectively, a controlled switch for serial connection to the hot line, and said processor is configured to wait a specified delay prior to outputting said deactivation signal.

53. A system as recited in clause 52, wherein said processor is configured to, after the specified delay and after determining that the deactivating was not performed by the downstream load and/or the second receptacle, deactivate at least one of the respective switches.

54. A system as recited in clause 48, wherein the downstream electrical connection is wired in parallel from the plurality of power lines with respect to said plug outlet.

55. An electrical receptacle comprising:
a plug outlet comprising first and second prong socket contacts configured for electrical connection to a hot power line and a neutral power line, respectively;
a power source;
a mechanical switch mechanism electrically connected to the power source in an on state;
a plurality of detectors corresponding respectively to the first and second prong socket contacts, said detectors connected to the switch mechanism and the power source during the on state of the switch mechanism;
wherein the mechanical switch mechanism is activated to said on state by insertion of one or more objects in the plug outlets;
and the electrical receptacle further comprises a processor configured to activate electrical connection from the hot line to the first prong socket in response to two or more objects being detected by the plurality of detectors within a specified time.

56. An electrical receptacle as recited in clause 55, further comprising a controlled switch connected between the first prong socket contact and the hot line, a control terminal of the switch coupled to the processor.

57. An electrical receptacle as recited in clause 55, further comprising an indicator coupled to the processor;
wherein outputs of the detectors are coupled to the processor; and
the processor is further configured to produce an output to the indicator in response to outputs received from the detectors indicative that objects have not been inserted in the plug sockets within said specified time.

58. An electrical receptacle as recited in clause 55, wherein the plurality of detectors comprise optical switches.

59. An electrical receptacle comprising:
at least one plug outlet comprising prong socket contacts configured for electrical connection to a hot power line and a neutral power line, respectively;
a first circuit board including a hot line prong socket for each said plug outlet, said circuit board comprising first circuitry for electrical connection from the hot line to each hot line prong socket; and a second circuit board spatially separated from the first circuit board, said second circuit board comprising a neutral line prong socket for each said plug outlet and second circuitry for electrical connection from a neutral line to each neutral line prong socket.

60. An electrical receptacle as recited in clause 59, wherein the first circuit board is configured generally parallel to the second circuit board.

61. An electrical receptacle as recited in clause 59, wherein the first circuit board and the second circuit board are generally planar and configured in parallel relationship to an insertion direction of the at least one plug outlet.

62. An electrical receptacle as recited in clause 59, further comprising at least one processor configured to output a control signal to activate electrical connection from the hot line to a corresponding said prong socket.

63. An electrical receptacle as recited in clause 62, further comprising a controlled switch controlled connected between a respective hot line prong socket and the hot line, a control electrode of said switch coupled to the output of the processor for hot line electrical connection activation.

64. An electrical receptacle as recited in clause 59, wherein the first circuitry comprises high power control circuitry and the second circuitry comprises low power logic control circuitry.

65. An electrical receptacle as recited in clause 59, wherein the first circuitry comprises high power control circuitry and the second circuitry comprises communication function circuitry.

66. An electrical receptacle for connection to a plurality of power lines protected by a mechanical breaker, the electrical receptacle comprising:
at least one plug outlet, each said plug outlet comprising a pair of contacts configured for electrical connection to a hot and neutral power line of said plurality of power lines, respectively;
a controlled switch connected to a contact of each said plug outlet in series relationship with the hot power line, each said controlled switch comprising a control terminal for controlling electrical connection and disconnection between the respective plug outlet contact and the hot line; and
wherein deactivation of each said switch precedes operation of the mechanical breaker.

67. An electrical receptacle as recited in clause 66, further comprising a processor coupled to each switch control terminal, the processor configured to monitor outlet current for outputting a deactivation signal to said each switch control to deactivate said switch and effect said disconnection.

68. An electrical receptacle as recited in clause 66, further comprising a processor coupled to each switch control terminal, the processor configured to output a deactivation signal to said each switch control terminal to deactivate said switch and effect said disconnection in response to a maximum supplied current to said plug outlet in order to precede or avoid tripping of the mechanical breaker.

69. An electrical receptacle as recited in clause 66, wherein each switch comprises a TRIAC.

70. A system comprising:
a plurality of electrical receptacles coupled to hot and neutral power lines;
each of said plurality of electrical receptacles comprising:
at least one plug outlet comprising a contact configured for electrical connection to the hot power line and the neutral power line;
a controlled switch connected to a contact of each said plug outlet in series relationship with the hot power line for controlling connection from the hot line;
a communication subsystem configured to communicate between a first said receptacle and a second said electrical receptacle downstream to said first electrical receptacle; and
a processor configured to sample signals at the plug outlet of the first receptacle and determine that a fault occurred at said second electrical receptacle and, in response to said determination, to wait for a specified delay period prior to outputting a deactivation signal to any of the respective switches.

71. A system as recited in clause 70, wherein the processor is configured to determine that deactivation was not performed by the second receptacle during said delay period prior to outputting the deactivation signal.

72. A system as recited in clause 70, wherein the processor is further configured to determine that occurrence of a fault at an input of said first receptacle and, in response thereto, to wait a second specified delay of a period shorter than said specified delay, to output a deactivation signal.

73. A system as recited in clause 70, wherein the fault comprises a ground fault.

74. A system as recited in clause 70, further comprising a dip switch or programmable serial command configured to perform the specified delay.

75. A system as recited in clause 70, wherein each switch comprises a TRIAC.

76. An electrical receptacle comprising:
at least one plug outlet comprising prong socket contacts configured for electrical connection to a hot power line and a neutral power line, respectively;
a controlled switch connected to a contact of each said plug outlet in series relationship with the hot power line for controlling connection from the hot line;
a processor comprising at least one input coupled to said plug outlet and an output coupled to a control terminal of said switch;
wherein the processor is configured to determine that a plug is inserted into said plug outlet and, in response to an approximate zero volt level of the alternating current waveform, output an activation signal to a control terminal of said switch for electrical connection of the plug outlet to the hot line when the alternating current waveform is at or about zero volts.

77. An electrical receptacle comprising:
at least one plug outlet configured for electrical connection to hot and neutral power lines;
a processor coupled to said plug outlet;
wherein the processor is configured to determine that the electrical receptacle is incorrectly wired, and in response to said determination, outputting a control signal to the plug outlet to preclude electrical connection of the plug outlet to the power lines.

78. An electrical receptacle as recited in clause 77, further comprising a controlled switch connected to the plug outlet; wherein control signal is applied to a control terminal of said switch.

79. An electrical receptacle as recited in clause 77, wherein the processor is configured to control a maximum supplied current to the incorrectly wired plug outlet.

80. An electrical receptacle comprising:
at least one plug outlet, each plug outlet configured for electrical connection to hot and neutral power lines; and
a processor coupled to said plug outlet, the processor configured to determine that the plug outlet has received a plug without a ground prong.

81. An electrical receptacle as recited in clause 80, wherein the processor is further configured to determine whether or not a ground prong is appropriate for the received plug and, in response to determination that a ground prong is appropriate, output a control signal to the plug outlet for controlling a maximum supplied current to the plug outlet.

82. The electrical receptacle as recited in clause 81, wherein the processor, in response to determination that a ground prong is unnecessary for the received plug, does not output said control signal.

83. An electrical receptacle comprising:
at least one plug outlet, each plug outlet configured for electrical connection to hot and neutral the power lines; and
a processor configured to determine an internal component failure of the electrical receptacle.

84. An electrical receptacle as recited in clause 83, wherein the processor is configured to generate a fault output in response to said internal component failure determination.

85. An electrical receptacle as recited in clause 84, wherein the electrical receptacle is connected to a downstream electrical receptacle; and
wherein the generated fault output generated is in response to detection to component failure at the second electrical receptacle.

86. An electrical receptacle as recited in clause 85, wherein the generated fault is in response to a ground fault.

87. An electrical receptacle as recited in clause 83, wherein the processor is configured to perform self-testing of the electrical receptacle for said determining the internal component failure.

88. The electrical receptacle as recited in clause 87, wherein the processor is configured to perform self-testing in an ongoing or periodic routine.

89. An electrical receptacle comprising:
at least one plug outlet, each plug outlet configured for electrical connection to hot and neutral the power lines; and
at least one sensor for detecting electrical signal values related to the plug outlet; and
a processor configured to self-calibrate the at least one sensor.

90. An electrical receptacle as recited in clause 89, wherein the at least one sensor comprises a current sensor.

91. An electrical receptacle as recited in clause 89, wherein the at least one sensor comprises a voltage sensor.

92. An electrical receptacle as recited in clause 89, further comprising a constant current source coupled to the processor, wherein said self-calibration is performed by referring to the constant current source.

93. An electrical receptacle comprising:
at least one plug outlet, each plug outlet configured for electrical connection to hot and neutral the power lines; and
a controlled switch connected to a contact of said plug outlet in series relationship with the hot power line for controlling connection from the hot line;
a processor electrically coupled to the receptacle, the processor configured to perform ongoing or periodic self-testing of the electrical receptacle to determine a fault and, in response a fault determination, generate a control output to a control terminal of the switch to deactivate electrical connection of the plug outlet from the hot line.

94. An electrical receptacle comprising:
at least one plug outlet, each plug outlet configured for electrical connection to hot and neutral the power lines; and
a processor electrically coupled to the receptacle, the processor configured to sample signals at the neutral line, and in response to the sample signals, determine whether the sample signals satisfy specific criteria.

95. An electrical receptacle for connecting to a plurality of power lines including a hot line and a neutral line, the electrical receptacle comprising:
at least one plug outlet;
a plurality of prong sockets for each plug outlet, each prong socket corresponding to a respective one of the power lines;
a power source;
a plurality of switches coupled to a power source, the plurality of switches corresponding to respective ones of said prong sockets wherein:
the switches are positioned to detect a presence of an object at the corresponding prong socket;
each switch comprises a switch plunger depressed by deflection of a spring contact due to insertion of the one or more objects; and further comprising:
a processor configured to activate electrical connection from the hot line to the corresponding prong socket in response to a plurality of objects being detected by the switches substantially within a specified time.

96. The electrical receptacle as recited in clause 1, wherein the electrical receptacle comprises an in-wall receptacle, a multiple-outlet power adapter, a power strip, or an extension cord.

The following numbered clauses define further examples and/or example embodiments.

1. An electrical receptacle comprising:
a first contact and a second contact configured for electrical connection to a hot power line and a neutral power line, respectively, and each configured for downstream electrical connection to a respective downstream power line;
a controlled state switch connected in series relationship to the hot power line;
at least one sensor to detect signals indicative of the hot power line;
at least one sensor to detect signals indicative of the neutral power line; and
a processor configured to control an activation or a deactivation of the controlled state switch in response to the signals detected by at least one of the sensors or in response to receiving a communication.

2. An electrical receptacle as recited in clause 1:
wherein the at least one sensor to detect signals indicative of the hot power line comprises a current sensor to detect current of the hot power line;
wherein the processor is configured to control deactivation of the switch in response to the detected current of the current sensor output indicative of ground fault, arc fault or over-current conditions.

3. An electrical receptacle as recited in clause 1, further comprising:
a second pair of contacts in parallel to the first and second contacts, configured for electrical connection to the hot power line and the neutral power line, respectively, and configured for associated downstream electrical connection;
a second controlled state switch connected in series relationship between one contact of the second pair of contacts and the hot power line.

4. An electrical receptacle as recited in clause 1, wherein said controlled state switch comprises a TRIAC.

5. An electrical receptacle as recited in clause 1, further comprising a metal oxide varistor (MOV) coupled across the hot line and the neutral line, thereby providing voltage protection against a voltage surge.

6. An electrical receptacle as recited in clause 1, wherein said downstream electrical connection is to a plug outlet of the electrical receptacle.

7. An electrical receptacle as recited in clause 1, wherein said downstream electrical connection is to a second electrical receptacle.

8. An electrical receptacle as recited in clause 7, wherein said second electrical receptacle comprises further protection against voltage surge, ground fault, arc fault or over-current conditions.

9. An electrical receptacle as recited in clause 7, wherein said second electrical receptacle does not provide protection against voltage surge, ground fault, arc fault or over-current conditions.

10. An electrical receptacle as recited in clause 1, wherein said downstream electrical connection is to a load.

11. An electrical receptacle as recited in clause 10, wherein the controlled state switch is a sole local switch power to turn the load on and off.

12. An electrical receptacle as recited in clause 10, wherein the controlled state switch is controlled to provide a partial power output to the load.

13. An electrical receptacle as recited in clause 12, wherein the partial power output to the load is for dimming of the load.

14. A system comprising:
an electrical receptacle as recited in clause 1;
a circuit board with integrated circuitry and comprising the processor; and
at least one further circuit board each comprising a respective processor, the respective processor configured for communication with said processor, for at least said activation or said deactivation, in response to inputs received from sources external to the electrical receptacle.

15. A system as recited in clause 14, wherein said communication is performed using wireless communication and/or wired communication.

16. A system as recited in clause 14, wherein the at least one further circuit board comprises only low power logic control circuitry.

17. A system as recited in clause 14, further comprising a casing, wherein the circuit board and the at least one further circuit board reside within the casing.

18. A system as recited in clause 14, further comprising a casing, wherein the circuit board resides within the casing and the at least one further circuit board is external to the casing.

19. A system as recited in clause 18, wherein at least one of the further circuit boards is part of a wireless portable communication device, a mobile phone, a computer tablet, or an original equipment manufacturer (OEM) computer device.

20. A system as recited in clause 14, wherein the inputs to the at least one further circuit board comprise low voltage inputs which comprise sensor inputs or manual control inputs.

21. A system as recited in clause 20, wherein the processor is configured to receive at least one of the same inputs as said inputs of the at least one further circuit board.

22. A system as recited in clause 20, wherein said downstream electrical connection is to a load, further comprising a user interface device for entering the manual control inputs to be processed by the respective processor of at least one of the further circuit boards, to turn the load on and off.

23. A system as recited in clause 14, further comprising a dry contact switch which is configured to, without a voltage reference source, short two pins of a packaging of the processor or one of the respective processors, the processor or one of the respective processors being responsive to the short to effect deactivation of the controlled state switch, another electrical receptacle, and/or a load.

24. An electrical receptacle as recited in clause 1, wherein the electrical receptacle is an in-wall electrical receptacle.

25. An electrical receptacle as recited in clause 1, further comprising a second controlled state switch connected in series relationship to the neutral power line.

26. An electrical receptacle as recited in clause 1, wherein the processor is further configured to sample signals of the respective power lines.

27. An electrical receptacle as recited in clause 26, wherein the processor is further configured to determine from the sample signals that a sum of current of all hot power lines is not within a set threshold, to control deactivation of the controlled state switch.

28. An electrical receptacle as recited in clause 26, wherein the processor is further configured to control deactivation of the controlled state switch in response to sampled signals of the power lines indicative of a current fault.

29. An electrical receptacle as recited in clause 26, wherein the processor comprises a dynamic memory in which the sampled signals are dynamically stored.

30. An electrical receptacle as recited in clause 29, wherein the processor is configured to reconstruct waveforms of the sampled signals from the sampled signals stored in the dynamic memory.

31. An electrical receptacle as recited in clause 30, further comprising a memory for storing criteria for temporal signal imbalance, waveform criteria, minimum values, maximum values, table lookup values, reference datasets and/or Fourier analysis criteria, with which the sampled signals are compared.

32. An electrical receptacle as recited in clause 26, wherein the processor is configured to store a minimum monitoring time period of the sampled signals sufficient to detect a possible fault.

33. An electrical receptacle as recited in clause 26, wherein the processor comprises a reference lookup table comprising criteria relating to a temporal signal imbalance occurrence of the sampled signals.

34. An electrical receptacle as recited in clause 26, wherein the processor is configured to determine temporal imbalance from sampled current of the hot power line.

35. An electrical receptacle as recited in clause 26, wherein the processor is configured to determine temporal imbalance from sampled voltage of the hot power line.

36. An electrical receptacle as recited in clause 26, wherein the processor is configured to, in response to determining criteria from the sampled signal, output a deactivation signal to a communication subsystem for deactivation of a device at the downstream electrical connection.

37. An electrical receptacle as recited in clause 36, wherein the criteria includes a threshold for the sum of all downstream currents to the electrical receptacle.

38. An electrical receptacle as recited in clause 26, wherein the processor is configured to determine that the controlled state switch is to be activated, and configured to only activate the controlled state switch at an approximate zero volt level of an alternating current waveform.

39. An electrical receptacle as recited in clause 1, further comprising:
at least one further processor configured for communication with said processor, configured to be responsive to the signals detected by at least one of the sensors, to provide redundancy of said control of the activation or the deactivation of the controlled state switch.

40. An electrical receptacle as recited in clause 39, wherein the processor and the at least one further processor are on a same circuit board.

41. An electrical receptacle as recited in any one of clauses 1 to 40, wherein the electrical receptacle comprises an in-wall receptacle, a multiple-outlet power adapter, a power strip, an in-line power receptacle, an extension cord, a circuit breaker, or a circuit breaker panel.

42. An electrical receptacle as recited in clause 1, further comprising a dry contact switch which is configured to, without a voltage reference source, short two pins of a packaging of the processor, the processor responsive to the short to effect deactivation of the controlled state switch, another electrical receptacle, and/or a load.

43. An electrical receptacle as recited in clause 42, wherein the another electrical receptacle and/or the load are connected to a different hot power line phase than the electrical receptacle.

44. An electrical receptacle as recited in clause 42, wherein the another electrical receptacle and/or the load are connected to a same hot power line phase as the electrical receptacle.

45. A communication system, comprising:
a wired network;
an electrical receptacle configured for electrical connection to at least one power line, the electrical receptacle comprising a communication subsystem configured for wired communications over the wired network to communicate with one or more further electrical receptacles; and
a gateway for controlling access and/or authentication to the wired communications over the wired network.

46. A communication system as recited in clause 45, wherein the electrical receptacle comprises a wireless communication module.

47. A communication system as recited in clause 46, wherein electrical receptacle comprises the gateway.

48. A communication system as recited in clause 46, wherein electrical receptacle comprises an access point, a network extender, and/or a mesh network node.

49. A communication system as recited in clause 45, wherein the gateway comprises a wireless communication module.

50. A communication system as recited in clause 49, wherein the gateway is configured as an access point to the wired communications.

51. A communication system as recited in clause 45, wherein the electrical receptacle is configured for further electrical connection of the at least one power line to a downstream electrical receptacle.

52. A communication system as recited in clause 45, wherein the electrical receptacle is configured for further electrical connection to at least one plug outlet.

53. A communication system as recited in clause 52, wherein access to the wired communications over the at least one power line is available through the at least one plug outlet.

54. A communication system as recited in clause 49, wherein permission from the gateway is required to access the wired communications.

55. A communication system as recited in clause 45, wherein the wired communications are performed over at least one of the power lines.

56. A communication system as recited in clause 55, wherein the wired communications over the power lines are used for both receptacle-to-receptacle communication and Internet communication.

57. A communication system as recited in clause 55, wherein the wired communications continue when a circuit breaker of a circuit breaker panel opens one of the power lines.

58. A communication system as recited in clause 55, wherein the wired communications bypass a circuit breaker panel of the power lines.

59. A communication system as recited in clause 45, wherein the wired communications are performed over a low voltage line.

60. A communication system as recited in clause 45, wherein the wired communications are performed over a neutral power line to ground.

61. A communication system as recited in clause 60, wherein the wired communications comprise injecting a DC signal over the neutral line and modulating the DC signal.

62. A communication system as recited in clause 60, wherein the wired communications comprise sending a RF signal over the neutral line.

63. A communication device, comprising:
a first contact configured for electrical connection to a neutral power line, and a second contact configured for electrical connection to ground;
a processor; and
a communication subsystem configured for wired communications over the neutral power line to the ground.

64. A communication device as recited in clause 63, wherein the wired communications comprise inserting a DC signal over the neutral line and modulating the DC signal.

65. A communication device as recited in clause 63, wherein the wired communications comprise sending a RF signal over the neutral line.

66. A communication device as recited in clause 63, wherein the wired communications continue when a circuit breaker of a breaker panel opens a hot power line.

67. A communication device as recited in clause 63, wherein the wired communications bypass a circuit breaker panel.

68. A communication device as recited in clause 63, wherein the communication device is a device comprising a plug for plugging into a plug outlet.

69. A communication device as recited in clause 63, wherein the communication device is an electrical receptacle having a plug outlet.

70. A communication device as recited in clause 63, wherein the communication device is a circuit breaker panel.

71. A communication device, comprising:
a first contact configured for electrical connection to a first hot power line having a first power line phase, and a second contact configured for electrical connection to a second hot power line having a second power line phase different from the first power line phase; and
a processor configured to bridge wired communications between the first power line phase and the second power line phase.

72. A communication device as recited in clause 71, wherein the communications of the first power line phase are between the first power line phase to a neutral phasea and the communications of the second power line phase are between the second power line phase to the neutral phase.

73. A communication device as recited in clause 71, further comprising a separate power supply from the power lines, wherein the processor is configured to continue the wired communications using the separate power supply when a circuit breaker of a circuit breaker panel opens one or more of the hot power lines.

74. A communication device as recited in clause 71, wherein the communication device is a circuit breaker panel.

75. A communication device as recited in clause 71, further comprising a first communication subsystem configured for wired communications over the first hot power line; and a second communication subsystem configured for wired communications over the second hot power line.

76. An electrical receptacle for connection to power lines, comprising:
a first contact and a second contact configured for electrical connection to a hot power line and a neutral power line, respectively;
a communication subsystem configured for wired communications with one or more further electrical receptacles;
a processor having a packaging with pins, and configured to communicate via the wired communications;
a dry contact switch which is configured to, without a voltage reference source, short two pins of the packaging of the processor, the processor responsive to the short to effect, directly by the processor or indirectly via at least one further processor, deactivation of one or more of the further electrical receptacles, by communication over the wired communications.

77. An electrical receptacle device as recited in clause 76, further comprising a controlled state switch connected in series relationship to the hot power line, wherein the processor is further configured to deactivate the controlled state switch in response to the short.

78. A manual power override system, comprising:
a plurality of devices each configured for wired communications and each having a controlled state switch to control hot line power to that individual device, the plurality of devices comprising at least one of or all of:
an electrical receptacle having a plug outlet,
an in-line electrical receptacle,
a load, and/or
a circuit breaker panel;
a processor having a packaging with pins;
a communication subsystem operable by the processor for the wired communications;
a dry contact switch which is configured to, without a voltage reference source, short two pins of the packaging of the processor, the processor responsive to the short to effect, directly by the processor or indirectly via at least one further processor, deactivation of the controlled state switch of each of the plurality of devices, by communication over the wired communications.

79. A manual power override system as recited in clause 78, wherein the processor is further responsive to the short to effect, directly or indirectly, a sequential order of the deactivation of the plurality of devices.

80. A manual power override system as recited in clause 79, further comprising a memory accessible by the processor or by the at least one further processor, that stores the sequential order of the deactivation of the plurality of devices.

81. An electrical safety system, comprising:
an electrical receptacle, comprising:
a plug outlet comprising first and second contacts configured for electrical connection to a hot power line and a neutral power line, respectively,
a controlled state switch connected to the first contact in series relationship with the hot power line,
a processor configured to control an activation or a deactivation of the controlled state switch, the controlled state switch being in a deactivation state as a default when there is a plug in the plug outlet.

82. An electrical safety system as recited in clause 81, wherein the electrical receptacle further includes a communication subsystem for the electrical receptacle in operable communication with the processor; and further comprising:
a load, comprising:
the plug, and
a communication subsystem for the load configured to communicate to the communication subsystem for the electrical receptacle that the load is to be powered on.

83. An electrical safety system as recited in clause 82, wherein the load further includes a user input device configured to be activated in order to turn on the load, wherein the communication from the communication subsystem for the load to the communication subsystem for the electrical receptacle is sent in response to activation of the user input device.

84. An electrical safety system as recited in clause 82, wherein the communication between the communication subsystem for the load and the communication subsystem for the electrical receptacle is performed over one of the power lines.

85. An electrical safety system as recited in clause 82, wherein the communication between the communication subsystem for the load and the communication subsystem for the electrical receptacle is a wireless communication.

86. An electrical safety system as recited in clause 81, further comprising a voltage sensor to detect voltage of the hot power line, wherein when the plug is inserted the processor is further configured to determine that the voltage is at a specified voltage or within a threshold thereof, and upon said determining activating the controlled state switch.

87. An electrical safety system as recited in clause 81, further comprising a sensor to detect a signal of the hot power line, wherein when the plug is inserted the processor is further configured to determine that the signal is not at a specified signal value or within a threshold thereof, and upon said determining outputting that a circuit breaker has tripped.

88. An electrical safety system as recited in clause 87, wherein said outputting includes identifying which particular circuit breaker has tripped.

89. An electrical safety system as recited in clause 87, wherein said outputting includes outputting to a display screen or sending a message to another device.

90. An electrical safety system as recited in clause 81, wherein the processor is configured to receive a message that a circuit breaker panel has tripped, and wherein when the plug is inserted and the communication from the load indicates that the load is to be powered on, the processor does not activate the controlled state switch.

91. An electrical safety system as recited in clause 90, wherein the message is received from the circuit breaker panel.

92. A circuit breaker panel comprising:
at least one circuit breaker for connection to at least one hot power line, and each circuit breaker configured for downstream electrical connection to a respective downstream power line;
a processor for controlling the at least one circuit breaker;
at least one sensor to detect signals indicative of the at least one hot power line; and a communication subsystem for wired communication with devices that are downstream to the at least one circuit breaker;

wherein the processor is configured to, when one of the circuit breakers opens, output information relating to the signals from the at least one sensor.

93. A circuit breaker panel as recited in clause 92, wherein said outputting includes identifying which particular circuit breaker has tripped.

94. A circuit breaker panel as recited in clause 92, wherein said outputting includes outputting to a display screen or sending a message to another device.

95. A circuit breaker panel as recited in clause 92, wherein the processor is further configured to receive a message from one of the devices to a specified circuit breaker, and in response effect opening of the specified circuit breaker.

96. A circuit breaker panel as recited in clause 92, further comprising a memory for storing information relating to the signals from the at least one sensor.

97. A circuit breaker panel as recited in clause 92, wherein the communication subsystem is for electrical connection to a first hot power line having a first power line phase, and for electrical connection to a second hot power line having a second power line phase different from the first power line phase; and wherein the processor is further configured to bridge wired communications between the first power line phase and the second power line phase.

98. A circuit breaker panel as recited in clause 92, wherein the wired communications are performed over at least one of the power lines.

99. A circuit breaker panel as recited in clause 92, wherein the wired communications over the power lines are used for both receptacle-to-receptacle communication and Internet communication.

100. A circuit breaker panel as recited in clause 92, wherein the wired communications continue when the one circuit breaker opens one of the power lines.

101. A circuit breaker panel as recited in clause 92, wherein the wired communications are performed over a low voltage line.

102. A circuit breaker panel as recited in clause 92, wherein the communication subsystem is operably coupled to a neutral power line, wherein the wired communications are performed over the neutral power line to ground.

103. A circuit breaker panel as recited in clause 102, wherein the wired communications comprise injecting a DC signal over the neutral line and modulating the DC signal.

104. A circuit breaker panel as recited in clause 102, wherein the processor is further configured to send a communication in response to determining that no power is detected.

105. An appliance or load comprising:
a circuit board including a processor configured for power control of the appliance or load, and
the processor further configured for power safety of the appliance or load and/or communication with an electrical receptacle.

106. An appliance or load as recited in clause 105 wherein the communication is integrated to the communication system as recited in clause 45, bringing network security, the power safety and the power control one step up within the completed electrical circuit.

107. An appliance or load as recited in clause 105 wherein the circuit board is configured for power safety without communication and as a self contained unit.

108. An appliance or load as recited in clause 105 using any power line communication.

109. A device, comprising:
a neutral contact for connection to a neutral power line and a ground contact; and
a communication subsystem for communicating over the neutral power line to the ground.

110. A circuit breaker for connection at least one power line, comprising:
a breaker for connection to a hot power line of the at least on power line;
a processor for controlling the breaker; and
a communication subsystem for wired communication over at least one of the power lines.

111. A circuit breaker as recited in clause 110 further comprising at least one sensor to detect signals indicative of the at least one hot power line; wherein the processor is further configured to send a communication in response to determining that no power is detected.

While some of the present embodiments are described in terms of methods, a person of ordinary skill in the art will understand that present embodiments are also directed to various apparatus such as processors, circuitry, and controllers including components for performing at least some of the aspects and features of the described methods, be it by way of hardware components, software or any combination of the two, or in any other manner, as applicable.

In the Figures, as applicable, at least some or all of the illustrated subsystems or blocks may include or be controlled by a processor, which executes instructions stored in a memory or computer readable medium. Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the example embodiments, such variations being within the intended scope of the present disclosure. In particular, features from one or more of the above-described embodiments may be selected to create alternative embodiments comprised of a sub-combination of features, which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

Certain adaptations and modifications of the described embodiments can be made. Therefore, the above discussed embodiments are considered to be illustrative and not restrictive.

What is claimed is:
1. A circuit breaker panel comprising:
at least one circuit breaker for connection to at least one hot power line, and each circuit breaker configured for downstream electrical connection to a respective downstream power line;
a processor for controlling the at least one circuit breaker;
at least one sensor to detect signals indicative of the at least one hot power line; and
a communication subsystem for wired communication with devices that are downstream to the at least one circuit breaker;

wherein the processor is configured to, when one of the circuit breakers opens, output information relating to the signals from the at least one sensor, a first contact configured for electrical connection to a neutral power line, and a second contact configured for electrical connection to ground; and the communication subsystem configured for wired communications over the neutral power line to the ground, wherein the communication subsystem is operably coupled to a neutral power line, wherein the wired communications are performed over the neutral power line to ground, and wherein the wired communications bypass the at least one circuit breaker.

2. A circuit breaker panel as recited in claim 1, wherein said outputting includes identifying which particular circuit breaker has tripped.

3. A circuit breaker panel as recited in claim 1, wherein said outputting includes outputting to a display screen or sending a message to another device.

4. A circuit breaker panel as recited in claim 1, wherein the processor is further configured to receive a message from one of the devices to a specified circuit breaker, and in response effect opening of the specified circuit breaker.

5. A circuit breaker panel as recited in claim 1, further comprising a memory for storing information relating to the signals from the at least one sensor.

6. A circuit breaker panel as recited in claim 1, wherein the communication subsystem is for electrical connection to a first hot power line having a first power line phase, and for electrical connection to a second hot power line having a second power line phase different from the first power line phase; and wherein the processor is further configured to bridge wired communications between the first power line phase and the second power line phase.

7. A circuit breaker panel as recited in claim 1, wherein the wired communications are performed over at least one of the power lines.

8. A circuit breaker panel as recited in claim 1, wherein the wired communications over the power lines are used for both receptacle-to-receptacle communication and Internet communication.

9. A circuit breaker panel as recited in claim 1, wherein the wired communications continue when the one circuit breaker opens one of the power lines.

10. A circuit breaker panel as recited in claim 1, wherein the wired communications are performed over a low voltage line.

11. A circuit breaker panel as recited in claim 1, wherein the wired communications comprise injecting a DC signal over the neutral line and modulating the DC signal.

12. A circuit breaker panel as recited in claim 1, wherein the processor is further configured to send a communication in response to determining that no power is detected.

13. A communication device as recited in claim 1, further comprising:

a neutral contact for connection to a neutral power line;
a ground contact for connection to ground; and
a communication subsystem for communicating over the neutral power line to the ground.

14. A circuit breaker panel for connection at least one power line as recited in claim 1, further comprising:

a breaker for connection to a hot power line of the at least on power line;
a processor for controlling the breaker; and
a communication subsystem for wired communication over at least one of the power lines.

15. A circuit breaker panel as recited in claim 14 further comprising at least one sensor to detect signals indicative of the at least one hot power line; wherein the processor is further configured to send a communication in response to determining that no power is detected.

16. A circuit breaker panel as recited in claim 1, wherein the wired communications comprise inserting a DC signal over the neutral line and modulating the DC signal.

17. A circuit breaker panel as recited in claim 1, wherein the wired communications comprise sending a RF signal over the neutral line.

18. A circuit breaker panel as recited in claim 1, wherein the wired communications continue when one of the circuit breakers of the breaker panel opens a hot power line.

19. A circuit breaker panel as recited in claim 1, wherein the communication device is a device comprising a plug.

20. A circuit breaker panel as recited in claim 1,
wherein the first contact configured for electrical connection to a first hot power line having a first power line phase, and the second contact configured for electrical connection to a second hot power line having a second power line phase different from the first power line phase; and
wherein the processor is configured to bridge wired communications between the first power line phase and the second power line phase.

21. A circuit breaker panel as recited in claim 20, wherein the communications of the first power line phase are between the first power line phase to a neutral phase and wherein the communications of the second power line phase are between the second power line phase to the neutral phase.

22. A circuit breaker panel as recited in claim 20, further comprising a separate power supply from the power lines, wherein the processor is configured to continue the wired communications using the separate power supply when a circuit breaker of a circuit breaker panel opens one or more of the hot power lines.

23. A circuit breaker panel as recited in claim 20, further comprising a first communication subsystem configured for wired communications over the first hot power line; and a second communication subsystem configured for wired communications over the second hot power line.

* * * * *